United States Patent
Al-Maythalony et al.

(10) Patent No.: US 10,188,981 B2
(45) Date of Patent: Jan. 29, 2019

(54) MIXED MATRIX MEMBRANE, A METHOD OF MAKING THEREOF, AND A METHOD FOR GAS SEPARATION

(71) Applicants: King Fahd University of Petroleum and Minerals, Dhahran (SA); King Abdulaziz City for Science and Technology, Riyadh (SA)

(72) Inventors: Bassem Al-Maythalony, Dhahran (SA); Amir Al-Ahmed, Dhahran (SA); Mohamed A. Habib, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 15/493,912

(22) Filed: Apr. 21, 2017

(65) Prior Publication Data

US 2018/0304193 A1 Oct. 25, 2018

(51) Int. Cl.
*B01D 53/22* (2006.01)
*B01D 67/00* (2006.01)
*B01D 69/12* (2006.01)
*B01D 71/02* (2006.01)
*B01D 71/60* (2006.01)
(Continued)

(52) U.S. Cl.
CPC ........ *B01D 53/228* (2013.01); *B01D 67/0011* (2013.01); *B01D 67/0013* (2013.01); *B01D 69/12* (2013.01); *B01D 71/022* (2013.01); *B01D 71/60* (2013.01); *B01D 71/64* (2013.01); *B01D 71/68* (2013.01); *B01D 2325/021* (2013.01)

(58) Field of Classification Search
CPC .. B01D 53/22; B01D 53/228; B01D 67/0011; B01D 67/0013; B01D 69/12; B01D 71/022; B01D 71/028; B01D 71/06; B01D 71/60; B01D 71/64; B01D 71/68; B01D 2325/021
See application file for complete search history.

(56) References Cited

U.S. PATENT DOCUMENTS 7,637,983 B1 * 12/2009 Liu .................... B01D 67/0079
                                                    210/500.21
9,522,364 B2    12/2016 Odeh et al.
(Continued)

FOREIGN PATENT DOCUMENTS

WO    2009/075947    6/2009

OTHER PUBLICATIONS

Al-Maythalony, Bassem A. et al., "Tuning the Interplay between Selectivity and Permeability of ZIF-7 Mixed Matrix Membranes", Applied Materials & Interfaces, 7 pages, Jan. 2017. (Year: 2017).*
(Continued)

*Primary Examiner* — Jason M Greene
(74) *Attorney, Agent, or Firm* — Oblon, McClelland, Maier & Neustadt, L.L.P.

(57) ABSTRACT

A mixed matrix membrane which is porous and has a cross section resembling a sponge. The membrane includes nanoparticle fillers which are also porous. The membrane may be freestanding or supported on a substrate. Methods of making the membrane by spin casting or solvent casting are described. Methods of separating a gas/organic vapor using the membrane are described.

20 Claims, 42 Drawing Sheets

(51) Int. Cl.
    *B01D 71/64*    (2006.01)
    *B01D 71/68*    (2006.01)

(56) References Cited

U.S. PATENT DOCUMENTS

| | | | | |
|---|---|---|---|---|
| 9,610,560 | B2 * | 4/2017 | Farha | B01D 53/02 |
| 2013/0259783 | A1 * | 10/2013 | Ni | B01D 53/04 |
| | | | | 423/226 |
| 2013/0305920 | A1 * | 11/2013 | Yang | B01D 53/228 |
| | | | | 95/45 |
| 2014/0212940 | A1 | 7/2014 | Yang et al. | |
| 2015/0251139 | A1 * | 9/2015 | Jeong | B01D 71/022 |
| | | | | 96/13 |
| 2016/0243525 | A1 | 8/2016 | Song et al. | |
| 2016/0367948 | A1 | 12/2016 | Song et al. | |
| 2017/0252720 | A1 * | 9/2017 | Odeh | B01D 53/228 |

OTHER PUBLICATIONS

Al-Maythalony, Bassem A. et al., Supporting Information for the publication "Tuning the Interplay between Selectivity and Permeability of ZIF-7 Mixed Matrix Membranes", 41 pages, Jan. 2017. Retrieved from http://pubs.acs.org/doi/abs/10.1021/acsami.6b15803 on Apr. 10, 2018. (Year: 2017).*

Jiang, Jun-Qing et al., "Postsynthetic ligand exchange for the synthesis of benzotriazole-containing zeolitic imidazolate framework", Chem. Commun., 51, pp. 6540-6543, Mar. 2015. (Year: 2015).*

Jiang, Jun-Qing et al., Electronic Supplementary Information for the publication "Postsynthetic ligand exchange for the synthesis of benzotriazole-containing zeolitic imidazolate framework", pp. 51-59, Mar. 2015. Retrieved from http://pubs.rcs.org/suppdata/c5/cc/c5cc00366k on Apr. 9, 2018. (Year: 2015).*

Bassem A. Al-Maythalony et al., "Tuning the Interplay between Selectivity and Permeability of ZIF-7 Mixed Matrix Membranes," Applied Materials & Interfaces, Jan. 18, 2017.

Daniel Eiras et al., "Ultem®/ZIF-8 Mixed Matrix Membranes for Gas Separation: Transport and Physical Properties," 2016, vol. 19, No. 1, pp. 220-228.

* cited by examiner

FIG. 1A
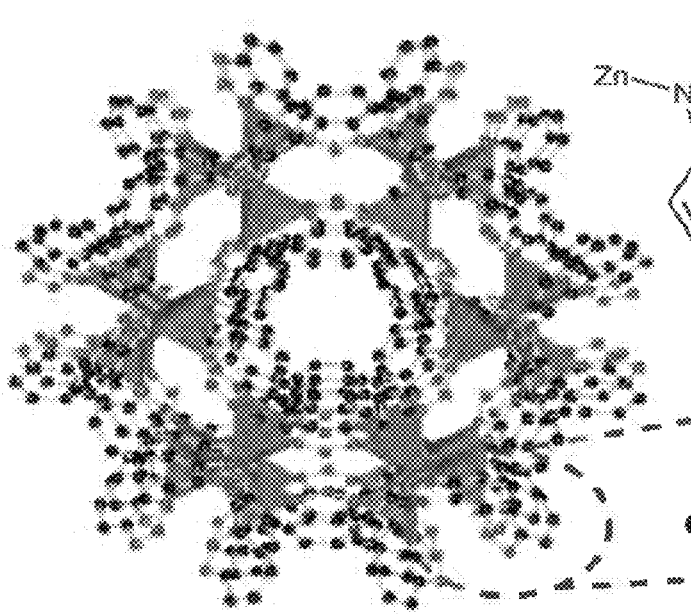
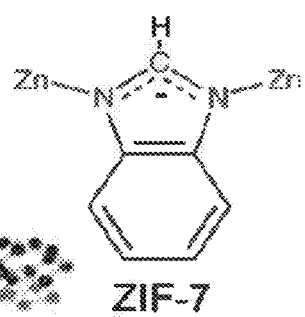
FIG. 1B
ZIF-7
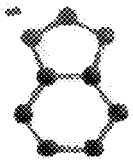
FIG. 1C
FIG. 1D
PSM-ZIF-7

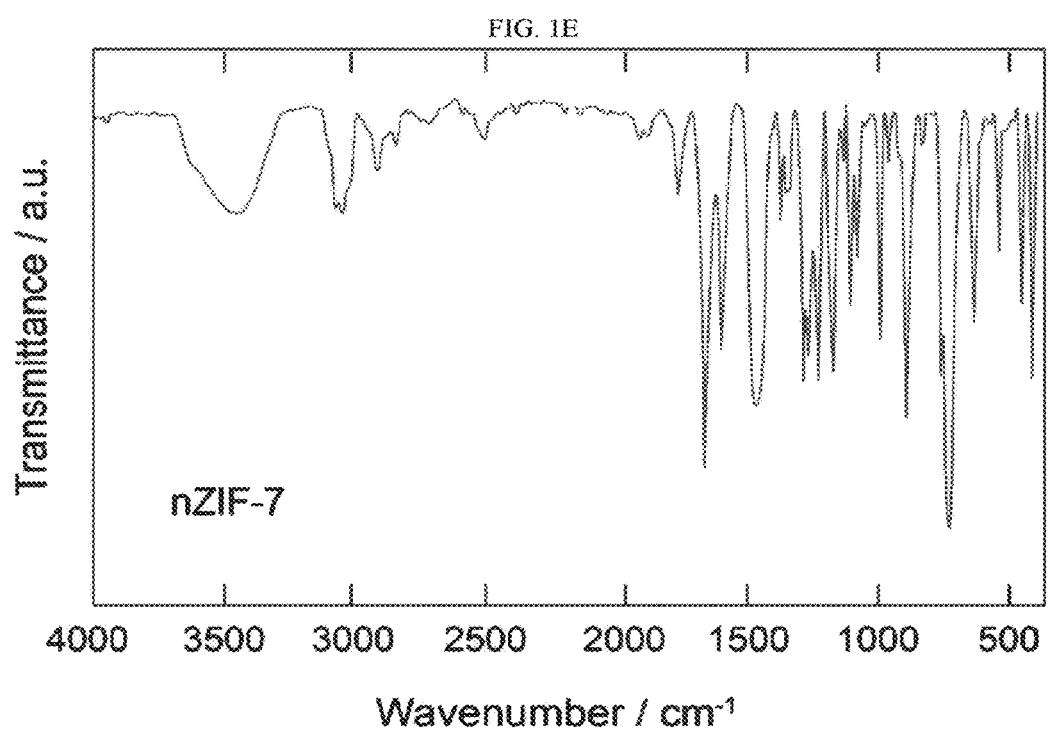

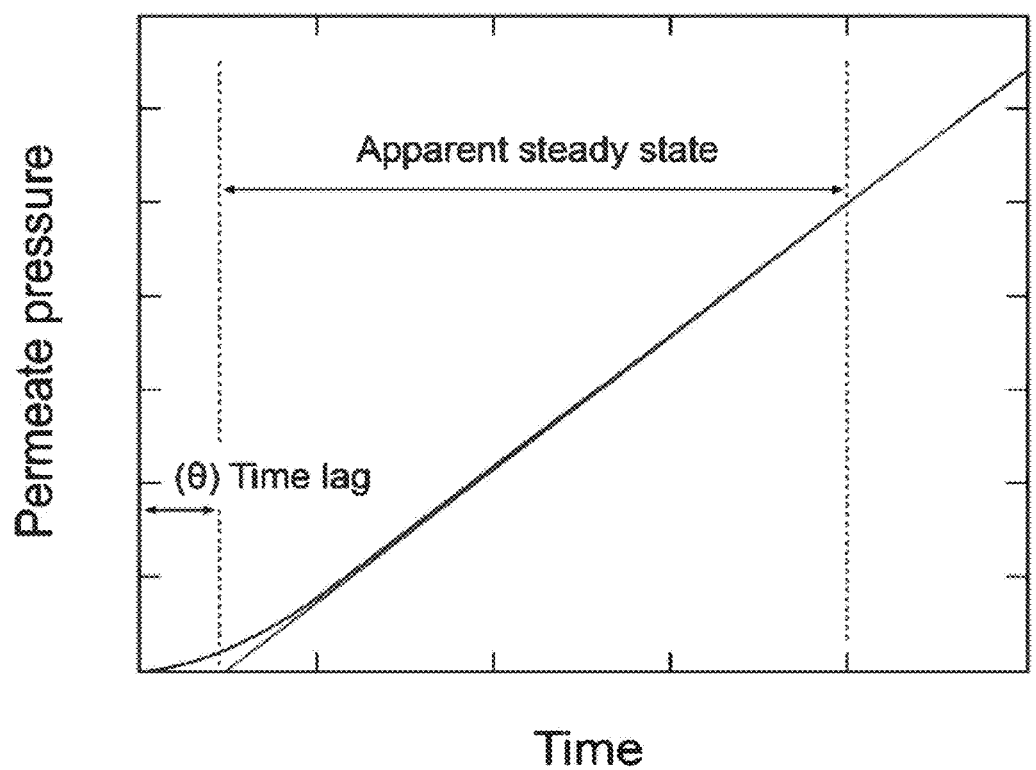

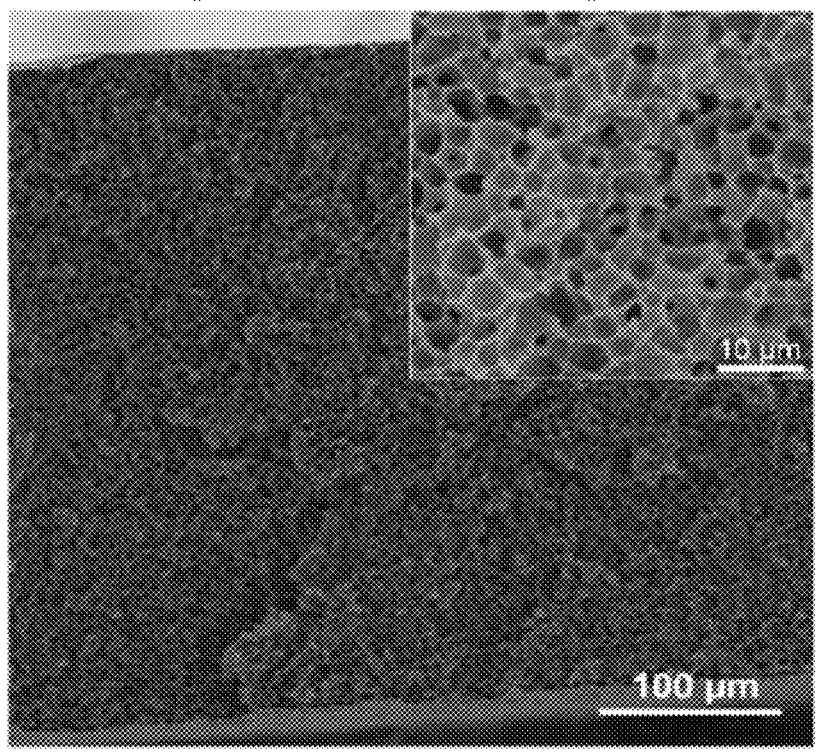

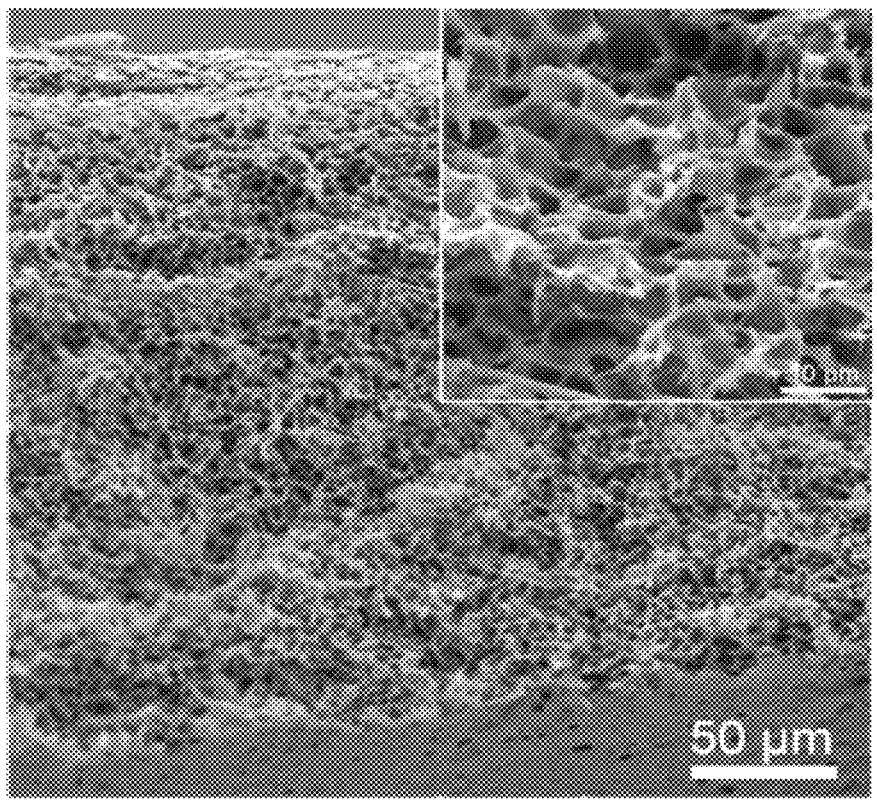

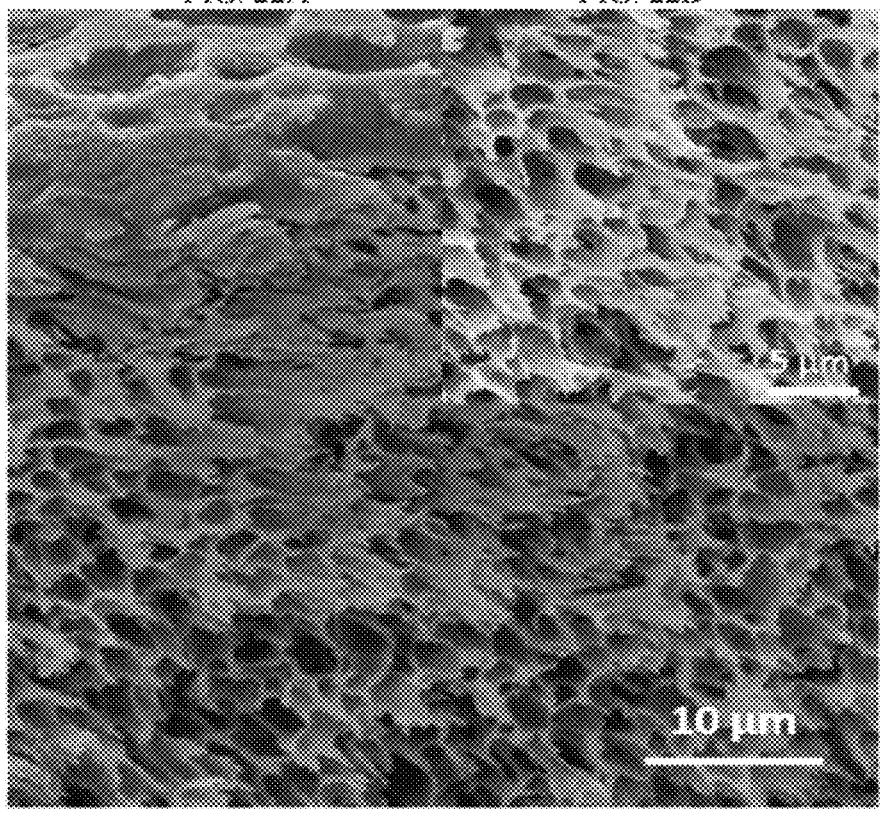

MIXED MATRIX MEMBRANE, A METHOD OF MAKING THEREOF, AND A METHOD FOR GAS SEPARATION

STATEMENT OF FUNDING ACKNOWLEDGEMENT

This project was funded by the King Abdulaziz City for Science and Technology (KACST) and King Fand University of Petroleum and Minerals (KFUPM) of Saudi Arabia, Project No. CCS-15.

STATEMENT REGARDING PRIOR DISCLOSURES BY THE INVENTORS

Aspects of this technology are described in an article "Tuning the Interplay between Selectivity and Permeability of ZIF-7 Mixed Matrix Membranes" by Bassem A. Al-Maythalony, Ahmed M. Alloush, Muhammed Faizan, Hatim Dafallah, Mohammed A. A. Elgzoly, Adam A. A. Seliman, Amir Al-Ahmed, Zain H. Yamani, Mohamed A. M. Habib, Kyle E. Cordova, and Omar M. Yaghi, in ACS Applied Materials & Interfaces, which is incorporated herein by reference in its entirety.

BACKGROUND

Field of the Disclosure

The disclosure is related to a mixed matrix membrane with a polymeric matrix and a nanoparticle filler for gas separation applications. A method of making the mixed matrix membrane is also disclosed.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Membranes for gas separation processes are becoming increasingly important for their potential in reducing energy requirements, and operation and infrastructure costs (Seoane, B.; Coronas, J.; Gascon, I.; Benavides, M. E.; Karvan, O.; Caro, J.; Kaptejin, F.; Gascon, J., Metal-organic framework based mixed matrix membranes: a solution for highly efficient $CO_2$ capture? Chem. Soc. Rev. 2015, 44, 2421-2454; Anderson, M.; Wang, H.; Lin, Y. S., Inorganic membranes for carbon dioxide and nitrogen separation. Rev. Chem. Eng. 2012, 28, 101-121; Denny Jr., M. S.; Moreton, J. C.; Benz, L.; Cohen, S. M., Metal-organic frameworks for membrane based separations. Nat. Rev. Mater. 2016, 1, 16078; Qiu, S.; Xue, M.; Zhu, G., Metal-organic framework membranes: from synthesis to separation application. Chem. Soc. Rev. 2014, 43, 6116-6140; Venna, S. R. and Carreon, M. A., Metal-organic framework membranes for carbon dioxide separation. Chem. Eng. Sci. 2015, 124, 3-19; and Shah, M.; McCarthy, M. C.; Sachdeva, S.; Lee, A. K.; Jeong, H.-K., Current status of metal-organic framework membranes for gas separations: promises and challenges. Ind. Eng. Chem. Res. 2012, 5, 12179-2199, each incorporated herein by reference in their entirety). Polymers are useful materials for membranes because polymers can be processed into different forms and have the flexibility to withstand operational stress (Baker, R. W., Future directions of membrane gas separation technology. Ind. Eng. Chem. Res. 2002, 41, 1393-1411; and Robeson, L. M., The upper bound revisited. J. Membr. Sci. 2008, 320, 390-400, each incorporated herein by reference in their entirety). Control of the gas permeability and selectivity of the membranes, and correlating these parameters with the underlying molecular structure of the polymers represent some of the key challenges in the field. To address these challenges, mixed matrix membranes (MMMs), in which porous inorganic nanoparticles are embedded within a polymer to introduce openness in an otherwise dense matrix, is a promising approach (Zhang, Y.; Feng, X.; Yuan, S.; Zhou, J.; Wang, B., Challenges and recent advances in MOF-polymer composite membranes for gas separation. Inorg. Chem. Front. 2016, 3, 896-909; Aroon, M. A.; Ismail, A. F.; Matsuura, T.; Montazer-Rahmati, M. M., Performance studies of mixed matrix membranes for gas separation—A review. Sep. Purif. Technol. 2010, 75, 229-242; Chung, T.-S.; Jiang, L. Y.; Kuprathipanja, S., Mixed matrix membranes comprising organic polymers with dispersed inorganic fillers for gas separation. Prog. Polym. Sci. 2007, 32, 483-507; and Adams, R.; Carson, C.; Ward, J.; Tannenbaum, R.; Koros, W., Metal-organic framework mixed matrix membranes for gas separations. Microporous Mesoporous Mater. 2010, 131, 13-20, each incorporated herein by reference in their entirety). In this context, it is paramount to use porous nanoparticles that are amenable to functionalization by changing the electronic and steric character of their constituents. Accordingly, nanocrystals of zeolitic imidazolate frameworks (nZIFs) are potentially ideal materials to serve as components in the mixed matrix membranes (Bae, T.-H.; Lee, J. S.; Qiu, W.; Koros, W. J.; Jones, C. W.; Nair, S., A high-performance gas-separation membrane containing submicrometer-sized metal-organic framework crystals. Angew. Chem. Int. Ed. 2010, 49, 9863-9866; Wang, Z.; Wang, D.; Zhang, S.; Hu, L.; Jin, J., Interfacial design of mixed matrix membranes for improved gas separation performance. Adv. Mater. 2016, 28, 3399-3405; Zomoza, B.; Seoane, B.; Zamaro, J. M.; Tellez, C.; Coronas, J., Combination of MOFs and zeolites for mixed matrix membranes. ChemPhysChem 2011, 12, 2781-2785; Yang, T.; Xiao, Y.; Chung, T.-S., Poly-/metal-benzimidazole nano-composite membranes for hydrogen purification. Energy Environ. Sci. 2011, 4, 4171-4180; Song, Q.; Natarj, S. K.; Roussenova, M. V.; Tan, J. C.; Hughes, D. J.; Li, W.; Bourgoin, P.; Alam, M. A.; Cheetham, A. K.; Al-Muhtaseb, S. A.; Sivaniah, E., Zeolitic imidazolate framework (ZIF-8) based polymer nanocomposite membranes for gas separation. Energy Environ. Sci. 2012, 5, 8359-8369; Wu, X.; Niknam Shahrak, M.; Yuan, B.; Deng, S., Synthesis and characterization of zeolitic imidazolate framework ZIF-7 for CO2 and CH4 separation. Microporous Mesoporous Mater. 2014, 190, 189-196; Li, T.; Pan, Y.; Peinemann, K.-V.; Lai, Z., Carbon dioxide selective mixed matrix composite membrane containing ZIF-7 nano-fillers. J. Membr. Sci. 2013, 425-426, 235-242; Yang, T.; Shi, G. M.; Chung, T.-S., Symmetric and asymmetric zeolitic imidazolate frameworks (ZIFs)/polybenzimidazole (PBI) nano-composite membranes for hydrogen purification at high temperatures. Adv. Energy Mater. 2012, 2, 1358-1367; Yang, T. X. and Chung, T. S., Room-temperature synthesis of ZIF-90 nanocrystals and the derived nano-composite membranes for hydrogen separation. J. Mater. Chem. A 2013, 1, 6081-6090; Nafisi, V. and Hagg, M. B., Development of dual layer ZIF-8/PEBAX-2533 mixed matrix membrane for CO2 capture. J. Membr. Sci. 2014, 459, 244-255; Bhaskar, A.; Banerjee, R.; Kharul, U., ZIF-8@PBI-BuI composite membranes: elegant effects of PBI structural variations on gas permeation performance. J. Mater. Chem. A 2014, 2, 12962-12967; Fang, M.; Wu, C.; Yang, Z.; Wang, T.; Xia, Y.; Li, J., ZIF-8/PDMS mixed matrix membranes for propane/nitrogen mixture separation: Experimental result and permeation model. J. Membr. Sci. 2015, 474, 103-113; Al-Maythalony, B. A.; Shekhah, O.; Swaidan, R.; Belmabkhout, Y.; Pinnau, I.; Eddaoudi, M., Quest for anionic MOF membranes: Continuous sod-ZMOF membrane with CO2 adsorption-driven selectivity. J. Am. Chem. Soc. 2015, 137, 1754-1757, each incorporated herein by reference in their entirety). ZIFs are metal-organic structures based on zeolite topologies, where the metal and the organic (imidazolates) components can be varied and, especially for the imidazolates, precisely functionalized without changing the topology of the overall structure (Eddaoudi, M.; Sava, D. F.; Eubank, J. F.; Adil, K.; Guillerm, V., Zeolite-like metal-organic frameworks (ZMOFs): design, synthesis, and properties. Chem. Soc. Rev. 2015, 44, 228-249; Nguyen, N. T. T.; Furukawa, H.; Gándara, F.; Nguyen, H. T.; Cordova, K. E.; Yaghi, O. M., Selective capture of carbon dioxide under humid conditions by hydrophobic chabazite-type zeolitic imidazolate frameworks. Angew. Chem. Int. Ed. 2014, 53, 10645-10648; Nguyen, N. T.; Lo, T. N. H.; Kim, J.; Nguyen, H. T. D.; Le, T. B.; Cordova, K. E.; Furukawa, H., Mixed-metal zeolitic imidazolate frameworks and their selective capture of wet carbon dioxide over methane. Inorg. Chem. 2016, 55, 6201-6207, incorporated herein by reference in its entirety).

In view of the foregoing, it is an objective of the present disclosure to provide a mixed matrix membrane with a high selectivity.

SUMMARY OF THE DISCLOSURE

The foregoing paragraphs have been provided by way of general introduction, and are not intended to limit the scope of the following claims. The described embodiments, together with further advantages, will be best understood by reference to the following detailed description taken in conjunction with the accompanying drawings.

A first aspect of the disclosure relates to a membrane, comprising, consisting essentially of, or consisting of a matrix polymer, and 0.1 to 50 wt % of a nanoparticle filler based on a total weight of the membrane, which is embedded in the matrix. The nanoparticle filler comprises a ligand exchange product of a metal-organic framework and a ligand represented by formula (I) or formula (II):

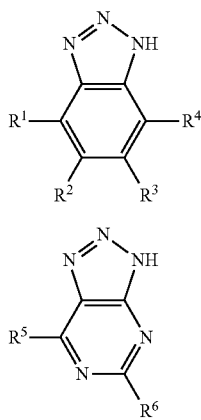

where $R_1$, $R_2$, $R_3$, $R_4$, $R_5$, and $R_6$ are independently a hydrogen, fluoro, chloro, bromo, iodo, cyano, nitro, an optionally substituted $C_1$-$C_3$ alkyl group, an optionally substituted $C_3$-$C_4$ cycloalkyl group, and the metal-organic framework comprises at least one metal selected from the group consisting of an alkaline earth metal, a transition metal, and a post-transition metal.

In one embodiment, the membrane comprises pores which are irregularly-shaped.

In one embodiment, the pores have an average diameter in a range of 0.5-5 µm.

In one embodiment, the polymer is at least one selected from the group consisting of a polysulfone, a polyetherimide, a polyethylenimine, a polyether block amide, a polyimide, a polyether ether ketone, and a sulfonated polyether ether ketone.

In one embodiment, the polymer is the polyetherimide.

In one embodiment, the membrane comprises 1-10 wt % of the nanoparticle filler.

In one embodiment, the nanoparticle filler is porous.

In one embodiment, the nanoparticle filler is substantially spherical with an average diameter in a range of 40-70 nm.

In one embodiment, the nanoparticle filler has a BET surface area in a range of 250-400 m²/g.

In one embodiment, the at least one metal is the post-transition metal.

In one embodiment, the at least one post-transition metal is zinc.

In one embodiment, the metal-organic framework is ZIF-7.

In one embodiment, the ligand is represented by formula (I), and $R_1$, $R_2$, $R_3$, and $R_4$ are each a hydrogen.

In one embodiment, a permselectivity of the membrane for carbon dioxide over a gas selected from the group consisting of oxygen, nitrogen, methane, ethane, and propane is in a range of 4-25.

A second aspect of the disclosure relates to a method for making the membrane of the first aspect, the method comprising, consisting essentially of, or consisting of: (i) suspending the nanoparticle filler in a solvent thereby forming a first suspension, (ii) dissolving the polymer in the solvent thereby forming a solution, (iii) mixing the first suspension with the solution thereby forming a second suspension, and (iv) casting the second suspension thereby forming the membrane.

In one embodiment, the solvent is dimethylacetamide.

In one embodiment, the solution comprises 10-30 wt % of the polymer, relative to a weight of the second suspension.

In one embodiment, the first suspension comprises 0.1-50 wt % of the nanoparticle filler, relative to the weight of polymer.

In one embodiment, the polymer is dissolved at 35-60° C. under reduced pressure for a duration in a range of 10-30 hours, and the first suspension is mixed with the solution for a duration in a range of 1-10 hours at 35-60° C. under reduced pressure.

A third aspect of the disclosure relates to a method for separating a gas from a fluid stream comprising the gas, the method comprising, consisting essentially of, or consisting of contacting the fluid stream with the membrane of the first aspect thereby causing the gas to permeate the membrane and be separated from the fluid stream, wherein the gas is at least one selected from the group consisting of hydrogen, oxygen, and carbon dioxide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A shows a single crystal X-ray structure of a nanocrystal of ZIF-7 (nZIF-7).

FIG. 1B shows the chemical structure of a repeating unit in nZIF-7.

FIG. 1C is a ball-and-stick model of the repeating unit in nZIF-7.

FIG. 1D shows the chemical structure of a repeating unit in a post-synthetically modified nZIF-7 (PSM-nZIF-7).

FIG. 1E is a graph illustrating a Fourier transform infrared (FTIR) spectrum of nZIF-7.

FIG. 3 is a graph illustrating the general expression of time lag and steady state criteria found through CV/VP measurements.

FIG. 19A is a scanning electron micrograph of a cross section of a pure polyetherimide (PEI) membrane.

FIG. 19B is a scanning electron micrograph of the cross section of the PEI membrane.

FIG. 21A is a scanning electron micrograph of a cross section of the 5 wt % PSM-nZIF-7/PEI mixed matrix membrane.

FIG. 21B is a scanning electron micrograph of the cross section of the 5 wt % PSM-nZIF-7/PEI mixed matrix membrane.

FIG. 22A is a scanning electron micrograph of a cross section of the 25 wt % nZIF-7/PEI mixed matrix membrane.

FIG. 22B is a scanning electron micrograph of the cross section of the 25 wt % nZIF-7/PEI mixed matrix membrane.

DETAILED DESCRIPTION OF THE DISCLOSURE

Figure 2A:
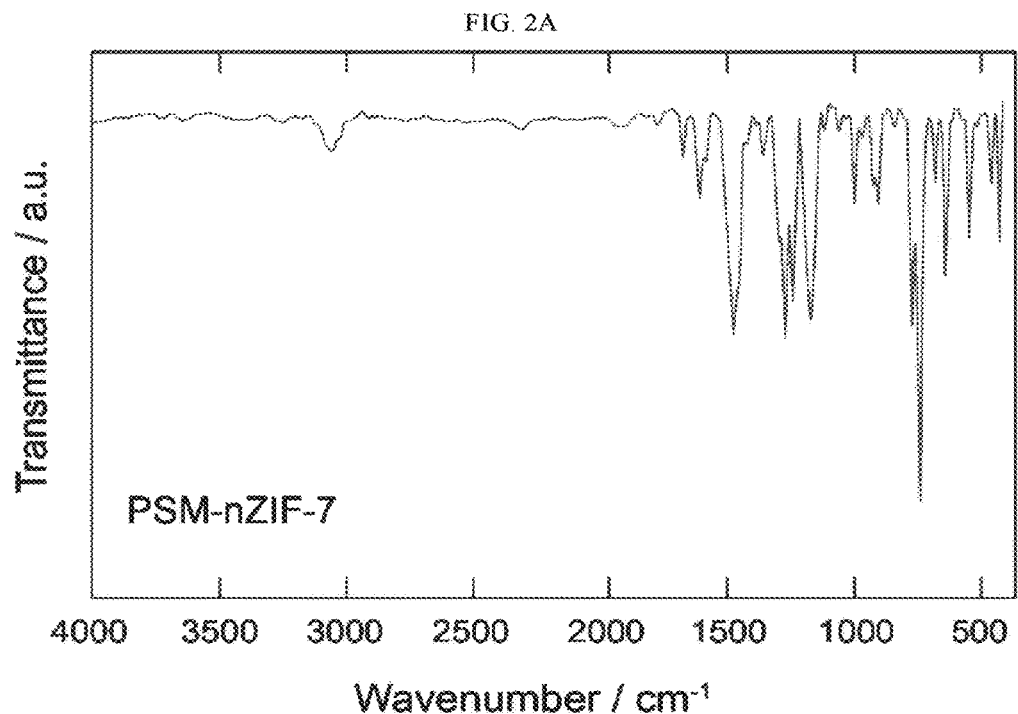
FIG. 2A is a graph illustrating a FTIR spectrum of PSM-nZIF-7.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

The membrane, matrix, nanoparticle filler, or methods disclosed herein can "comprise", "consist essentially of", or "consist of" particular components, compositions, method steps disclosed throughout the specification. A membrane consisting essentially of the components as defined herein would not exclude other materials that do not materially affect the basic and novel characteristic(s) of the membrane. For example, other components may be included in the membrane so long as the other components do not substantially change the ideal selectivity, permselectivity, and/or the permeability of the membrane. As used herein, the term "mixed matrix membrane" (or MMM) refers to a polymeric membrane which is loaded with particulate fillers.

The first aspect of the disclosure relates to a membrane, which comprises a matrix comprising a polymer, and 0.1-50 wt %, 0.5-40 wt %, 1-30 wt %, 2-20 wt %, or 4-10 wt % of a nanoparticle filler based on a total weight of the membrane. The amount of the nanoparticle filler in the membrane may vary depending upon the properties sought (e.g., gas permeability, porosity of the membrane, and/or ideal selectivity or permselectivity of the membrane) as well as the dispersibility of the nanoparticle filler in the matrix.

The membrane may contain pores which are isolated or are part of a network of pores (i.e., a plurality of interconnected pores). In some embodiments, a cross section of the membrane resembles a sponge. When compared to commonly reported dense membranes, this sponge-like structural feature is advantageous in that it allows for high flux permeation as well as the ability to perform multi-stage separation processes across one membrane (Hilal, N.; Ismail, A. F.; Wright, C., Membrane fabrication, CRC Press, 2015; Wang, Z.; Ma, J.; Liu, Q., Pure sponge-like membranes bearing both high water permeability and high retention capacity. Desalination 2011, 278, 141-149, each incorporated herein by reference in their entirety).

The pores of the membrane may have a regular shape, for example, a shape of a circle, an oval, or a polygon (e.g., triangle, rectangle, hexagon, rhombus, trapezium, parallelogram, pentagon, heptagon, octagon, nonagon, decagon, undecagon, and dodecagon). The polygon may be regular (i.e., all sides equal in length and all equal internal angles), convex (i.e., no internal angle is more than 180°), or concave. In some embodiments, the pores may have an irregular shape in which each side has a different length and/or each side has a different curvature. For example, in an irregular shape with a first side, a second side, and a third side, the first and the second sides is a straight line, and the third is a curve. Further, the a length of the first side is 1-50%, 5-40%, or 10-30% longer than a length of the second side.

The membrane may be macroporous, mesoporous, or microporous. The term "microporous" means the pores of the membrane have an average pore diameter of less than 2 nm. The term "mesoporous" means the pores of the membrane have an average pore diameter of 2-50 nm. The term "macroporous" means the pores of the membrane have an average pore diameter larger than 50 nm. In one embodiment, the membrane is macroporous, and an average pore diameter is in a range of 0.5-5 µm, 1-4 pin, or 1.5-3 µm. In another embodiment, an average pore diameter is in a range of 1-10 nm, 1-5 nm, 1-3 nm, preferably 1.5-2.5 nm. A porosity of the membrane may be at least 10 vol %, at least 20 vol %, at least 30 vol %, at least 40 vol %, or at least 50 vol %, and up to 99.9 vol %, up to 99 vol %, up to 90 vol %, up to 85 vol %, up to 80 vol %, or preferably up to 75 vol %, based on a total volume of the membrane. In one embodiment, the porosity is calculated by taking a photograph of a cross section of the membrane, measuring a total void area using the photograph, and calculating the porosity as a ratio of void area with respect to an entire cross sectional area of the membrane. In this embodiment, the "areal" and "volumetric" porosities are equal for a porous media with a random structure. Alternatively, the porosity may be measured and/or calculated using $N_2$ adsorption/desorption isotherms (e.g., using Barret-Joyner-Halenda or non-local density functional theory), permporometry methods, industrial computed tomography scanning, and imbibition methods.

A surface roughness of the membrane may range from 0.01-10 nm, 0.01-5 nm, 0.01-1 nm, 0.01-0.4 nm, 0.05-0.4 nm, 0.05-0.3 nm, 0.05-0.2 nm, or 0.05-0.1 nm. The membrane may have a BET surface area in a range of 50-2,000 m²/g, 200-1,500 m²/g, or 500-1,000 m²/g.

The membrane may be freestanding or supported on or by a substrate. The membrane may be a thin film membrane, a flat sheet membrane, a spiral membrane, a tubular membrane, or a hollow fiber membrane. The membrane may be in the form of various shapes, for example, flat (e.g., for a disc-shaped membrane), bent, curved (e.g., a cylinder shaped membrane), and rippled. The shape of the membrane may be constructed by forming or shaping the substrate for a particular application, then coating the substrate by the methods discussed hereinafter. In one embodiment, the membrane is a thin film membrane and has a thickness of 200-500 μm, 250-450 μm, or 300-400 μm. In some embodiments where the membrane is disc-shaped, a diameter of the membrane may be 10-100 mm, 11-80 mm, or 12-50 mm. In some embodiments, the membrane is in a form of a rectangular sheet having a width of 2-110 cm, 10-70 cm, or 20-60 cm. A length of the rectangular sheet may range from 10 cm to 122 m, 100 cm to 50 m, 1 m to 20 m, or 5 m to 10 m.

The substrate may be macroporous and may establish the lateral dimensions and shape of the membranes as they are being formed. Further, the substrate provides the finished membrane with structural stability.

Examples of materials from which the substrate can be made are ceramics, glass, metals, and polymers. Exemplary ceramics include, without limitation, $\alpha$-$Al_2O_3$, $\gamma$-$Al_2O_3$, $\eta$-$Al_2O_3$, $\theta$-$Al_2O_3$, $\chi$-$Al_2O_3$, $\kappa$-$Al_2O_3$, $\delta$-$Al_2O_3$, silica, titania, magnesia, zirconia, and combinations thereof. Exemplary metals include, without limitation, gallium, germanium, stainless steel, titanium, and combinations thereof. Exemplary polymers include, without limitation, polysulfones, polyether sulfones, polyacrylonitriles, cellulose esters, polypropylenes, polyvinyl chlorides, polyvinylidene fluorides, polyarylether ketones, polyamides (e.g., nylons), and polyesters. A wide variety of suitable substrates are either available commercially or may be prepared using techniques known to those of ordinary skill in the art.

The substrate may be present in an amount of at least 60%, at least 70%, at least 80%, at least 90%, at least 95%, or at least 98% by weight based on a combined weight of the membrane and the substrate.

While the substrate may serve a filtering function by size exclusion, its filtering characteristics (if any) may be substantially more coarse than those of the membrane itself. In most cases involving a polymeric substrate, it may be convenient to use a substrate with a molecular weight cutoff (MWCO) of from 1 kDa to 10 MDa, and preferably from 5 kDa to 300 kDa. An example of a polymeric substrate presently contemplated is a polysulfone with MWCO of 10 kDa to 1 MDa, and preferably a polysulfone with MWCO of 300 kDa. In terms of pore size, the support can have pores with an average diameter in a range of 100 nm to 50 μm, 500 nm to 20 μm, or 1-10 μm in diameter. The pore sizes should be sufficiently large so that a permeate solvent can pass through the support without reducing the permeability of the membrane. However, the pores should not be so large that the membrane will either be unable to bridge or form across the pores, or tend to fill up or penetrate too far into the pores, thus producing an effectively thicker membrane than the thickness described herein.

Preferred substrates are those that are capable of withstanding the pressure differential imposed across the combined support and membrane during use. The pressure differential may range from 1-85 atm, 2-20 atm, or 5-10 atm.

The membrane may have a permeability of at least 100 barrer, at least 200 barrer, at least 500 barrer, at least 1,000 barrer, at least 1,500 barrer and up to 5,000 barrer, up to 4,000 barrer, up to 3,000 barrer, or up to 2,500 barrer, for hydrogen gas. The membrane may have a permeability of at least 0.5 barrer, at least 10 barrer, at least 50 barrer, at least 100 barrer, and up to 300 barrer, up to 250 barrer, or up to 200 barrer, for nitrogen gas. The membrane may have a permeability of at least 0.5 barrer, at least 10 barrer, at least 50 barrer, at least 100 barrer, or at least 150 barrer, and up to 500 barrer, up to 450 barrer, or up to 300 barrer, for oxygen gas. The membrane may have a permeability of at least 0.5 barrer, at least 5 barrer, at least 10 barrer, or at least 50 barrer, and up to 200 barrer, up to 150 barrer, or up to 120 barrer, for methane, ethane, and/or propane. The membrane may have a permeability of at least 0.5 barrer, at least 10 barrer, at least 50 barrer, or at least 100 barrer, and up to 400 barrer, up to 350 barrer, or up to 280 barrer, for carbon dioxide gas. The permeability measurements may be taken at an upstream pressure of 1.1-5 bar, 1.5-4 bar, or 1.8-2.5 bar, and the membrane may be pre-evacuated at 20-50° C., 30-45° C., or 33-40° C.

Barrer is a non-SI unit of gas permeability used in the membrane technology.

$$1 \text{ barrer} = 10^{-10} \frac{cm_{STP}^3 \cdot cm}{cm^2 \cdot s \cdot cmHg}$$

Here, the term "$cm^3_{STP}$" is standard cubic centimeter, which is a unit of amount of gas rather than a unit of volume. It represents the amount of gas molecules or moles that would occupy one cubic centimeter at standard temperature and pressure, as calculated via the ideal gas law. The term "cm" corresponds, in the permeability equations, to the thickness of the material whose permeability is being evaluated, the term "$cm^3_{STP} \, cm^{-2} s^{-1}$" corresponds to the flux of gas through the material, and the term "cmHg" corresponds to the pressure drop across the material. Thus, barrer is a measure of the rate of fluid flow through an area of material with a thickness driven by a given pressure. In SI units, 1 Barrer is equivalent to $3.34 \times 10^{-16}$ mol $Pa^{-1}$ $s^{-1}$ $m^{-1}$.

The membrane may have a permeability which is at least 1.1 times, at least 1.2 times, or at least 1.3 times, and up to 5 times, up to 4 times, or up to 2 times the gas permeability of a pure polymeric membrane (i.e., a membrane without the nanoparticle filler). The membrane may have a permeability which is at least 3 times, at least 5 times, or at least 6 times, and up to 500 times, up to 400 times, up to 200 times, up to 100 times, up to 50 times, or up to 10 times the gas permeability of a mixed matrix membrane that does not contain the ligand exchange product described herein.

As used herein, the term "ideal selectivity" refers to a ratio between the permeability of the gases. The ideal selectivity of $O_2/N_2$ of the membrane may be at least 1.2, at least 1.5, at least 3, at least 4, and up to 8, up to 7, or up to 6. The ideal selectivity of $O_2/N_2$ may be at least 1.1 times, at least 1.3 times, at least 2 times, or at least 3 times, and up to 6 times, up to 5 times, or up to 4 times the Knudsen diffusion selectivity, which is 1.1. The ideal selectivity of $H_2/O_2$ of the membrane may be at least 2, at least 5, or at least 6, and up to 15, up to 12, or up to 9. The ideal selectivity of $H_2/N_2$ of the membrane may be at least 4, at least 8, or at least 10, and up to 20, up to 15, or up to 12. The ideal selectivity of $H_2/CO_2$ of the membrane may be at least 2, at least 5, or at least 6, and up to 15, up to 12, or up to 10. The ideal selectivity of $H_2/CH_4$ of the membrane may be at least 5, at least 10, or at least 12, and up to 40, up to 30, or up to 20. The ideal selectivity of $H_2/C_2H_6$ of the membrane may be at least 5, at least 10, or at least 20, and up to 50, up to 40, or up to 30. The ideal selectivity of $H_2/C_3H_8$ of the membrane may be at least 10, at least 20, or at least 30, and up to 70, up to 60, or up to 50. The ideal selectivity of $CO_2/O_2$ of the membrane may be at least 0.1, at least 0.3, or at least 0.5, and up to 4, up to 3, or up to 1.5. The ideal selectivity of $CO_2/N_2$ of the membrane may be at least 0.1, at least 0.3, or at least 0.5, and up to 4, up to 3, or up to 1.5. The ideal selectivity of $CO_2/CH_4$ of the membrane may be at least 0.1, at least 0.3, or at least 0.5, and up to 4, up to 3, or up to 2.5. The ideal selectivity of $CO_2/C_2H_6$ of the membrane may be at least 0.1, at least 0.5, or at least 2, and up to 6, up to 5, or up to 4. The ideal selectivity of $CO_2/C_3H_8$ of the membrane may be at least 0.5, at least 1, or at least 3, and up to 8, up to 7, or up to 6. The ideal selectivity of $N_2/CH_4$ of the membrane may be at least 0.1, at least 0.5, or at least 1, and up to 4, up to 3, or up to 2.

The membrane may have an ideal selectivity of $H_2/CO_2$ and/or $N_2/CH_4$ which is at least 1.1 times, at least 1.5 times, or at least 2 times, and up to 5 times, up to 4 times, or up to 3 times the ideal selectivity of $H_2/CO_2$ and/or $N_2/CH_4$ of a mixed matrix membrane without the ligand exchange product. The membrane may have an ideal selectivity of $N_2/CH_4$ and/or $CO_2/N_2$ which is at least 1.1 times, at least 1.2 times, or at least 1.4 times, and up to 4 times, up to 3 times, or up to 2 times the ideal selectivity of $N_2/CH_4$ and/or $CO_2/N_2$ of a pure polymeric membrane.

The matrix comprising the polymer may be a continuous polymer matrix. The polymer provides a wide range of properties important for separations, and modifying the properties can improve membrane selectivity. A material with a high glass transition temperature ($T_g$), high melting point, and high crystallinity is preferred for most gas separations. Glassy polymers (i.e., polymers below their $T_g$) have stiffer polymer backbones and therefore let smaller molecules, such as hydrogen and helium, permeate the membrane more quickly and larger molecules, such as hydrocarbons, permeate the membrane more slowly. Preferably, the polymer is a rigid, glassy polymer. The polymer may have a weight average molecular weight ($M_w$) of $1\times10^4$ to $2\times10^7$ g/mol, $5\times10^4$ to $1.5\times10^7$ g/mol, or $1\times10^5$ to $1\times10^7$ g/mol. The polymer may have a polydispersity index (a measure of the width of molecular weight distribution) of 1 to 100, preferably 1 to 60, or 1 to 30.

Exemplary polymers include, without limitation, polyolefins, fluoropolymers (e.g., polyvinylidene fluoride (PVDF), polytetrafluoroethylene (PTFE)), polystyrene (e.g., isotactic polystyrene and syndiotactic polystyrene), thermoplastic elastomers (TPE), silicones (e.g., polydimethylsiloxane (PDMS) and polymethylphenylsilicone (PMPS)), polyacetylenes (e.g., polytrimethylsilylpropyne), polysulfones (e.g., poly(1,4-phenylene ether-ether-sulfone), poly(1-hexadecene-sulfone), poly(1-tetradecene-sulfone), poly(oxy-1,4phenylenesulfonyl-1,4-phenylene), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), polyphenylsulfone; polysulfonamides (e.g., poly[1-[4-(3-carboxy-hydroxyphenylazo)benzenesulfonamido]-1,2-ethanediyl]), sulfonated polysulfones; polyethersulfones (PESs); sulfonated PESs; polyacetals; polyethers; polyetherimides such as Ultem (or Ultem 1000) sold under the trademark Ultem®, manufactured by Sabic Innovative Plastics; polyethylenimine; polystyrenes, including styrene-containing copolymers such as acrylonitrilestyrene copolymers, styrene-butadiene copolymers and styrene-vinylbenzylhalide copolymers; polycarbonates; cellulosic polymers such as cellulose acetate, cellulose triacetate, cellulose acetate-butyrate, cellulose propionate, ethyl cellulose, methyl cellulose, and nitrocellulose; polyamides (e.g., Nylon 6, polyphthalamide, aromatic polyamides, and aliphatic polyamides); polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamide imides; polyketones; polyether ketones (e.g., polyether ether ketone, sulfonated polyether ether ketone); polyarylene oxide such as polyphenylene oxide, polyxylene oxide, sulfonated polyxylene oxide and brominated polyxylene oxide; polyesteramidediisocyanate; polyurethanes; polyurea; polyazomethines; polyesters (including polyarylates such as polyethylene terephthalate, polyphenylene terephthalate; polyalkyl methacrylate; polyacrylate; polysulfides; polyethylene; polypropylene; polybutene-1; poly(4-methyl pentene-1); polyvinyls, e.g., polyvinyl chloride, polyvinyl fluoride, polyvinylidene chloride, polyvinylidene fluoride, polyvinyl alcohol, polyvinyl ester (e.g., polyvinyl acetate and polyvinyl propionate), polyvinyl pyridine, polyvinyl pyrrolidone, polyvinyl ether, polyvinyl ketone, polyvinyl aldehyde (e.g., polyvinyl formal and polyvinyl butyral), polyvinyl amide, polyvinyl amine, polyvinyl urethane, polyvinyl urea, polyvinyl phosphate, and polyvinyl sulfate; polyallyls; polybenzimidazoles; polyhydrazides; polyoxadiazoles; polytriazoles; polybenzimidazole; polycarbodiimides; polyphosphazines; microporous polymers; polycarbonates; polybenzoxazoles; and copolymers, including block copolymers (e.g., polyether block amide, polyether esters, and polyetherimide-siloxane polymers) or containing repeating units from the above such as copolymers of acrylonitrile-vinyl bromide-sodium salt of para-sulfophenylmethallyl ethers; and grafts and blends containing any of the foregoing.

Exemplary polyolefins include, without limitation, polyethylene (PE), polypropylene (PP), poly(4-methyl-1-pentene) (PMP), polybutene-1 (PB-1), and polyisobutylenes (PIB). Exemplary polyethylene polymers include, without limitation, ultrahigh molecular weight polyethylene (UHMWPE), high density polyethylene (HDPE), medium density polyethylene (MDPE), low density polyethylene (LDPE), linear low density polyethylene (LLDPE), branched low density polyethylene (BLDPE), and ultralow density polyethylene (ULDPE). Exemplary polypropylene polymers include, without limitation, ultrahigh molecular weight polypropylene (UHMWPP), isotactic polypropylene (iPP), syndiotactic polypropylene (sPP), nucleated polypropylene, nucleated ultrahigh molecular weight polypropylene, high-crystalline polypropylene (HCPP), and high melt-strength polypropylene (HMS-PP).

In some embodiments, the polymer is at least one of poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly(3,3',4, 4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)), poly(3,3',4,4'-diphenylsulfone tetracarboxylic dianhydride-3,3',5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-TMMDA)), poly(3,3',4,4'-diphenylsulfone tetracarboxylic dianhydride-pyromellitic dianhydride-3,3',5,5'-tetramethyl-4,4'-methylene dianiline) (poly(DSDA-PMDA-TMMDA)), poly[2,2'-bis-(3,4-dicarboxyphenyl)hexafluoropropane dianhydride-1,3-phenylenediamine] (poly(6FDA-m-PDA)), poly[2,2'-bis-(3,4-dicarboxyphenyl)hexafluoropropane dianhydride, 3-phenylenediamine-3,5-diaminobenzoic acid)] (poly(6FDA-m-PDA-DABA)).

Preferably, the polymer is polyetherimide. In the context of the present disclosure, polyetherimide is abbreviated "PEI".

Microporous polymers (or polymers of intrinsic microporosity) are polymeric materials that possess microporosity that is intrinsic to their molecular structures (McKeown, et al., Chem. Commun., 2780 (2002); Budd, et al., Adv. Mater., 16:456 (2004); McKeown, et al., Chem. Eur. J., 11:2610 (2005), each incorporated herein by reference in its entirety). The microporous polymers have a rigid rod-like, randomly contorted structure to generate intrinsic microporosity. These microporous polymers exhibit behavior analogous to that of conventional microporous molecular sieve materials, such as large and accessible surface areas, interconnected intrinsic micropores of less than 2 nm in size, as well as high chemical and thermal stability, but, in addition, possess properties of conventional polymers such as good solubility and easy processability. Exemplary microporous polymers include, without limitation, PIM-1, PIM-7, PIM-polyimide (PIM-PI-1, PIM-PI-2, PIM-PI-3, PIM-PI-4, PIM-PI-7, and PIM-PI-8), PIM-EA-TB, PIM-6FDA-OH, and PIM-SBI-TB.

The nanoparticle filler comprises a ligand exchange product of a metal-organic framework and a ligand represented by formula (I) or formula (II):

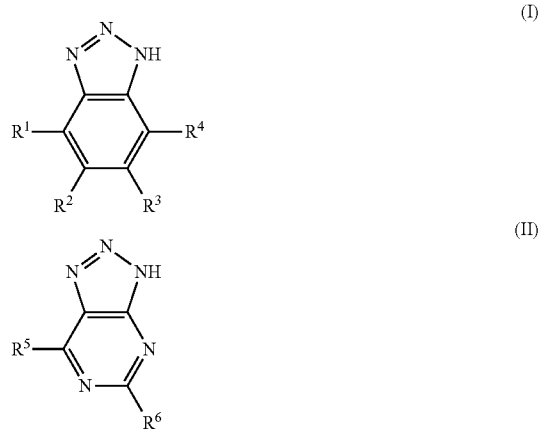

where $R_1$, $R_2$, $R_3$, $R_4$, $R_5$, and $R_6$ are independently a hydrogen, fluoro, chloro, bromo, iodo, cyano, nitro, an optionally substituted $C_1$-$C_3$ alkyl group, or an optionally substituted $C_3$-$C_4$ cycloalkyl group. Preferably, the ligand is represented by formula (I), and $R_1$, $R_2$, $R_3$, and $R_4$ are each a hydrogen.

The term "alkyl", as used herein, refers to a straight hydrocarbon fragment. Exemplary $C_1$-$C_3$ alkyl groups include methyl, ethyl, and propyl. The term "cycloalkyl", as used herein, refers to a cyclized alkyl group. Exemplary $C_3$-$C_4$ cycloalkyl groups include cyclopropyl and cyclobutyl. Branched cycloalkyl groups, such as 1-methylcyclopropyl and 2-methycyclopropyl groups, are included in the definition of cycloalkyl as used in the present disclosure.

As used herein, the term "substituted" refers to at least one hydrogen atom is replaced with a non-hydrogen group, provided that normal valencies are maintained and that the substitution results in a stable compound. When a R group (denoted as $R_1$, $R_2$, and so forth) is noted as "optionally substituted", the substituents are selected from the exemplary group including, but not limited to, halogen (e.g., chlorine, bromine, fluorine or iodine), alkoxy (i.e., straight chain alkoxy having 1 to 3 carbon atoms, and includes, for example, methoxy, ethoxy, and propoxy), hydroxy, amino, alkylamino, thiol, alkylthio, sulfonamido (e.g., —$SO_2NH_2$), substituted sulfonamide (e.g., —$SO_2NH$alkyl or cases where there are two alkyl substituents on one nitrogen), nitro, cyano, carboxy, carbamyl (e.g., —$CONH_2$), substituted carbamyl (e.g., —$CONH$alkyl or cases where there are two alkyl substituents on one nitrogen), and mixtures thereof. The substituents may be either unprotected, or protected as necessary, as known to those skilled in the art, for example, as taught in Greene et al., "Protective Groups in Organic Synthesis", John Wiley and Sons, Second Edition, 1991, hereby incorporated by reference in its entirety).

The metal-organic framework comprises at least one metal selected from the group consisting of an alkaline earth metal (e.g., beryllium, magnesium, calcium, strontium, barium, and radium), a transition metal (e.g., scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum, gold, rutherfordium, dubnium, seaborgium, bohrium, hassium, meitnerium, darmstadtium, roentgenium, and copernicium), and a post-transition metal (e.g., aluminum, indium, gallium, tin, bismuth, lead, thallium, zinc, cadmium, and mercury). Preferably, the at least one metal is zinc. The at least one metal may be present in a form of a cation (e.g., $Zn^{2+}$). The oxidation state of the metal may be determined by photoelectron spectroscopy (e.g., X-ray photoelectron spectroscopy and ultraviolet photoelectron spectroscopy). The metal may be bound (e.g., by a dative covalent bond, or an ionic bond) to at least one nitrogen atom on the ligand of formula (I) or (II). Preferably, the metal is coordinated to at least one of the nitrogen atoms in the triazole ring. Further, the metal may be bound to two nitrogen atoms in a manner exemplified by FIGS. 1B and 1D.

In most embodiments, the metal organic framework may comprise an imidazole-based ligand which may be less polar than the triazole-based ligand of formula (I) or (II). Exemplary imidazole-based ligands include, without limitation, imidazole, 2-methylimidazole, 2-nitroimidazole, benzimidazole, 5-nitro-1H-benzimidazole, purine, 5-chlorobenzimidazole, (1H-imidazol-2-yl)methanol, 1H-imidazole-2-carboxaldehyde, 4-methyl-5-imidazolecarboxaldehyde, 4-formylimidazole, and 4,5-imidazoledicarboxylic acid. The incorporation of an additional polar nitrogen atom within the chemical structure of the nanoparticle filler may result in a mixed matrix membrane with higher thermodynamic affinity for polarizable gases such as $CO_2$. The additional polar nitrogen atom may be uncoordinated or coordinated to the metal. The interaction between the metal and the ligand is described hereinafter.

Exemplary metal-organic frameworks include, without limitation, isoreticular metal organic framework-3 (IRMOF-3), ZIF-8-90, ZIF-8-90-EDA, MOF-69A, MOF-69B, MOF- 69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-8, ZIF-9, ZIF-10, ZIF-11, ZIF-12, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-74, ZIF-75, ZIF-76, ZIF-78, ZIF-90, ZIF-91, ZIF-92, ZIF-93, ZIF-96, ZIF-97, and ZIF-100.

Preferably, the metal-organic framework is a zeolite imidazolate framework (ZIF). An additional advantage to ZIF is that ZIF particles blend relatively well with organic polymers and, therefore, can be homogeneously mixed within the matrix. This feature is described hereinafter. Further, preferably the ZIF is ZIF-7.

A structure of the ligand exchange product of the metal-organic framework and the ligand represented by formula (I) or formula (II) may be ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, or ZON.

As used herein, the term "ligand exchange" refers to a type of chemical reaction in which a ligand in the metal-organic framework is replaced by the ligand of formula (I) or (II). The ligand exchange reaction may proceed as follows: the metal-organic framework particles may be suspended in a solution of the ligand of formula (I) or (II) thereby forming a suspension. The solution may include a solvent. As used herein, the term "solvent" includes, but is not limited to, organic solvents, such as ethers (e.g., diethyl ether, tetrahydrofuran, 1,4-dioxane, tetrahydropyran, t-butyl methyl ether, cyclopentyl methyl ether, di-iso-propyl ether), glycol ethers (e.g., 1,2-dimethoxyethane, diglyme, triglyme), alcohols (e.g., methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol,3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g., benzene, o-xylene, m-xylene, p-xylene, and mixtures of xylenes, toluene, mesitylene, anisole, 1,2-dimethoxybenzene, α,α,α,-trifluoromethylbenzene, fluorobenzene), chlorinated solvents (e.g., chlorobenzene, dichloromethane, 1,2-dichloroethane, 1,1-dichloroethane, chloroform), ester solvents (e.g., ethyl acetate, propyl acetate), amide solvents (e.g., dimethylformamide, dimethylacetamide, N-methyl-2-pyrrolidone, formamide, and 2-pyrrolidone), urea solvents, ketones (e.g., acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. A concentration of the ligand of formula (I) or (II) may range from 10-5,000 mg/ml, 30-2,500 mg/ml, 60-1,000 mg/ml, or 80-200 mg/ml. A concentration of the metal-organic framework particles in the suspension may range from 1-5,000 mg/ml, 10-2,500 mg/ml, 50-1,000 mg/ml, or 100-500 mg/ml. The suspension may be agitated at a temperature of 20-60° C., 30-55° C., or 40-50° C., for 10-300 hours, 20-200 hours, or 40-100 hours. Methods of agitation include, without limitation, swirling the suspension by hand, stirring the suspension with a magnetic stir plate or a mechanical stirrer, shaking the suspension with a rotary shaker, sonicating the solution using an ultrasonic bath or an ultrasonic probe. In one embodiment, the suspension is left to stand. An external heat source, such as a water bath or an oil bath, an oven, microwave, a thermostatted thermocirculator, or a heating mantle, may be employed to heat the suspension. The solution of the ligand may be replaced every 5-30 hours, 10-25 hours, or 15-24 hours. That is, the spent ligand solution may be removed and a fresh solution of the same ligand concentration is added. The nanoparticle filler may be collected by centrifuging or filtering the suspension. The linker exchange process may be monitored by $^1$H and $^{13}$C NMR. The nanoparticle filler may be digested with a deuterated mineral acid (e.g., DCl, $D_2SO_4$) and mixed with an deuterated solvent (e.g., DMSO-$d_6$, DMF-$d_6$) prior to NMR experiments. The yield of the ligand exchange may be at least 40%, at least 50%, at least 60%, at least 70%, at least 80%, at least 90%, at least 95%, or at least 99%.

In some embodiments, the nanoparticle filler comprises a reaction product of a metal salt and the ligand of formula (I) or (II). Exemplary metal salts include halides (e.g., fluoride, chloride, bromide, and iodide), nitrates, acetylacetonates, acetates, perchlorates, sulfamates, trifluoroacetylacetonates, carbonates, bicarbonates, methanesulfonates, ethanesulfonates, p-toluenesulfonates, salicylates, malates, maleates, succinates, tartrates, citrates, trifluoromethanesulfonates (triflates), hexafluorophosphates, hexafluoroacetylacetonates, sulfites, phosphates, and sulfates of the at least one metal. In most embodiments, the metal salt is a hydrate.

The reaction product of the metal salt and the ligand of formula (I) or (II) may be prepared as follows: the metal salt and the ligand of formula (I) or (II) may be separately dissolved in the solvent described herein and then the solutions are mixed together. A concentration of the metal salt solution may be in a range of 0.1-500 mM, 1-200 mM, or 10-100 mM. A concentration of the ligand solution may be in a range of 0.1-1,000 mM, 1-800 mM, or 10-400 mM. Alternatively, the metal salt and the ligand of formula (I) or (II) may be dissolved together in the solvent. The mixture may then be agitated at a temperature of 20-60° C., 25-50° C., or 30-40° C., for 10-300 hours, 20-200 hours, or 40-100 hours thereby forming the reaction product which may be isolated by centrifugation at 1,000-10,000 rpm, 3,000-7,000 rpm or 5,500-6,500 rpm for 1-60 minutes, 10-30 minutes, or 15-25 minutes. The isolated reaction product may be washed with a solvent which is volatile at room temperature. Volatile solvents include, without limitation, hydrocarbons (e.g., hexane), alcohols (e.g., ethanol, methanol, propanol, isopropanol), ketones (e.g., acetone), and esters (e.g., ethyl acetate). The reaction product may be heated at a temperature of 60-150° C., 80-120° C., or 90-110° C., for 1-30 hours, 2-20 hours, or 4-15 hours to remove solvent molecules adsorbed onto the surface of the nanoparticle filler during the washing. The yield of the reaction product may be at least 40%, at least 50%, at least 60%, at least 70%, at least 80%, at least 90%, at least 95%, or at least 99%.

The nanoparticle filler may be mesoporous or microporous. An average pore size of the nanoparticle filler may be in a range of 0.1-10 nm, 0.2-5 nm, 0.5-3 nm, or 1.5-2.5 nm. A porosity of the nanoparticle filler may be in a range of 0.5-95 vol %, 0.5-80 vol %, 0.5-70 vol %, 0.5-60 vol %, 0.5-50%, 5-50 vol %, 10-50 vol %, 10-40 vol %, 10-30 vol %, or preferably 10-20 vol %, based on a total volume of the nanoparticle filler.

The nanoparticle filler may be spherical or substantially spherical (e.g., oval or oblong shape). In some embodiments, the nanoparticle filler is in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface).

The nanoparticle filler may be uniform. As used herein, the term "uniform" refers to no more than 10%, no more than 5%, no more than 4%, no more than 3%, no more than 2%, or no more than 1% of the distribution of the nanoparticle fillers having a different shape. For example, the nanoparticle fillers are uniformly spheres and have no more than 1% of nanoparticle fillers are in an oblong shape. In some embodiments, the nanoparticle fillers may be non-uniform. As used herein, the term "non-uniform" refers to more than 10% of the distribution of the nanoparticle fillers having a different shape.

Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value $|\mu|$). The CV or RSD is widely used to express precision and repeatability. It shows the extent of variability in relation to the mean of a population. The nanoparticle fillers having a narrow size dispersion, i.e., monodispersity, is preferred. As used herein, "monodisperse", "monodispersed" and/or "monodispersity" refers to nanoparticle fillers having a CV or RSD of less than 25%, preferably less than 20%.

The nanoparticle fillers may be monodisperse with a coefficient of variation or relative standard deviation (ratio of the particle size standard deviation to the particle size mean) of less than 15%, less than 12%, less than 10%, less than 9%, less than 8%, less than 7%, less than 6%, less than 5%, or preferably less than 2%.

In one embodiment, the nanoparticle fillers are monodisperse and have a particle diameter distribution in a range of 75% of the average particle diameter to 125% of the average particle diameter, 80-120%, 85-115%, 86-114%, 87-113%, 88-112%, 89-111%, 90-110%, or preferably 95-105% of the average particle diameter.

An average diameter of the nanoparticle filler, as used herein, refers to the average linear distance measured from one point on the particle through the center of the particle to a point directly across from it. The nanoparticle fillers may have an average diameter in a range of 10-90 nm, 20-80 nm, or 40-70 nm. The nanoparticle fillers may be agglomerated or non-agglomerated (i.e., the nanoparticle fillers are well separated from one another and do not form clusters). In one embodiment, the nanoparticle fillers are agglomerated and the agglomerates have an average diameter in a range of 2-20 μm, 4-15 μm, or 5-10 μm.

The nanoparticle filler has a BET surface area in a range of 250-400 $m^2/g$, 260-380 $m^2/g$, 280-360 $m^2/g$, or 290-350 $m^2/g$.

The nanoparticle filler may be embedded in the polymer matrix. The polymer may encapsulate the nanoparticle filler and optionally fill at least some of the pores of the filler. The polymer may interact with the surface and/or the pores of the nanoparticle filler via van der Waals forces and/or π-interactions (for polymers containing an aryl group such as phenyl, naphthyl, anthracenyl, thienyl, and indolyl). The polymer may fill the interspaces between nanoparticle fillers.

The nanoparticle filler is preferably dispersed in the polymer. In an embodiment where the nanoparticle filler is well dispersed (i.e., not agglomerated), the nanoparticle filler may be evenly dispersed (i.e., a distance between a nanoparticle filler and all its neighbors is the same or substantially the same) or randomly dispersed (i.e., the distance between a nanoparticle filler and all its neighbors are different). The distance can be said to be substantially the same when the shortest distance is at least 80%, at least 85%, at least 90%, or at least 95% of the average distance and the longest distance is not more than 120%, not more than 110%, or not more than 105% of the average distance. The distance is measured from a center of a nanoparticle filler to a nanoparticle filler and may be in a range of 0.1 nm to 1 μm, 1-500 nm, 10-200 nm, or 50-100 nm. Energy-dispersive X-ray spectroscopy, X-ray microanalysis, elemental mapping, transmission electron microscopy, scanning electron microscopy, and scanning transmission electron microscopy may be useful techniques for observing the dispersion of the nanoparticle filler in the matrix.

The second aspect of the disclosure relates to a method for making the membrane. The method comprises: (i) suspending the nanoparticle filler in a solvent thereby forming a first suspension; (ii) dissolving the polymer in the solvent thereby forming a solution; (iii) mixing the first suspension with the solution thereby forming a second suspension; and (iv) casting the second suspension thereby forming the membrane.

The solvents used for suspending the nanoparticle fillers and for dissolving the polymer are chosen primarily for their ability to completely dissolve the polymers and for ease of solvent removal in the membrane formation steps. Other considerations in the selection of solvents include low toxicity, low corrosive activity, low environmental hazard potential, availability, and cost. Preferred solvents include most amide solvents (e.g., N-methylpyrrolidone (NMP), DMF, formamide, N-methyl formamide, 2-pyrrolidone, and N,N-dimethyl acetamide (DMA)), methylene chloride, THF, acetone, DMSO, toluene, dioxanes, 1,3-dioxolane, and mixtures thereof.

An amount of the nanoparticle filler in the first suspension may be in a range of 0.1-10 wt %, 0.5-5 wt %, or 1-3 wt %, relative to the weight of the first suspension. Prior to being suspended, the nanoparticle filler may contain adsorbed solvent molecules from the ligand exchange reaction. In some embodiments, the adsorbed solvent may be different from the solvent used for making of the membrane. Thus a solvent exchange is required and this is achieved by suspending the nanoparticle filler in the solvent used for the making of the membrane. The solvent exchange may take 10-30 hours, 12-25 hours, or 18-24 hours. After the solvent exchange, the suspension may be mixed with the polymer solution. In one embodiment, after the solvent exchange, the nanoparticle filler is isolated by centrifugation or filtration, and then mixed with the polymer solution.

An amount of the polymer in the solution may be in a range of 10-30 wt %, 12-25 wt %, or 18-22 wt %, relative to a weight of the solution. The polymer may be dissolved at 35-60° C., 40-55° C., or 45-50° C., under reduced pressure for a duration in a range of 10-30 hours, 12-25 hours, or 18-24 hours. The reduced pressure may range from 0.01-400 mbar, preferably 0.1-200 mbar, more preferably 1-50 mbar.

The first suspension is mixed with the solution for a duration of 1-10 hours, 2-8 hours, or 4-7 hours, at 35-60° C., 40-55° C., or 45-50° C. under 0.01-400 mbar, preferably 0.1-200 mbar, more preferably 1-50 mbar.

To produce an unsupported membrane, the second suspension may be cast by a continuous single step extrusion film process, flow coating, spin casting, or solvent casting. In one embodiment, the second suspension may be cast onto a glass plate and a casting knife may be used for spreading the second suspension across the glass plate to a uniform membrane thickness. After the evaporation of the solvent, the membrane may be peeled off from the glass plate.

To produce a supported membrane, the substrate receives the second suspension during the membrane fabrication and retains the membrane formed. The support can be made of any material that is wettable by the second suspension that is first placed in contact with the substrate, inert to the components in the second suspension, stable under the fabrication process, and one to which the membrane thus formed will adhere. A dip coating method may be used. After application of the second suspension to the substrate, a heating or calcination step may be carried out. Dip coating steps may be carried out several times (e.g., 1-50 times, 5-30 times, or 9-20 times) to form the required thickness of coating.

In one embodiment, the nanoparticle fillers are first coated onto the substrate by the application of the first suspension (e.g., by dip coating) followed by the application of the polymer solution. Subsequently, the membrane may be formed by using the phase inversion method. Alternatively, if the solvent is volatile, the membrane may be formed by allowing the solvent to evaporate.

The third aspect of the disclosure relates to a method for separating a gas from a fluid stream comprising the gas. The method comprises contacting the fluid stream on a first side of the membrane such that at least a first material present in the fluid stream is retained on the first side in the form of a retentate and the gas permeates through the membrane to a second side in the form of a permeate. In this sense, the method could include opposing sides, where one side of the membrane is the retentate side and the opposing side of the membrane is the permeate side. The fluid stream may be in a gaseous state or a liquid state.

The method can further include removing or isolating either or both of the retentate from the retentate side and/or the permeate from the permeate side. The retentate and/or the permeate can be subjected to further processing steps such as a further purification step (e.g., column chromatography, additional membrane separation steps, etc.).

The process may include providing a force to effect passage of the gas through the membrane. For example, the pressure at which the fluid stream is fed to the membrane can be at least 1 atm, at least 2 atm, at least 3 atm, at least 4 atm, at least 5 atm, at least 6 atm, at least 7 atm, at least 8 atm, at least 9 atm or more, or can range from 1-20 atm, 2-15 atm, or from 2-10 atm. Further, the temperature can range from 20-65° C., 25-65° C., or 20-30° C. In one embodiment, a reduced pressure could be applied to draw the gas through the membrane. The reduced pressure may range from 0.01-400 mbar, preferably 0.1-200 mbar, more preferably 1-50 mbar. Alternatively or in addition, a sweep gas could be used.

The membranes may be used in gas separation (GS) processes, vapor permeation (VP) processes, pervaporation (PV) processes, membrane distillation (MD) processes, membrane contactors (MC) processes, carrier mediated processes, and sorbent PSA (pressure swing absorption). Further, it is contemplated that at least 2, 3, 4, 5, or more of the same or different membranes disclosed herein may be used in series with one another to further purify or isolate a targeted liquid, vapor, or gas. Similarly, the membranes may be used in series with other currently known membranes to purify or isolate a targeted material.

The membrane may be used for separation of organic molecules from water (e.g. ethanol and/or phenol from water by pervaporation) and removal of metal and other organic compounds from water. The membrane may also be used in the separation of liquid mixtures by pervaporation, such as in the removal of organic compounds (e. g., alcohols, phenols, chlorinated hydrocarbons, pyridines, ketones) from water such as aqueous effluents or process fluids.

The membrane may also be used in fermenters and bioreactors to transport gases into the reaction vessel. Additionally, the membranes may be used for the removal of microorganisms from air or water streams, water purification, or ethanol production in a continuous fermentation/membrane pervaporation system, and in detection or removal of trace compounds or metal salts in air or water streams.

The membrane may be especially useful in gas separation processes in air purification, chemical, petrochemical, refinery, pharmaceutical, and natural gas industries. Examples of such separations include separation of volatile organic compounds (such as toluene, xylene, and acetone) from an atmospheric gas, such as nitrogen or oxygen; nitrogen recovery from air; and hydrocarbon vapor separation from hydrogen in oil and gas refineries. The membrane may also be useful for hydrocarbon dew pointing of natural gas (i.e., to decrease the hydrocarbon dew point to below the lowest possible export pipeline temperature so that liquid hydrocarbons do not separate in the pipeline); for control of methane number in fuel gas for gas engines and gas turbines, and for gasoline recovery.

Further examples of such separations are for the separation of carbon dioxide from natural gas; hydrogen gas from nitrogen, methane, and argon in ammonia purge gas streams; hydrogen gas recovery in refineries; olefin/paraffin separations such as propylene/propane separation, and iso/normal paraffin separations.

Gases that may be separated by the mixed matrix membrane include, without limitation, carbon dioxide, hydrogen, carbon monoxide, oxygen, nitrogen, organic vapor or organic substance, hydrocarbons having from 1 to 4 carbon atoms (such as methane, ethane, ethylene, acetylene, propane, propene, butane, iso-butane), noble gases (such as helium, neon, argon, krypton, or xenon), hydrogen sulfide, ammonia, sulfur oxides, nitrogen oxides, siloxanes (such as hexamethylcyclotrisiloxane or octamethylcyclotetrasiloxane), and water vapor. The term "organic vapor" means a vaporizing gas of an organic substance that is in liquid form at room temperature under atmospheric pressure. Examples of such an organic substance include alcohols, such as methanol and ethanol; amines such as trimethylamine; aldehydes such as acetaldehyde; aliphatic hydrocarbons having from 5 to 16 carbon atoms; aromatic hydrocarbons such as benzene and toluene; ketones such as acetone and methyl ethyl ketone; esters such as ethyl acetate; and halogenated hydrocarbons such as methyl chloride and chloroform.

Any given pair or group of gases that differ in molecular size, for example, nitrogen and oxygen, carbon dioxide and methane, hydrogen and methane or carbon monoxide, helium and methane, can be separated using the membranes described herein. More than two gases may be removed from the fluid stream. For example, some of the gas components which can be selectively removed from a raw natural gas using the membrane include carbon dioxide, oxygen, nitrogen, water vapor, hydrogen sulfide, helium, and other trace gases. Some of the gas components that can be selectively retained include hydrocarbon gases. In further instances, the membranes can be used on a mixture of gases that include at least 2, 3, 4, or more gases such that a selected gas or gases pass through the membrane (i.e., permeate) while the remaining gas or gases do not pass through the membrane (i.e., retentate).

In some embodiments, the process is directed to removing at least one of nitrogen, hydrogen, methane, carbon dioxide, ethene, ethane, propene, and/or propane from a fluid stream. In some embodiments, nitrogen, methane, carbon dioxide, ethene, ethane, propene, and/or propane form the retentate and thus is removed from the fluid stream.

In some embodiments, the method is used to separate hydrogen gas from a fluid stream comprising hydrogen gas and nitrogen gas, or hydrogen gas from a fluid stream comprising hydrogen gas and methane gas, or hydrogen gas from a fluid stream comprising hydrogen gas and carbon dioxide gas, or nitrogen gas from a fluid stream comprising nitrogen gas and methane gas, or carbon dioxide gas from a fluid stream comprising carbon dioxide gas and methane gas or carbon dioxide gas from a fluid stream comprising carbon dioxide gas and nitrogen gas.

The membrane may incorporate a species that adsorbs strongly to certain gases (e.g., cobalt porphyrins or phthalocyanines for oxygen or silver(I) for ethane) to improve the selectivity of the membrane.

Another aspect of the disclosure relates to a gas separation device including the membrane. The gas separation device may include an inlet configured to accept feed material, a first outlet configured to expel a retentate, and a second outlet configured to expel a permeate. The device can be configured to be pressurized so as to push feed material through the inlet, retentate through the first outlet, and permeate through the second outlet. The device can be configured to house and utilize flat sheet membranes, spiral membranes, tubular membranes, or hollow fiber membranes.

Having generally described this disclosure, a further understanding can be obtained by reference to certain specific examples which are provided herein for purposes of illustration only and are not intended to be limiting unless otherwise specified.

Example 1 Materials and General Procedures

All reagents were used as received without further purification. Zinc nitrate hexahydrate (≥99% purity, $Zn(NO_3)_2 \cdot 6H_2O$) was purchased from Loba, India. Benzimidazole (≥99% purity) and benzotriazole (≥99% purity) were purchased from Alfa Aeser. N,N'-dimethylformamide (≥99.5% purity, DMF) and methanol (≥99.9% purity) were purchased from Scharlau. N,N'-dimethylacetamide (≥99% purity, DMA), deuterated dimethylsulfoxide (99.9%, DMSO-$d_6$) and deuterium chloride (35% DCl in $D_2O$) were purchased from Aldrich Chemical Co. Polyetherimide (PEI; Sabic Ultem 1000). $H_2$ (99.999%), $CH_4$ (99.9%), $C_2H_6$ (99.9%), and $C_3H_3$ (99.9%) were purchased form Abdullah Hashem Industrial Gas Co., Saudi Arabia. $CO_2$ (99.9%), $N_2$ (99.999%), and $O_2$ (99.9%) were purchased from Air Liquide, Saudi Arabia.

Powder X-ray diffraction (PXRD) patterns were collected on a Bruker D8 Advance X-ray diffractometer employing Ni-filtered Cu $K_\alpha$ radiation (λ=1.54178 Å). $^1H$ and $^{13}C$ nuclear magnetic resonance (NMR) spectra were taken on a JEOL JNM-LA500 spectrometer at 500 MHz and 125.6 MHz, respectively. All chemical shifts were referenced to trimethylsilane. Fourier transform infrared (FT-IR) spectroscopy was performed using a Nicolet NXR FT-Raman spectrometer with a single reflection diamond plate. Field emission scanning electron microscopy (SEM) analysis was performed on gold sputtered samples with a TESCAN MIRA3 (10-30 kV accelerating voltage) microscope with energy-dispersive X-ray spectroscopy (EDX) analysis taken with an Oxford Instruments X-Max$^N$ silicon drift detector. Thermogravimetric analysis (TGA) was conducted with a TA Q500 with the sample held in a platinum pan under constant air flow.

Example 2 Synthesis and Characterization of nZIF-7, PSM-nZIF-7, and the Mixed-Matrix Membranes Incorporating Each Nanoparticle Filler Synthesis of Nano-Zeolitic Imidazolate Framework-7 (nZIF-7)

(Jiang, J.-Q.; Yang, C.-X.; Yan, X.-P., Postsynthetic ligand exchange for the synthesis of benzotriazole-containing zeolitic imidazolate framework. Chem. Commun. 2015, 51, 6540-6543, incorporated herein by reference in its entirety). $Zn(NO_3)_2 \cdot 6H_2O$ (1.25 g, 4.2 mmol) and benzimidazole (1.54 g, 13 mmol) were dissolved separately in 100 mL of DMF. Once dissolved, the two solutions were mixed in a round-bottom flask, which was continuously stirred for 72 h at 35° C. After the elapsed time, crystalline nZIF-7 was obtained in 70% yield and subsequently separated by centrifugation at 6,000 rpm for 20 min. The mother liquid was discarded and the resulting white powder was washed with methanol (3×~50 mL). nZIF-7 was then dried at 90° C. for 12 h. FIG. 1A shows the opening of the accessible six-membered window leading to a large socialite cage, which is characteristic of the SOD topology. FIG. 1B shows the zinc ions are coordinated to the nitrogen atoms in the benzimidazolate ligand. FT-IR (4000-400 cm$^{-1}$): 3456 (br), 3056 (m), 2922 (w), 1776 (w), 1674 (s), 1609 (m) and 742 (s) (FIG. 1E). FIGS. 7A, 7B, 8A, and 8B show the $^1H$ and $^{13}C$ NMR spectra of the product.

Post-Synthetic Modification (PSM) by Linker Exchange of nZIF-7 (PSM-nZIF-7).

nZIF-7 particles were suspended in a 50 mL methanol solution of benzotriazole (100 mg mL$^{-1}$). The resulting mixture was heated with stirring for 24 h. After which, the benzotriazole solution was refreshed with a new benzotriazole solution having the same concentration, after 24 h and the reaction mixture was stirred for a total of 3 days. The linker exchange process was monitored by $^1H$ and $^{13}C$ NMR. Prior to the NMR measurement, the solid was washed with methanol (10×~2 mL) and dried at 120° C. for 12 h. FIG. 1D shows the zinc ions are coordinated to the first and third nitrogen atoms in the benzotriazolate ligand. The dried solid (~10 mg) was digested by 50 μL DCl and 500 μL DMSO-$d_6$ was added once the solid dissolved. FT-IR (4000-400 cm$^{-1}$): 3058 (br), 2922 (w), 1677 (w), 1610 (w), 1478 (s), 1226 (s), 1175 (m) and 744 (s) (FIG. 2).

Preparation of Polyetherimide (PEI) and Mixed-Matrix Membranes (MMMs).

In a typical procedure, a 20 wt % PEI solution was prepared by mixing PEI (0.63 g) with DMA (2.5 mL) at 45° C. The resulting mixture was stirred under vacuum for 24 h until PEI completely dissolved. The homogeneous solution was cast on a glass plate, with the aid of a casting knife, at 400 µm thickness, and then allowed to coagulate under ambient conditions. For the preparation of nZIF-7/PEI and PSM-nZIF-7/PEI mixed matrix membranes, 33 mg of nZIF-7 or PSM-nZIF-7 were first solvent exchanged with DMA to replace all of the methanol molecules and then these solvent exchanged nanoparticles were mixed with the PEI solution after 18 h. Stirring was resumed for another 6 h at 45° C. under vacuum. These mixtures were cast to a thickness of 300 µm and coagulated under ambient conditions. After coagulation, all membranes were left to dry overnight. DMA was exchanged from the pure PEI membrane and the mixed matrix membranes by separately immersing each membrane in methanol (10 mL, 2× per day for 3 days). Finally, the membranes were dried at 100° C. for 18 h.

To gain insight into the ease of tuning the permeability and selectivity of a mixed matrix membrane, a design strategy was implemented using nZIF-7, which is amenable to pore environment modification, to blend with PEI as the platform matrix polymer. Post-synthetic modification of nZIF-7 by linker exchange of benzimidazolate with benzotriazolate was chosen in order to introduce additional polar atoms within the internal pore environment (Jiang, J.-Q.; Yang, C.-X.; Yan, X.-P., Postsynthetic ligand exchange for the synthesis of benzotriazole-containing zeolitic imidazolate framework. Chem. Commun. 2015, 51, 6540-6543; Lalonde, M. B.; Mondloch, J. E.; Deria, P.; Sarjeant, A. A.; Al-Juaid, S. S.; Abdelkarim, O. I.; Farha, O. K.; Hupp, J. T., Selective solvent-assisted linker exchange (SALE) in a series of zeolitic imidazolate frameworks. Inorg. Chem. 2015, 54, 7142-1744; Karagiaridi, O.; Bury, W.; Sarjeant, A. A.; Stem, C. L.; Farha, O. K.; Hupp, J. T., Synthesis and characterization of isostructural cadmium zeolitic imidazolate frameworks via solvent-assisted linker exchange. Chem. Sci. 2012, 3, 3256-3260; Deria, P.; Mondloch, J. E.; Karagiaridi, O.; Bury, W.; Hupp, J. T.; Farha, O. K., Beyond post-synthetic modification: evolution of metal-organic frameworks via building block replacement. Chem. Soc. Rev. 2014, 43, 5896-5912; Zhu, H.; Wang, L.; Jie, X.; Liu, D.; Cao, Y., Improved interfacial affinity and $CO_2$ separation performance of asymmetric mixed matrix membranes by incorporating postmodified MIL-53(A1). ACS Appl. Mater. Interf. 2016, 8, 22696-22704, each incorporated herein by reference in their entirety). The blending of PSM-nZIF-7 in a PEI-based mixed matrix membrane may lead to an overall enhancement in permeation because the thermodynamic affinity (i.e., solubility) of gases generally increases there are more polar atoms within the internal pores.

Figure 4:
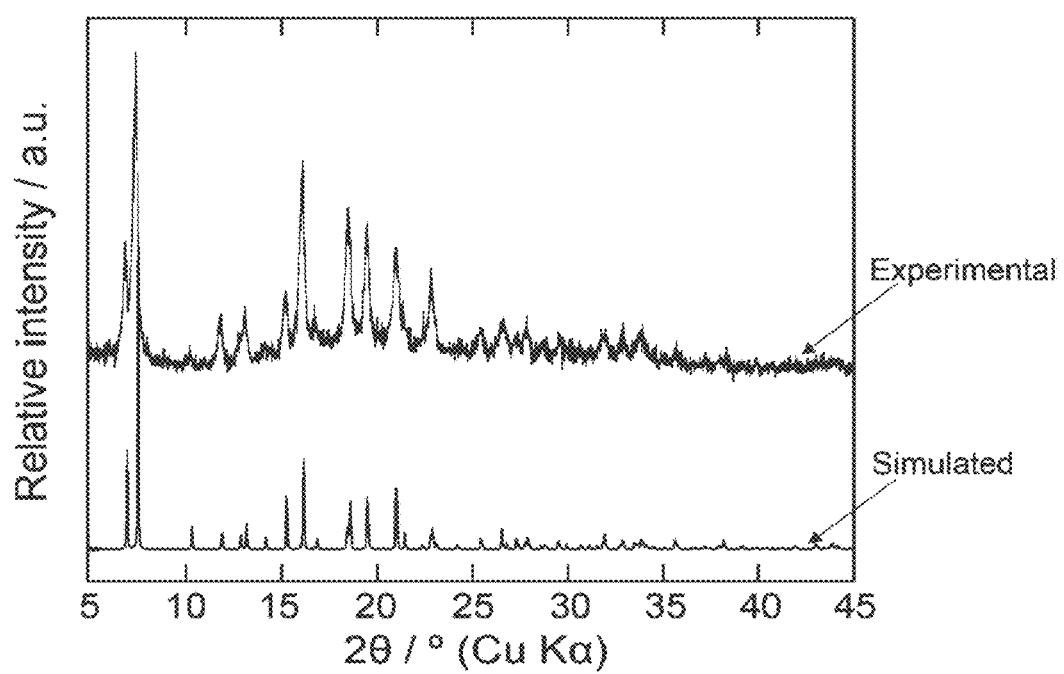
FIG. 4 is an overlay of a powder X-ray diffraction pattern of nZIF-7 and a diffraction pattern simulated from a single crystal structure of ZIF-7.
Figure 5:
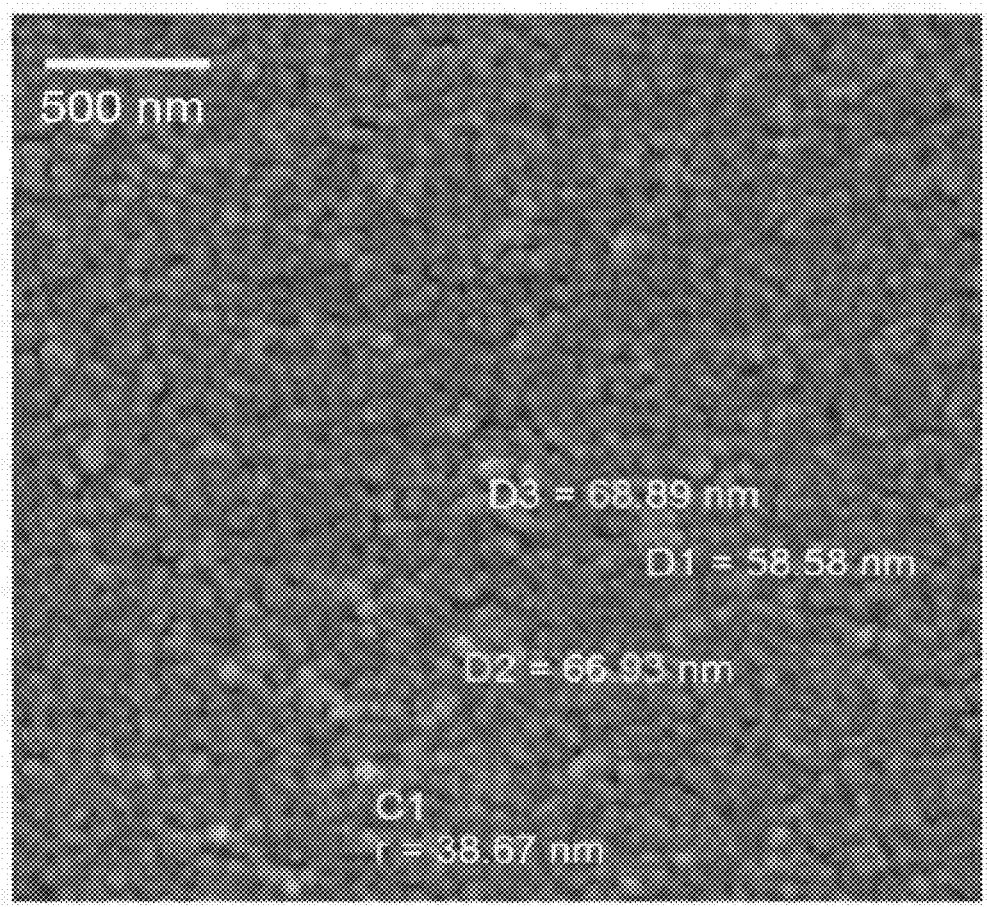
FIG. 5 is a scanning electron micrograph of the as-synthesized nZIF-7.

Accordingly, the synthesis of nZIF-7 was developed with modifications to a previously reported procedure with nanocrystalline powders being obtained in 70% yield. Prior to structural analysis, nZIF-7 powder was thoroughly washed with DMF and methanol, followed by activation to remove any unreacted species and occluded guest molecules, respectively. The structure of nZIF-7 was confirmed by powder X-ray diffraction (PXRD) analysis. FIG. 4 shows the diffraction patterns of as-synthesized and activated samples are in agreement with the diffraction pattern simulated from the reported crystal structure of ZIF-7. The particle size and uniformity of nZIF-7 particles were assessed by scanning electron microscopy (SEM) measurements. From the scanning electron micrograph as shown in, for example, FIG. 5, nZIF-7 crystallites have a uniform morphology with a narrow size distribution of 40-70 nm.

Figure 6:
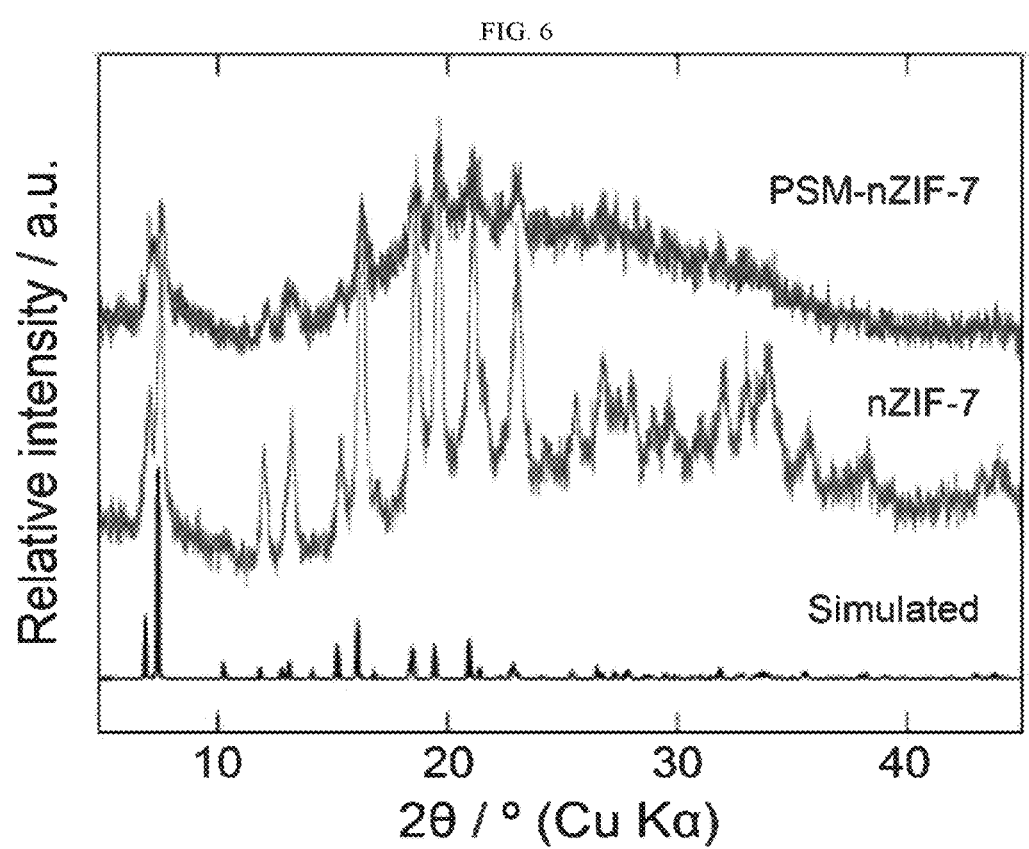
FIG. 6 is an overlay of a powder X-ray diffraction pattern of PSM-nZIF-7, the powder X-ray diffraction pattern of nZIF-7, and a diffraction pattern simulated from a single crystal structure of ZIF-7.
Figure 7:
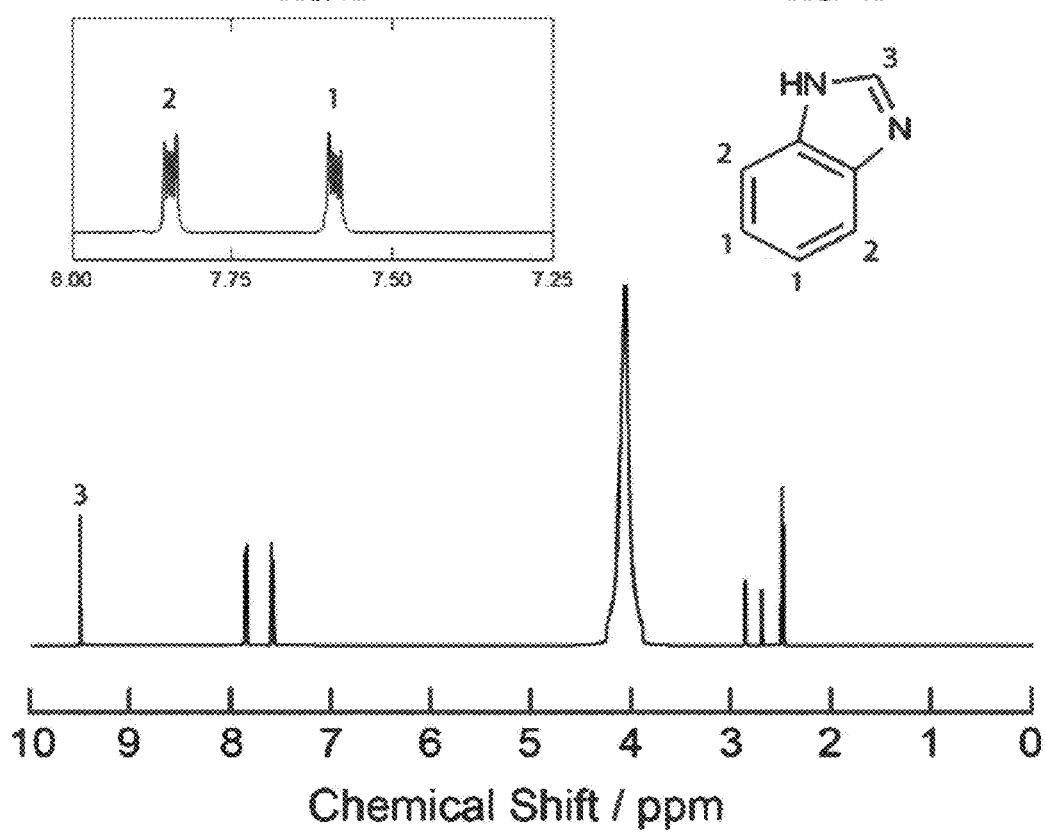
FIG. 7A is a $^1$H NMR spectrum of the digested sample of nZIF-7.
FIG. 7B is an expanded view of the $^1$H NMR spectrum in FIG. 7A from 7.25 ppm to 8 ppm.
Figure 8:
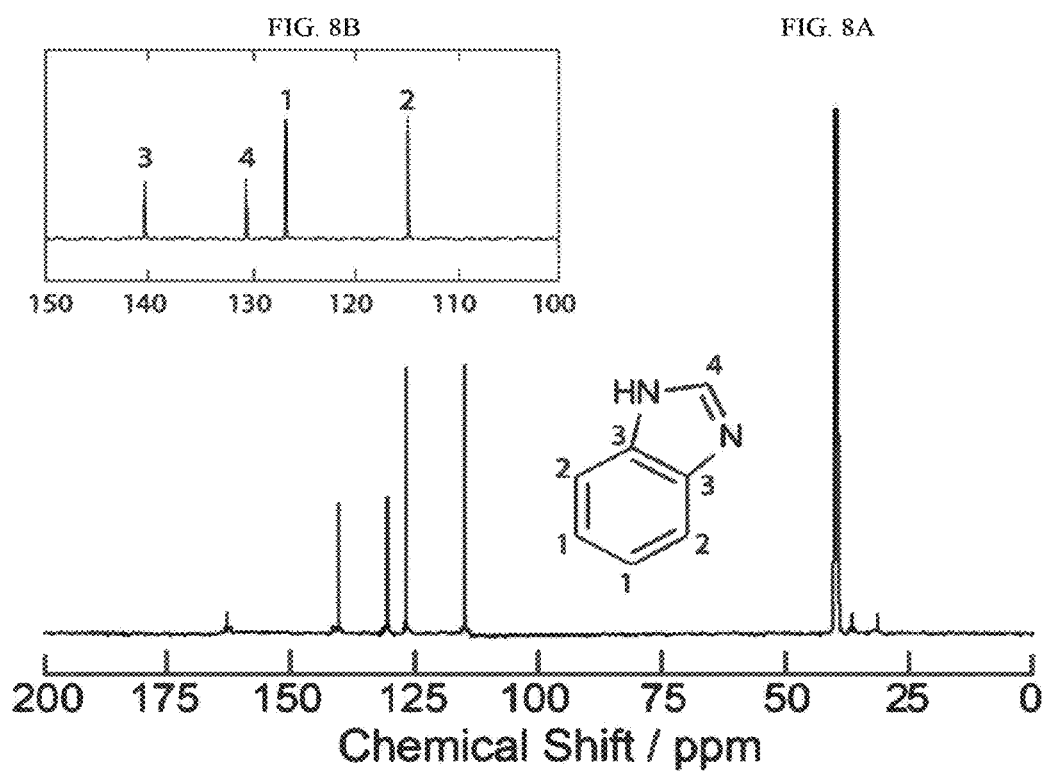
FIG. 8A is a $^{13}$C NMR spectrum of the digested sample of nZIF-7.
FIG. 8B is an expanded view of the $^{13}$C NMR spectrum in FIG. 8A from 100 ppm to 150 ppm.
Figure 9:
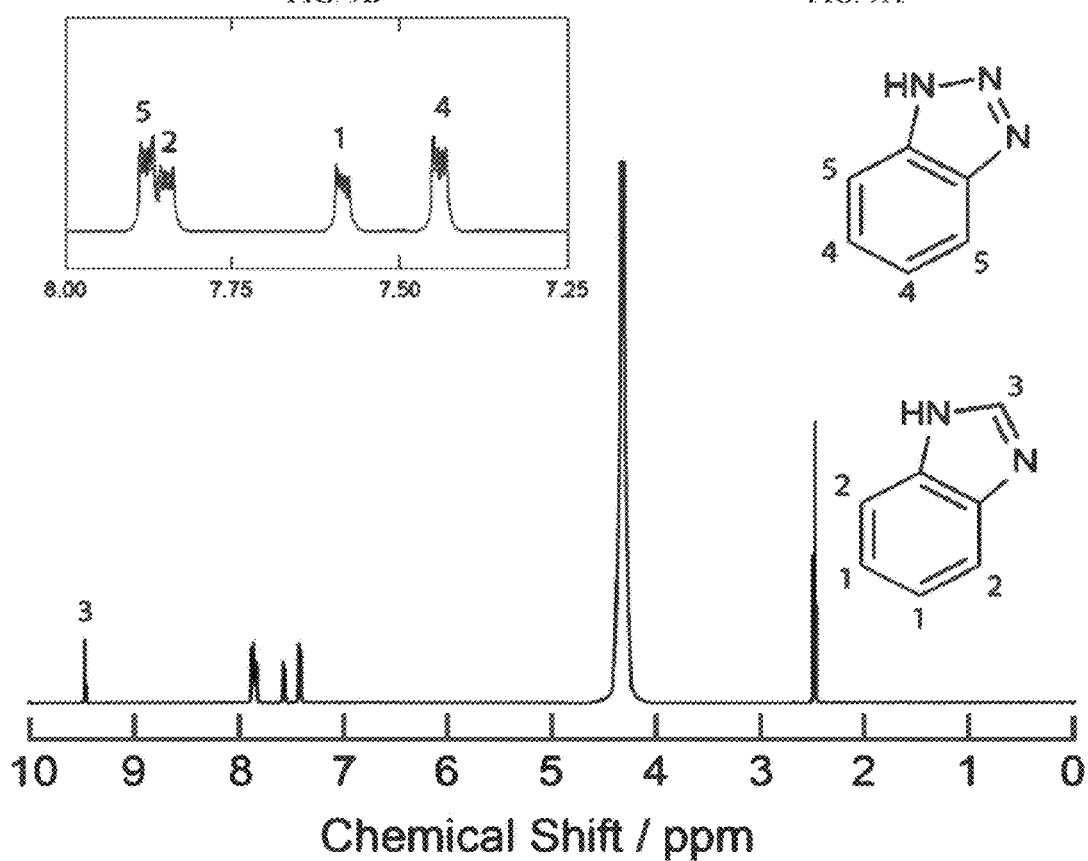
FIG. 9A is a $^1$H NMR spectrum of the digested sample of PSM-nZIF-7 after 3 days of ligand exchange reaction.
FIG. 9B is an expanded view of the $^1$H NMR spectrum in FIG. 9A from 7.25 ppm to 8 ppm.
Figure 10:
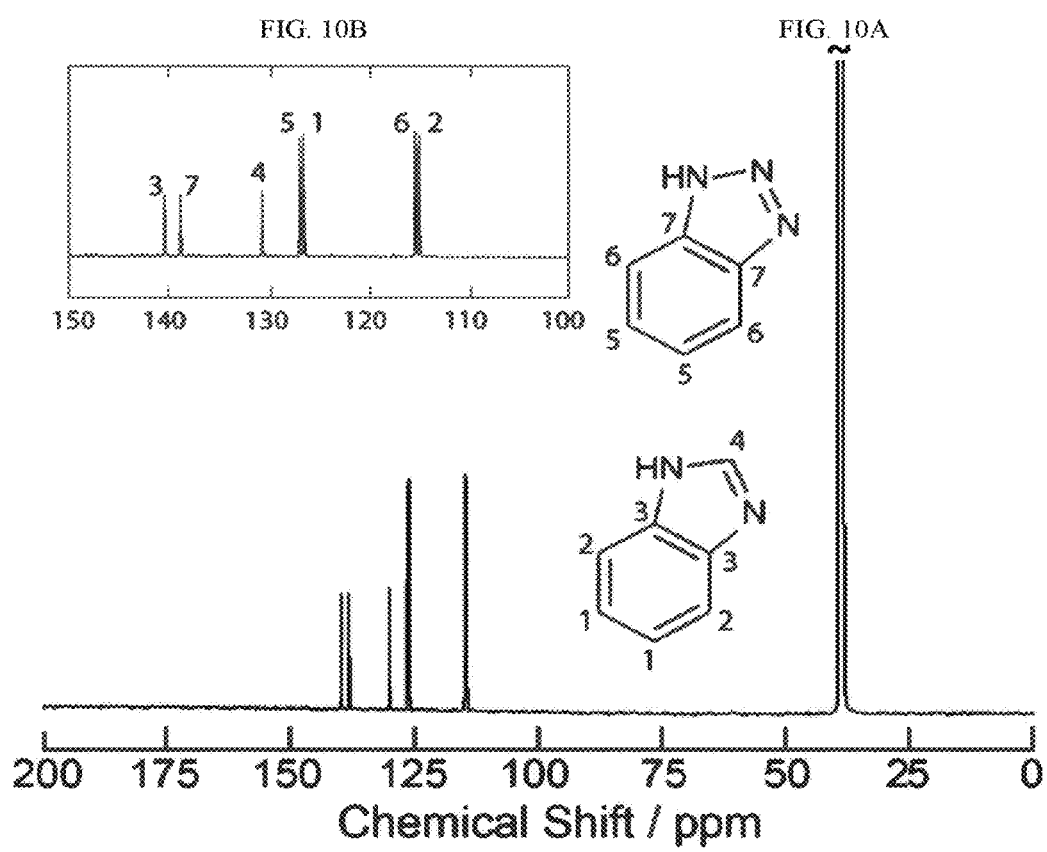
FIG. 10A is a $^{13}$C NMR spectrum of the digested sample of PSM-nZIF-7 after 3 days of ligand exchange reaction.
FIG. 10B is an expanded view of the $^{13}$NMR spectrum in FIG. 10A from 100 ppm to 150 ppm.

The procedure for the post synthetic modification by linker exchange of nZIF-7 was also adopted with modification from a previous report. The crystallinity and phase purity of PSM-nZIF-7 was confirmed by PXRD patterns shown in FIG. 6. The PXRD pattern of PSM-nZIF-7 corresponded to the diffraction pattern of nZIF-7.

The success of the exchange was confirmed and quantified by $^1$H and $^{13}$C NMR analysis. In an exemplary NMR experiment, after a pre-set reaction time had elapsed, an aliquot of PSM-nZIF-7 product was separated and thoroughly washed with methanol (at least 10 times) in order to ensure there were no unreacted benzotriazole linkers remaining within the pores. After washing, PSM-nZIF-7 crystals were dried and subsequently digested using DCl/DMSO-d$_6$, which led to a linker exchange yield of up to 61%, which is observed in FIGS. 9A, 9B, 10A, and 10B.

Figure 11:
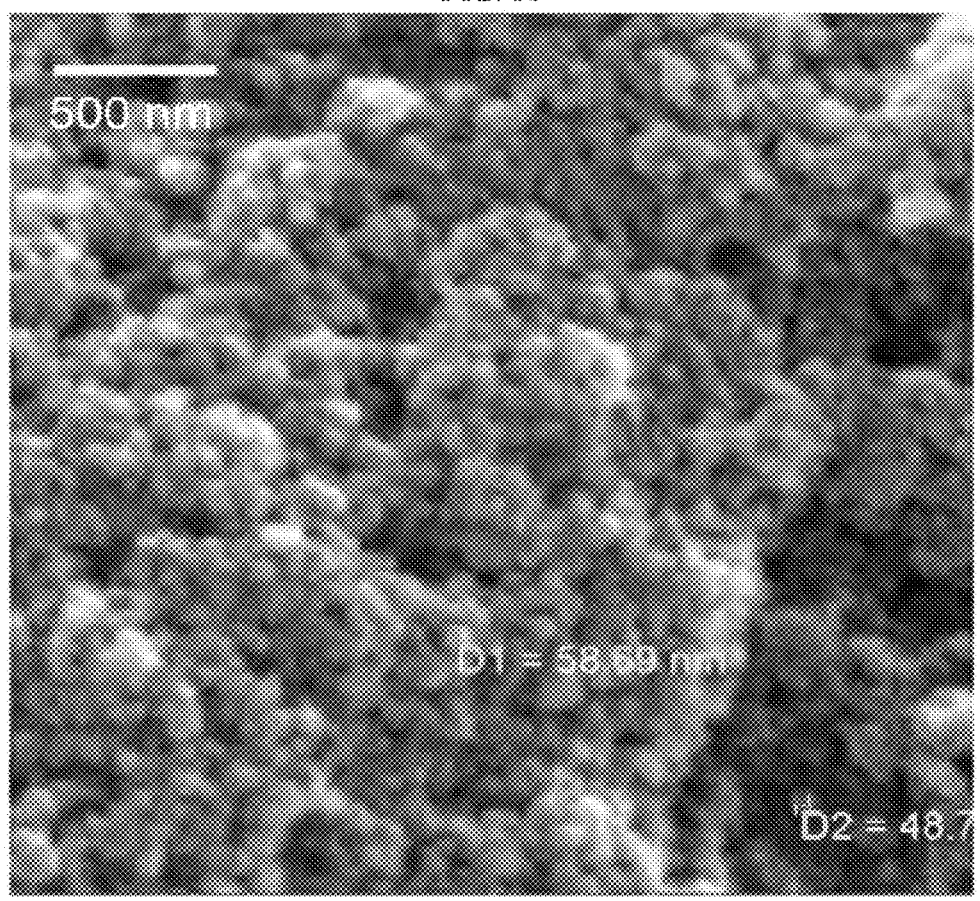
FIG. 11 is a scanning electron micrograph of PSM-nZIF-7.
Figure 12:
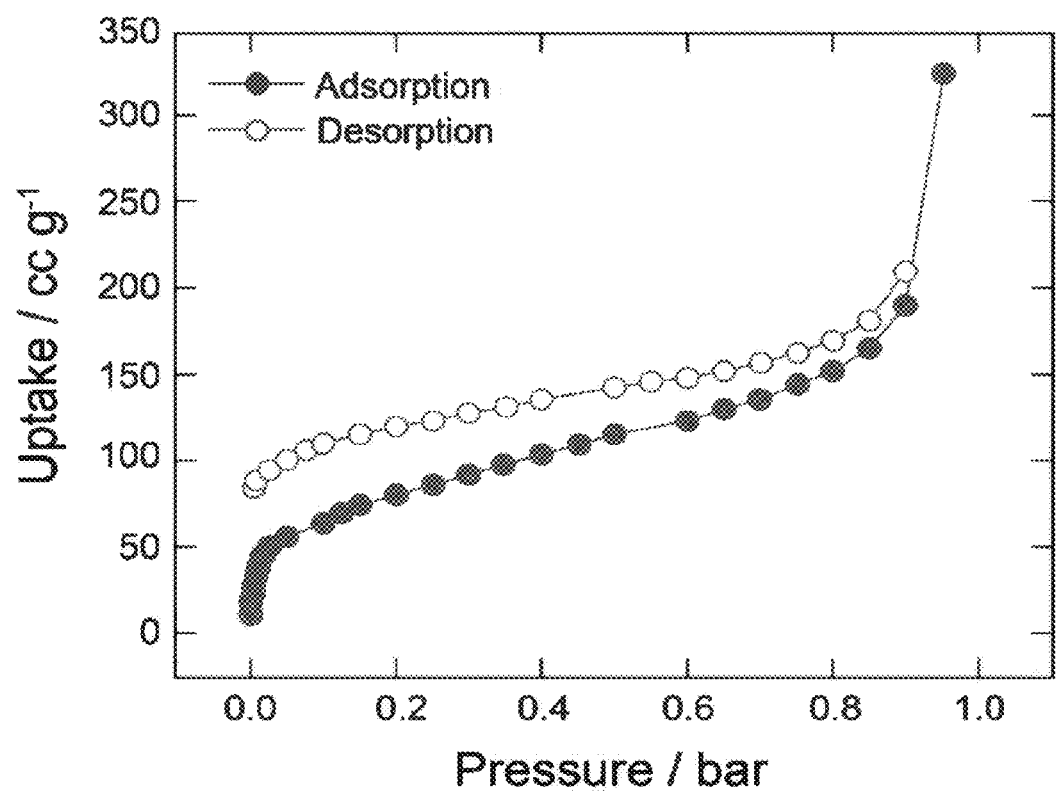
FIG. 12 is a graph illustrating $N_2$ adsorption isotherms of nZIF-7 at 77 K.
Figure 13:
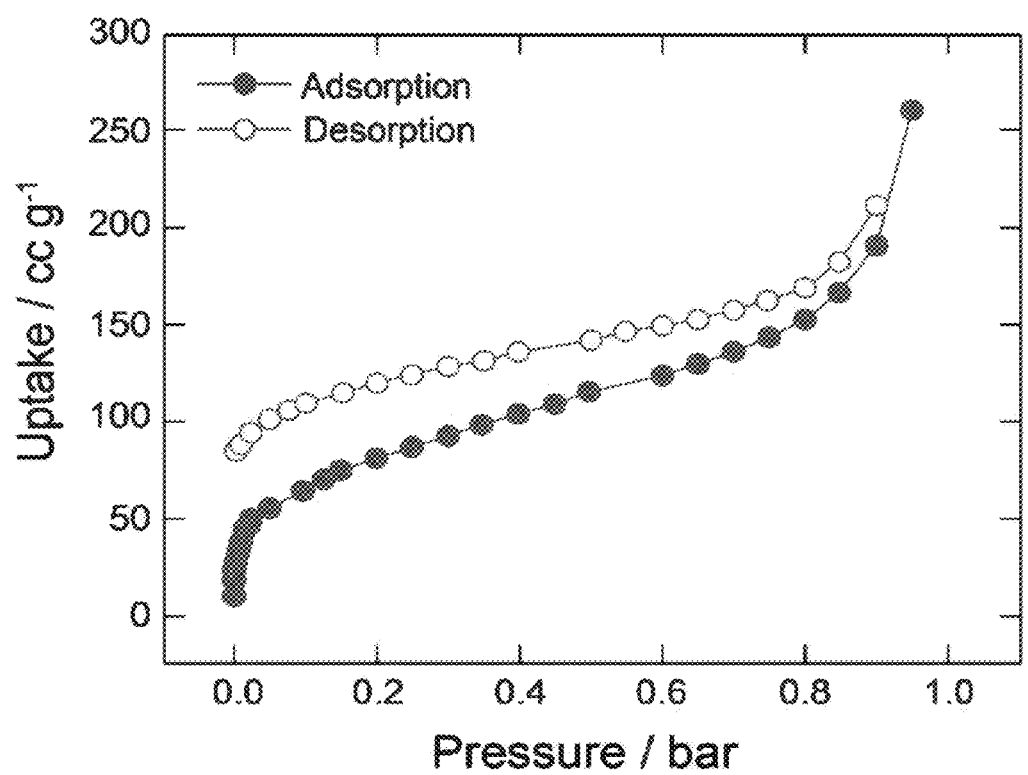
FIG. 13 is a graph illustrating $N_2$ adsorption isotherms of PSM-nZIF-7 at 77 K.
Figure 14:
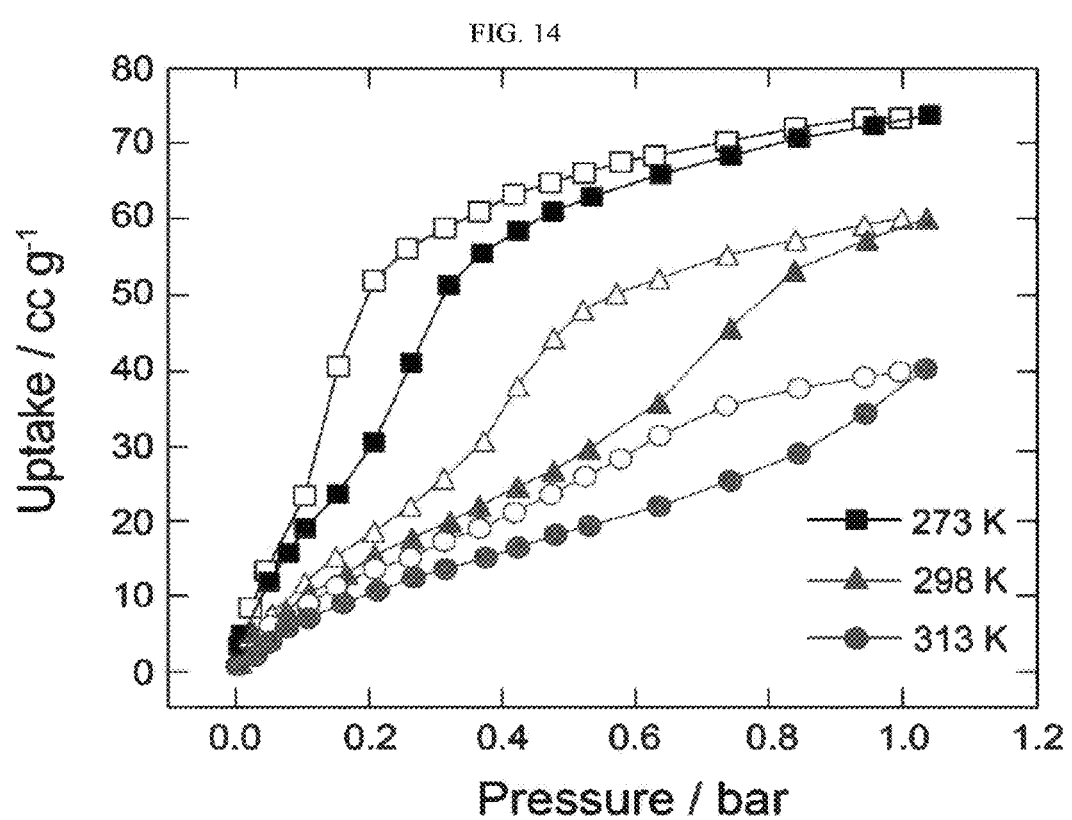
FIG. 14 is a graph illustrating $CO_2$ isotherms for nZIF-7 at 273 K, 298 K, and 313 K.
Figure 15:
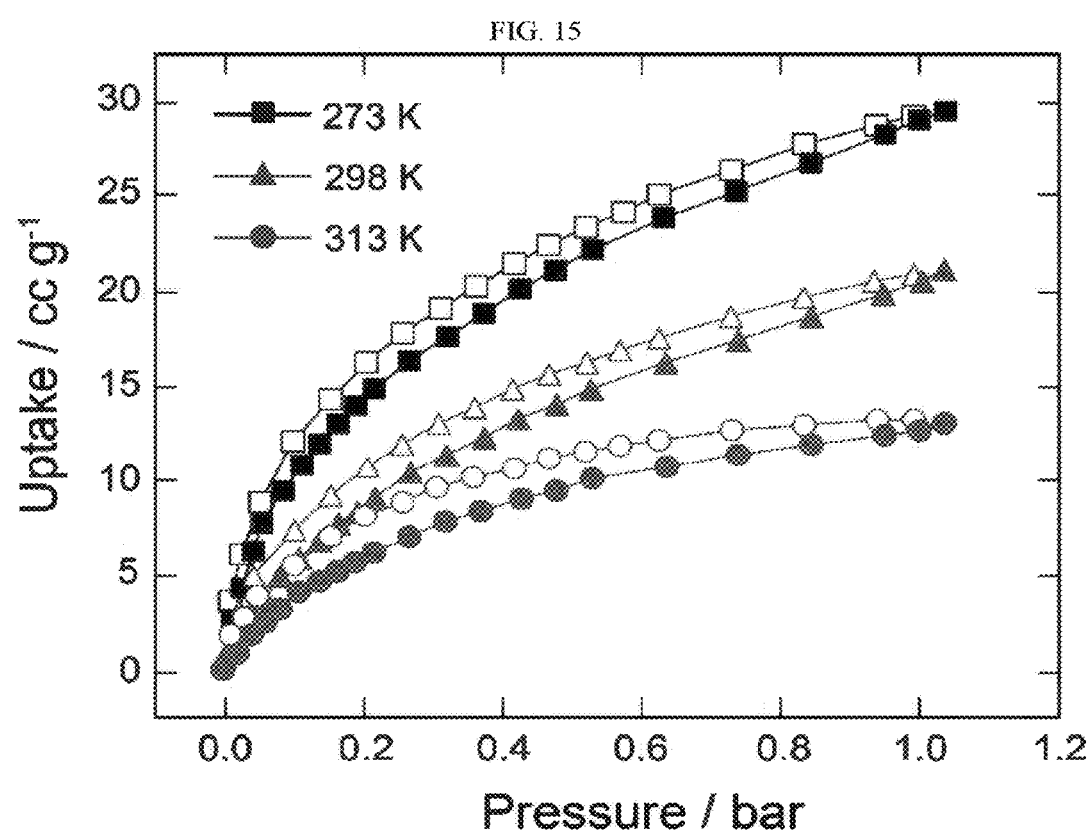
FIG. 15 is a graph illustrating $CO_2$ isotherms for PSM-nZIF-7 at 273 K, 298 K, and 313 K.
Figure 16:
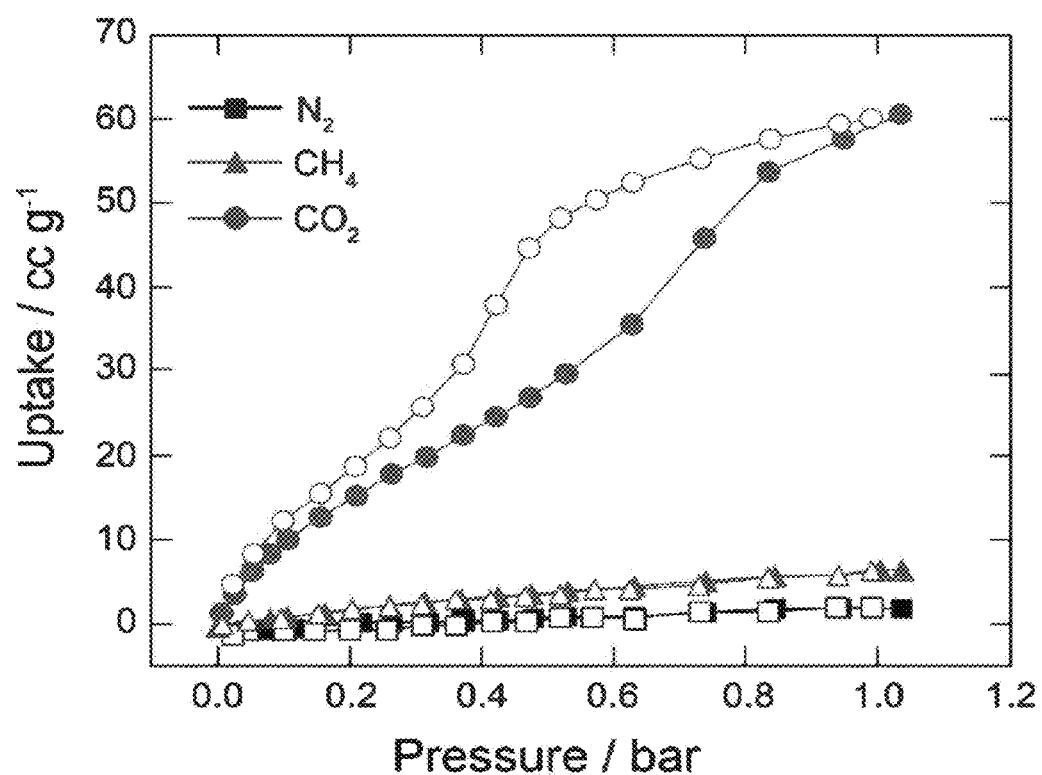
FIG. 16 is a graph illustrating $N_2$, $CH_4$, and $CO_2$ isotherms for nZIF-7 at 298 K.
Figure 17:
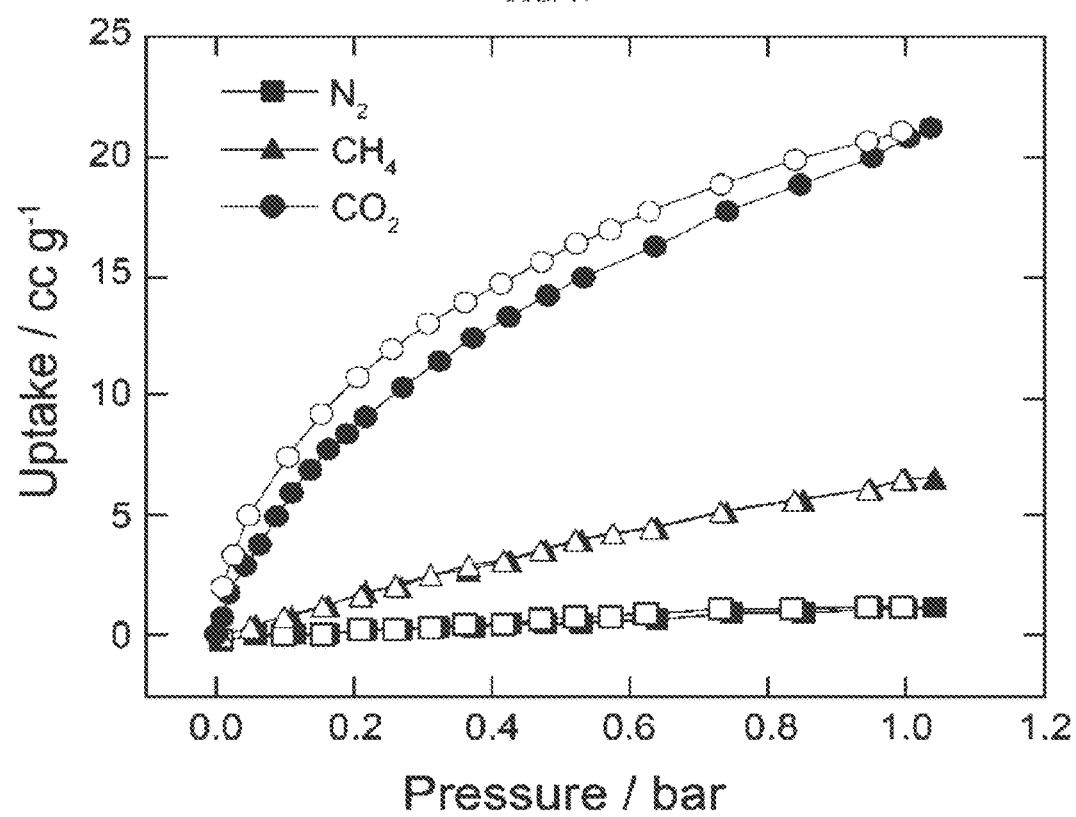
FIG. 17 is a graph illustrating $N_2$, $CH_4$, and $CO_2$ isotherms for PSM-nZIF-7 at 298 K.

FIG. 11 shows that PSM-nZIF-7 retained the particle size and homogeneous morphology of nZIF-7.

Prior to the preparation of mixed-matrix membranes, the porosities and thermal stabilities of both nZIF-7 and PSM-nZIF-7 were analyzed by $N_2$ adsorption isotherms at 77 K and thermogravimetric analysis (TGA). Accordingly, the Brunauer-Emmett-Teller (BET) and Langmuir surface areas of nZIF-7 satisfactorily agreed with the values previously reported. Specifically, the BET (Langmuir) surface area of nZIF-7 was calculated to be 350 (485) $m^2 g^{-1}$ as compared with 360 (480) $m^2 g^{-1}$ reported for ZIF-7 (Chen, D.-L.; Wang, N.; Wang, F.-F.; Xie, J.; Zhong, Y.; Zhu, W.; Johnson, J. K.; Krishna, R., Utilizing the gate-opening mechanism in ZIF-7 for adsorption discrimination between $N_2O$ and $CO_2$. J. Phys. Chem. C 2014, 118, 17831-17837; Zhao, P.; Lampronti, G. I.; Lloyd, G. O.; Suard, E.; Redfern, S. A. T., Direct visualization of carbon dioxide adsorption in gate-opening zeolitic imidazolate framework ZIF-7. J. Mater. Chem. A 2014, 2, 620-623, each incorporated herein by reference in their entirety). Similarly, the BET (Langmuir) surface area for PSM-nZIF-7 was found to be 290 (410) $m^2g^{-1}$, which was higher than previously reported (BET, 210 $m^2 g^{-1}$) (see Table 1). FIGS. 14-17 show the thermodynamic adsorption behavior of PSM-nZIF-7. FIGS. 12-17 show the adsorption and desorption isotherms for nZIF-7 and PSM-nZIF-7. The filled and open symbols represent adsorption and desorption branches, respectively. The connecting curves are guides for the eye.

TABLE 1

Summary of the thermodynamic gas adsorption measurements for nZIF-7 and PSM-nZIF-7.

|  | $A_{BET} m^2 g^{-1}$ | $A_{Long} m^2 g^{-1}$ | $CO_2$ uptake (273K) | $CO_2$ uptake (298K) | $CO_2$ uptake (313K) | $N_2$ uptake (298K) | $CH_4$ uptake (298K) |
|---|---|---|---|---|---|---|---|
| nZIF-7 | 347 | 485 | 73.9 | 60.3 | 40.1 | 1.9 | 6.4 |
| PSM-nZIF-7 | 287 | 408 | 29.5 | 21.1 | 13.1 | 1.1 | 6.6 |

Figure 18:
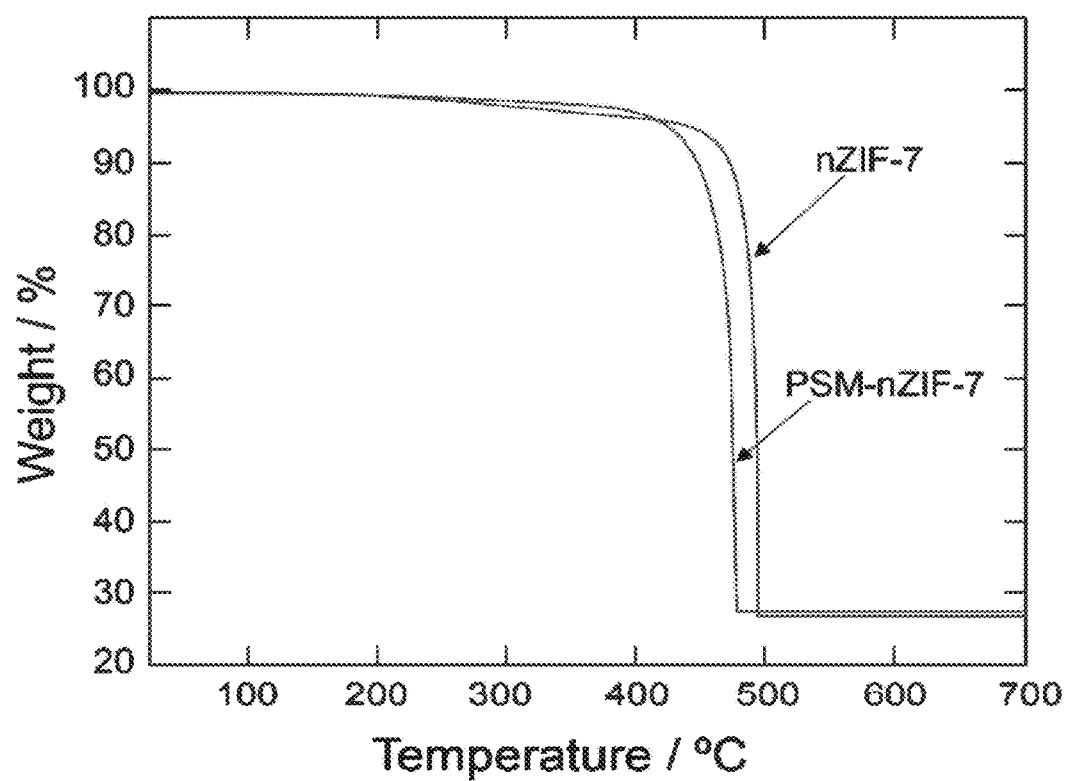
FIG. 18 is a graph illustrating a thermogravimetric (TGA) curve of nZIF-7 and PSM-nZIF-7 at a heating rate of 5° C. min$^{-1}$ under airflow.
Figures 20A, 20B:
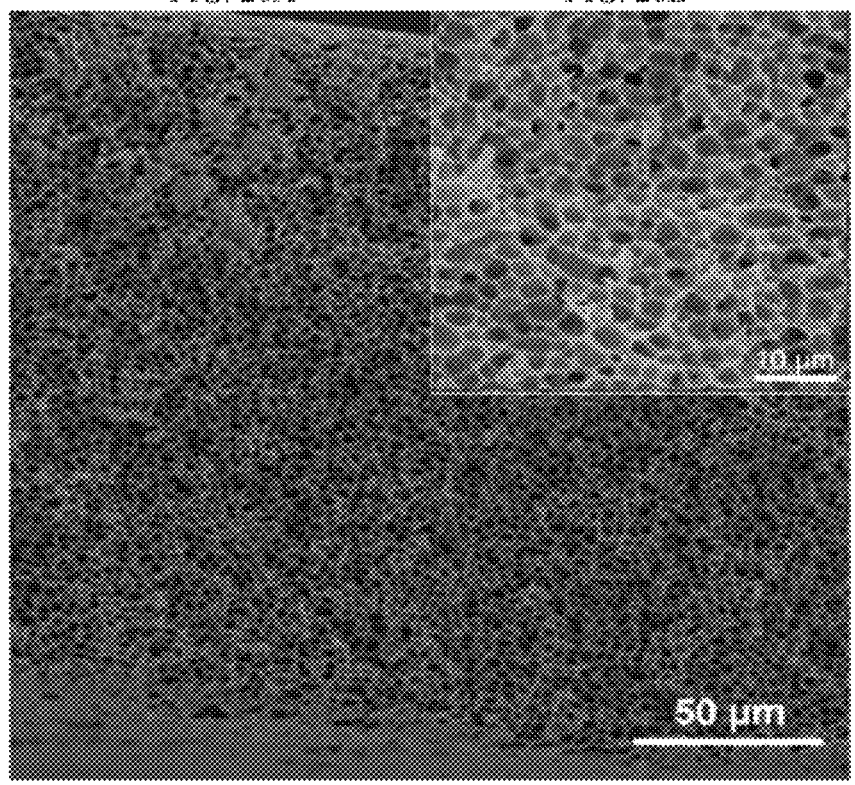
FIG. 20A is a scanning electron micrograph of a cross section of the 5 wt % nZIF-7/PEI mixed matrix membrane.
FIG. 20B is a scanning electron micrograph of the cross section of the 5 wt % nZIF-7/PEI mixed matrix membrane.

The gas adsorption data clearly indicates that PSM-nZIF-7 was still porous even after the post synthetic modification linker exchange. It is noted that the observed hysteresis upon desorption is well known to occur for ZIF-7 as there exists a gate opening effect resulting from the free rotation of the benzimidazolate linker connected to the neighboring $Zn^{2+}$ sites (Chen, D.-L.; Wang, N.; Wang, F.-F.; Xie, J.; Zhong, Y.; Zhu, W.; Johnson, J. K.; Krishna, R., Utilizing the gate-opening mechanism in ZIF-7 for adsorption discrimination between $N_2O$ and $CO_2$. J. Phys. Chem. C 2014, 118, 17831-17837; Zhao, P.; Lampronti, G. I.; Lloyd, G. O.; Suard, E.; Redfern, S. A. T., Direct visualization of carbon dioxide adsorption in gate-opening zeolitic imidazolate framework ZIF-7. J. Mater. Chem. A 2014, 2, 620-623, each incorporated herein by reference in its entirety). FIG. 18 shows nZIF-7 and PSM-nZIF-7 exhibited thermal decompositions occurring at 460° C. and 430° C., respectively, demonstrating the two structures are architecturally robust.

After successful synthesis and characterization of nZIF-7 and PSM-nZIF-7, mixed matrix membranes were prepared with PEI functioning as the matrix. In a typical procedure, methanol-exchanged nZIF-7 or PSM-nZIF-7 nanoparticles were first suspended in N,N-dimethylacetamide (DMA) in order to replace the methanol. A PEI solution in DMA was then prepared and stirred under vacuum at 45° C. for 18 h in order to completely dissolve the PEI. At this point, the DMA-exchanged nZIF-7 or PSM-nZIF-7 was suspended within the PEI solution to afford a final concentration of 20 wt % PEI with respect to DMA and a 5 wt % loading of the appropriate nZIF. This concentration and loading were chosen in order to obtain a solution density that was suitable for casting a final mixed matrix membrane with enough mechanical stability under the prescribed working pressure and to avoid the formation of defects within the resulting mixed matrix membrane, respectively. Casting of the nZIF-7/PEI and PSM-nZIF-7/PEI suspensions took place with the aid of a casting knife. The mixed matrix membranes were then solvent exchanged with methanol and activated at 100° C. for 18 h prior to further structural characterization.

The textural properties of the mixed matrix membranes were analyzed by SEM. FIGS. 19A, 19B, 20A, 20B, 21A, 21B, 22A, and 22B show that the pure polymeric membrane and the mixed matrix membranes exhibited unique, sponge-like structures.

Figure 23A:
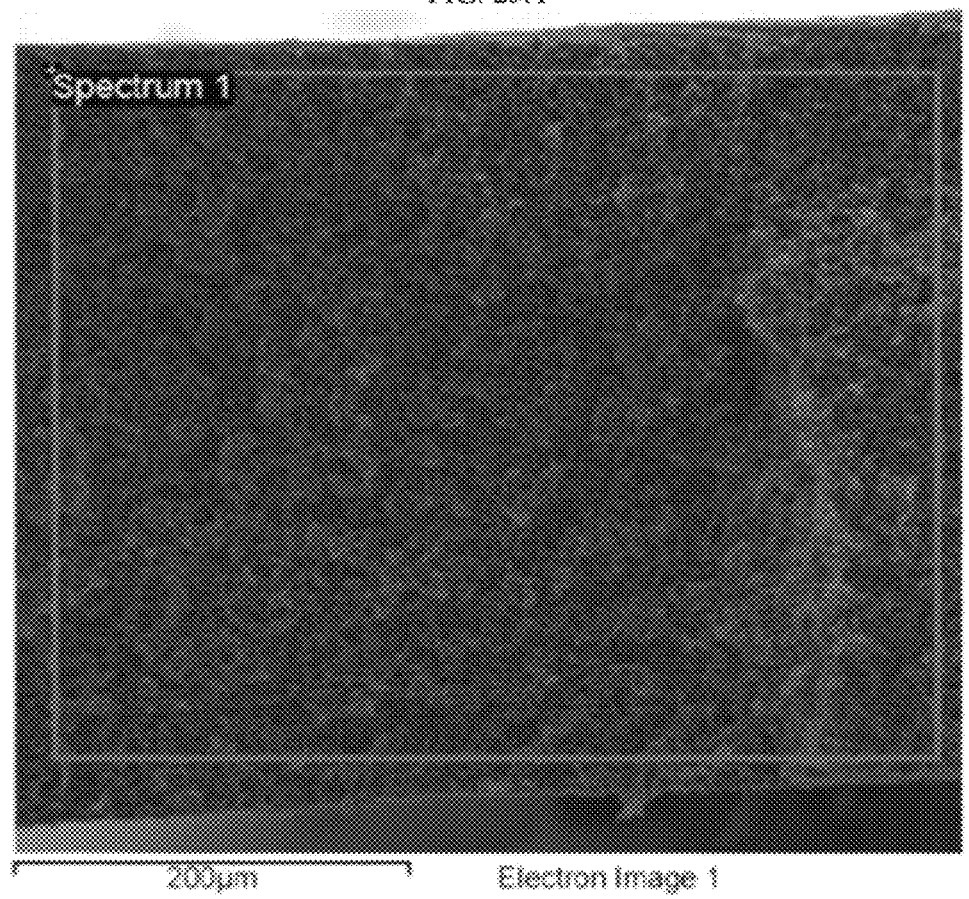
FIG. 23A is a scanning electron micrograph of the cross section of a pure PEI membrane.
Figure 23B:
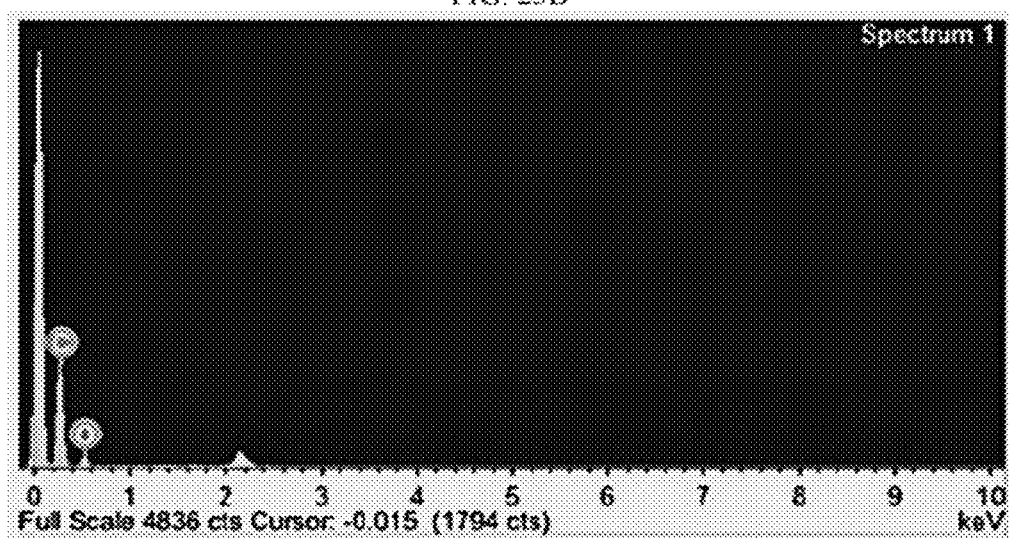
FIG. 23B is an energy dispersive X-ray spectroscopy (EDX) spectrum of the cross section of the pure PEI membrane in FIG. 23A.
Figure 24A:
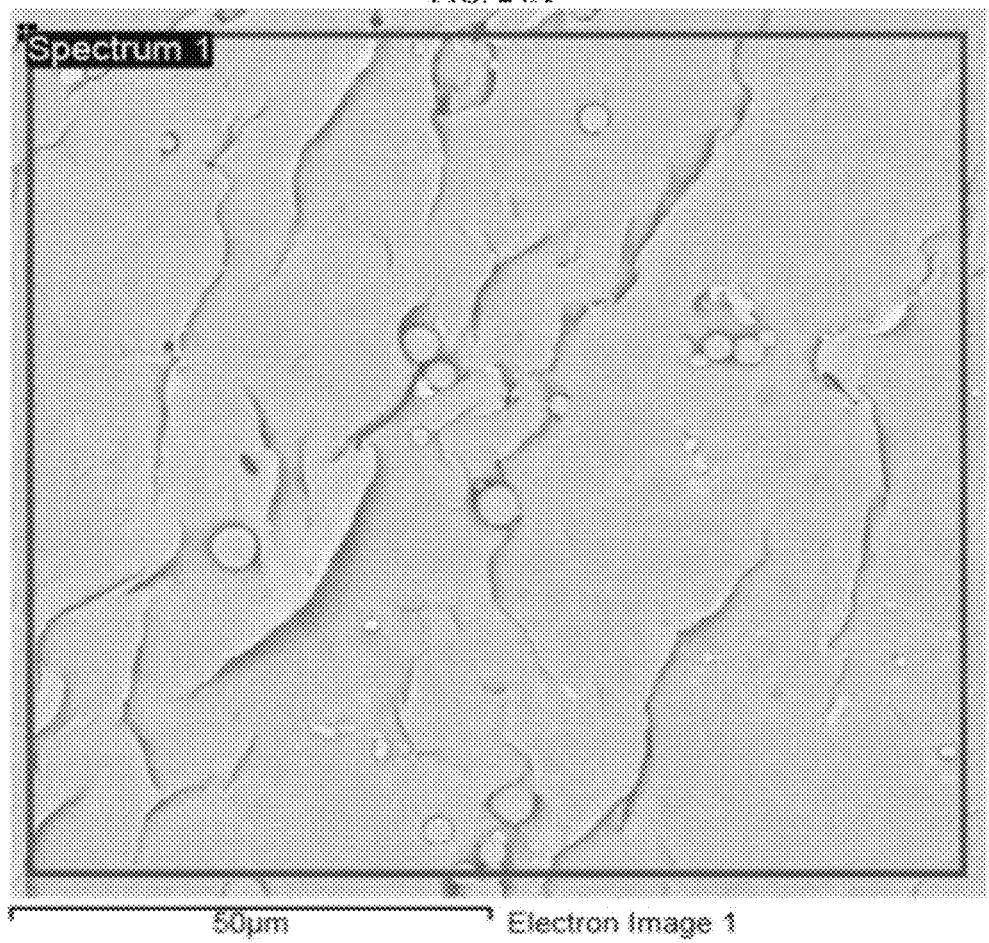
FIG. 24A is a scanning electron micrograph of the surface of nZIF-7/PEI mixed matrix membrane.
Figure 24B:
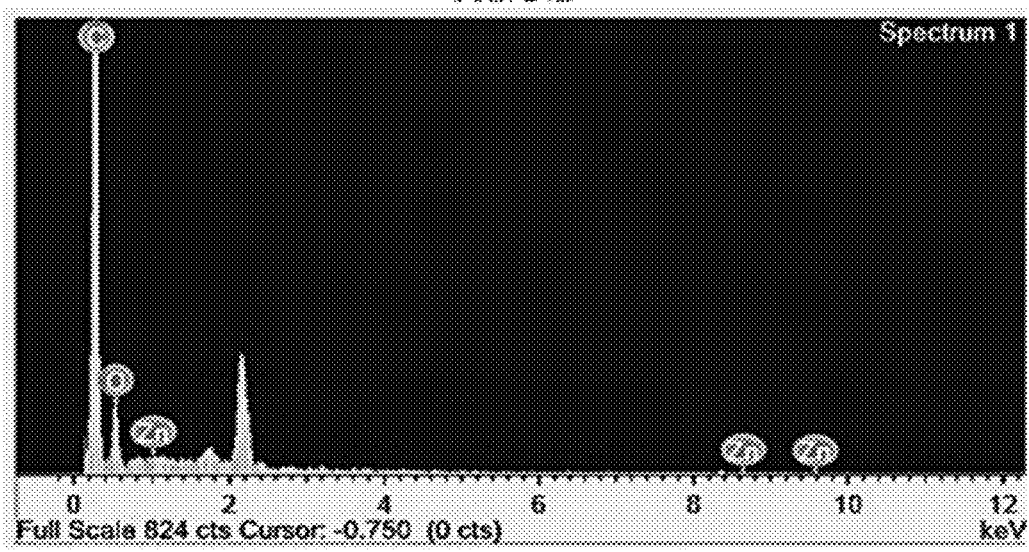
FIG. 24B is an EDX spectrum of the surface of the nZIF-7/PEI mixed matrix membrane in FIG. 24A.
Figure 25A:
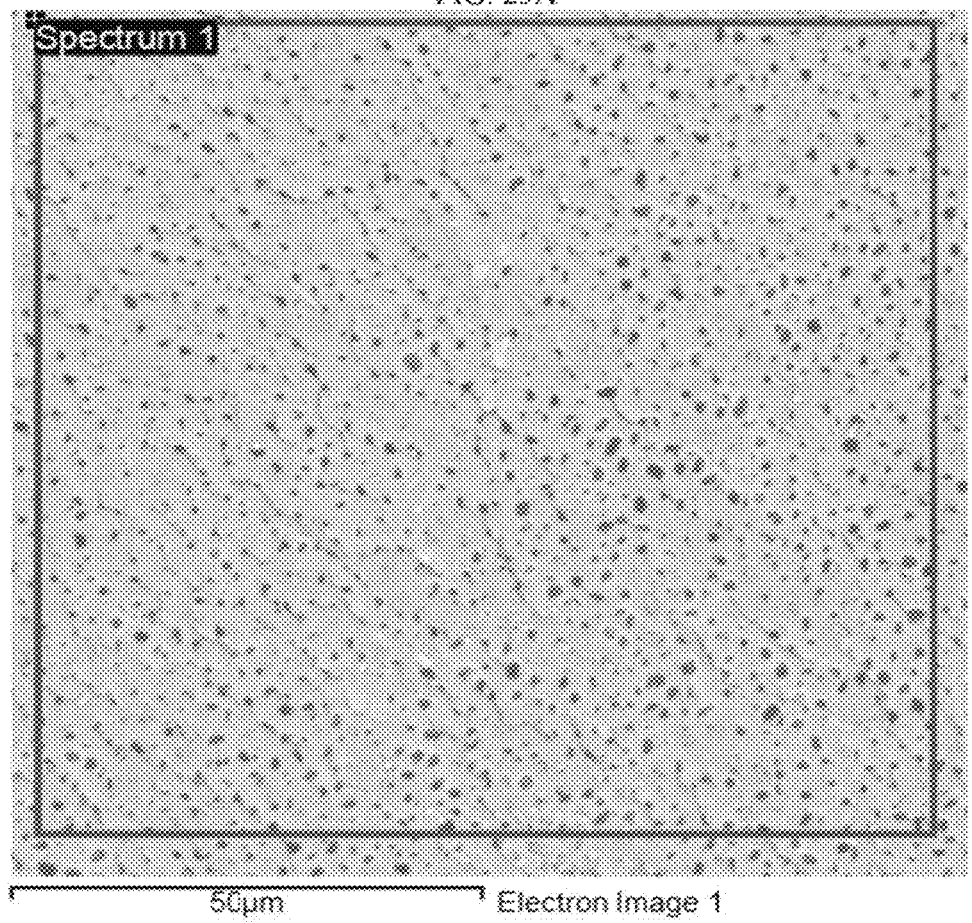
FIG. 25A is a scanning electron micrograph of the surface of PSM-nZIF-7/PEI mixed matrix membrane.
Figure 25B:
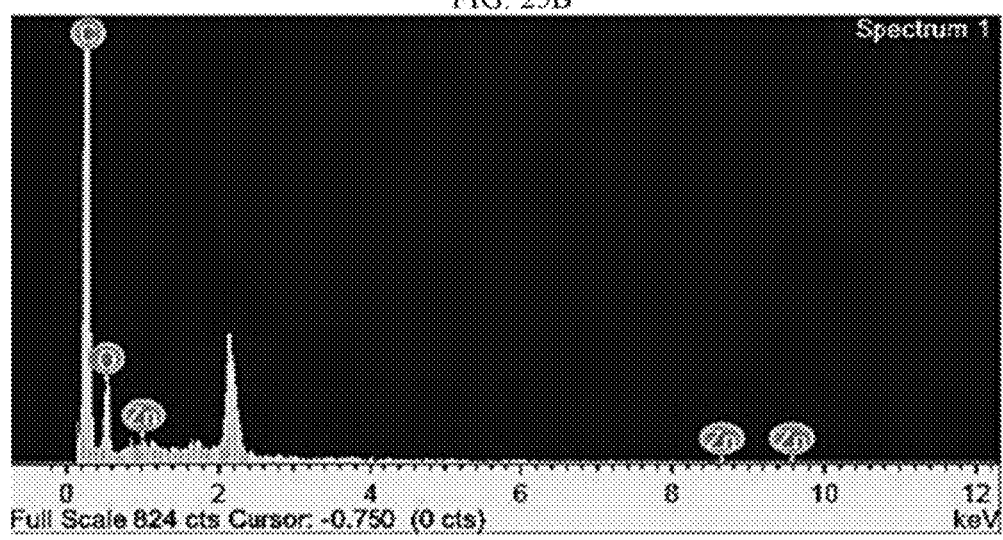
FIG. 25B is an EDX spectrum of the surface of the PSM-nZIF-7/PEI mixed matrix membrane in FIG. 25A.
Figure 26A:
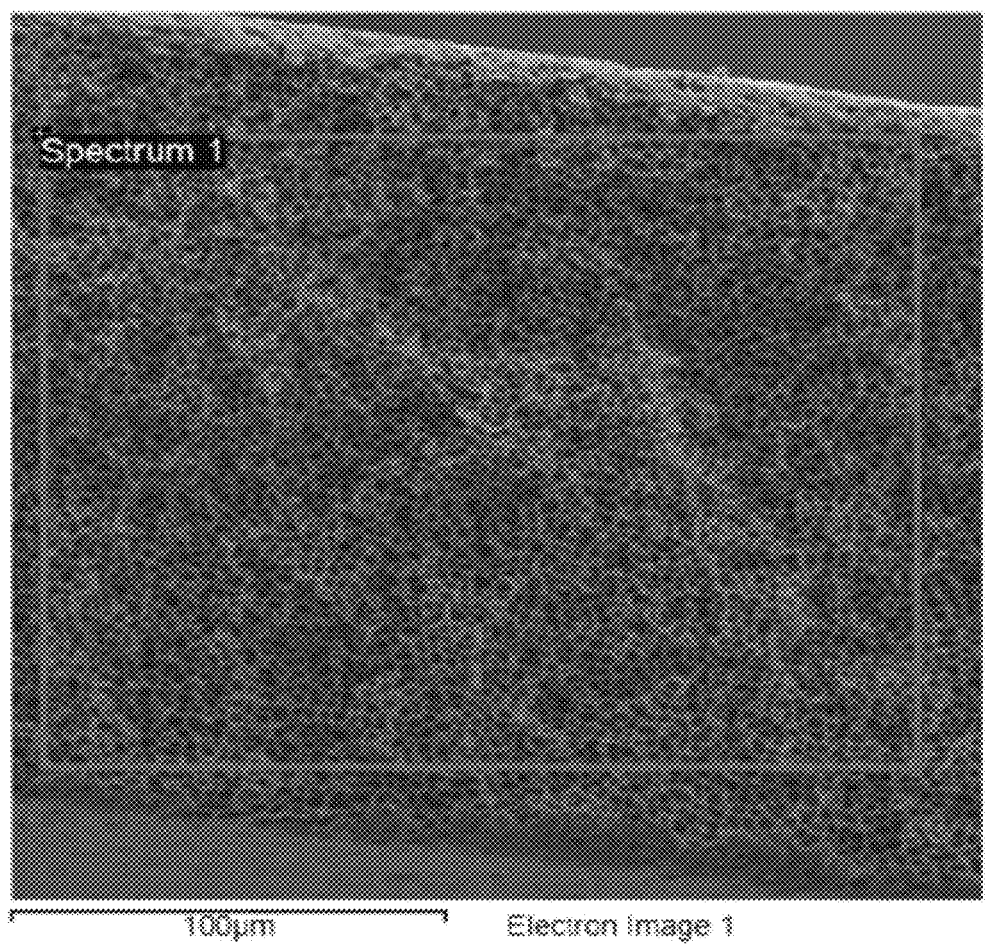
FIG. 26A is a scanning electron micrograph of the cross section of the nZIF-7/PEI mixed matrix membrane.
Figure 26B:
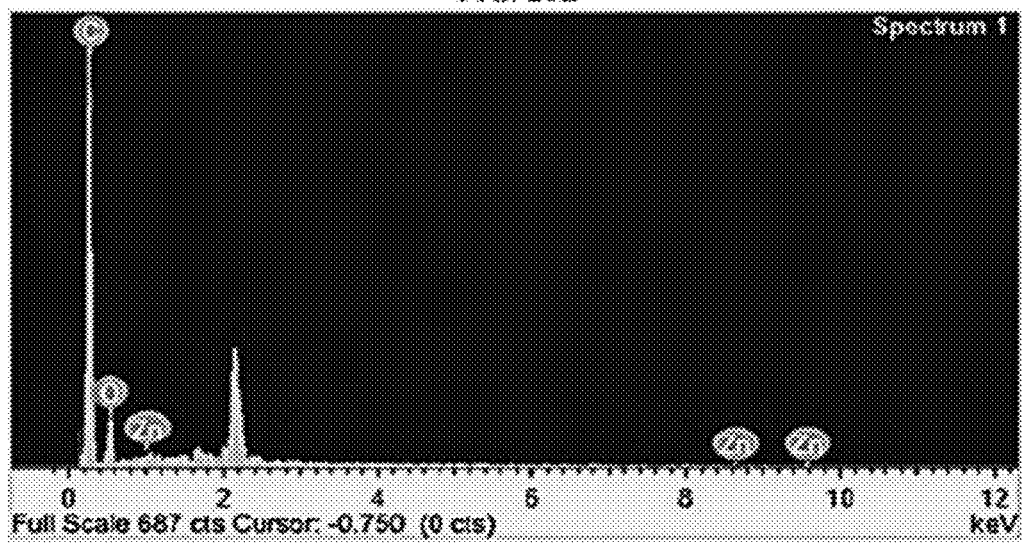
FIG. 26B is an EDX spectrum of the cross section of the nZIF-7/PEI mixed matrix membrane in FIG. 26A.
Figure 27A:
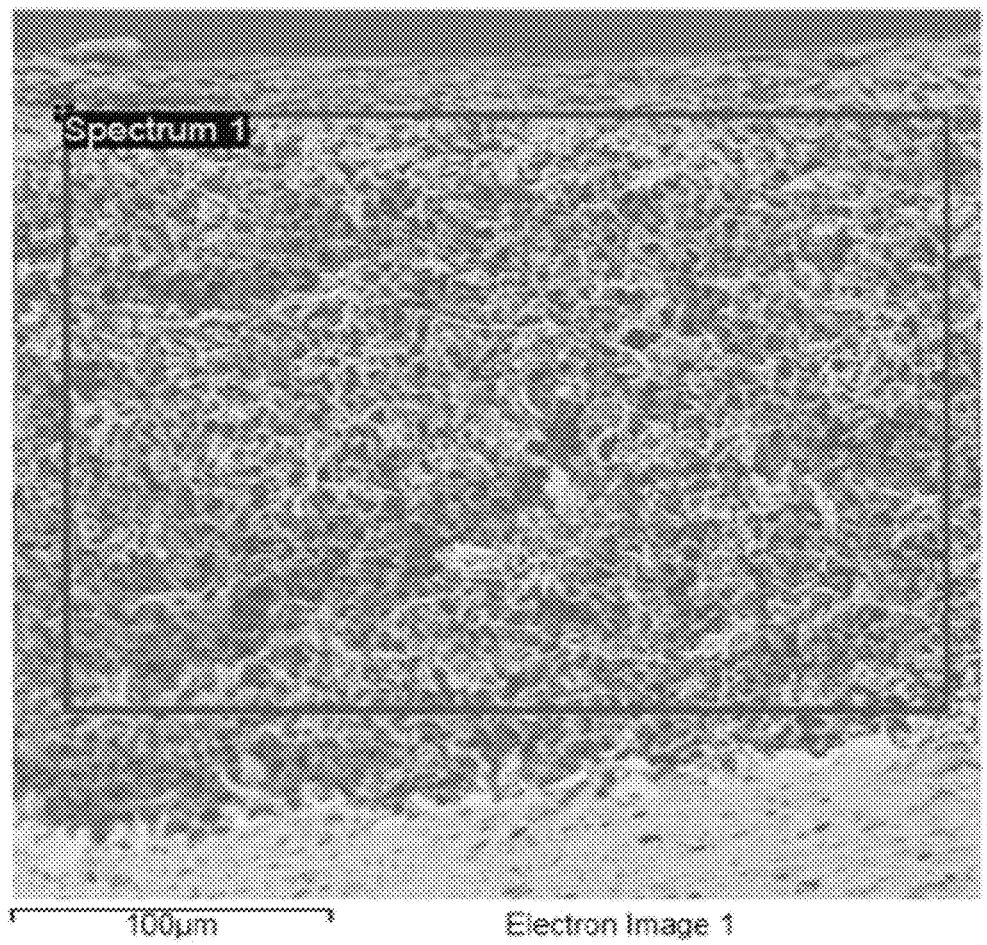
FIG. 27A is a scanning electron micrograph of the cross section of PSM-nZIF-7/PEI mixed matrix membrane.
Figure 27B:
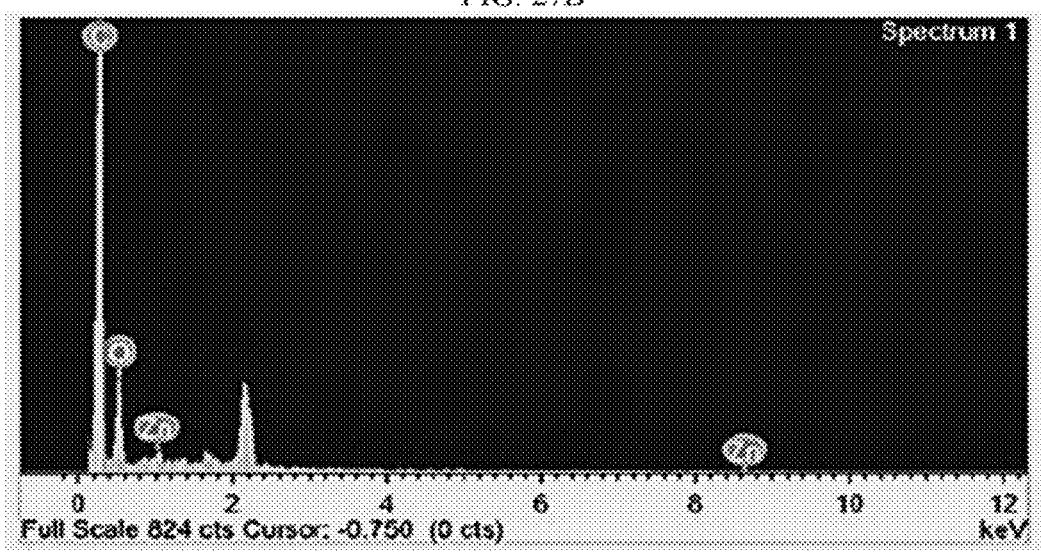
FIG. 27B is an EDX spectrum of the cross section of the PSM-nZIF-7/PEI mixed matrix membrane in FIG. 27A.
Figure 28A:
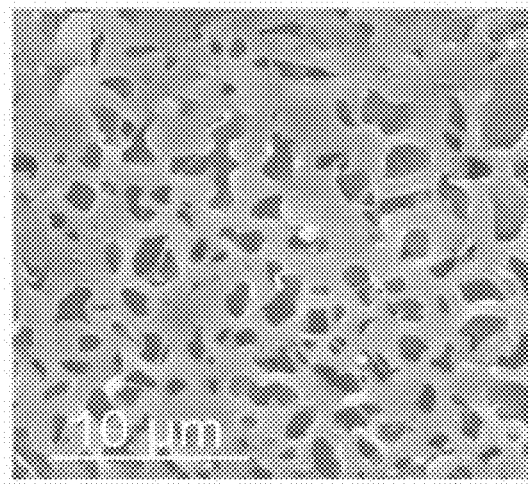
FIG. 28A is a scanning electron micrograph of the surface of the nZIF-7/PEI mixed matrix membrane.
Figure 28B:
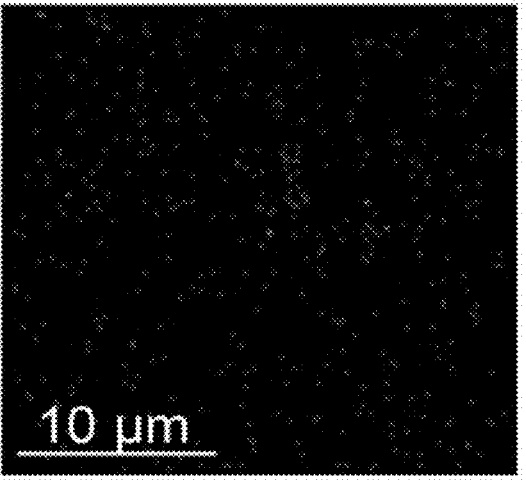
FIG. 28B is an EDX element map of zinc on the surface of the nZIF-7/PEI mixed matrix membrane shown in FIG. 28A.
Figure 28C:
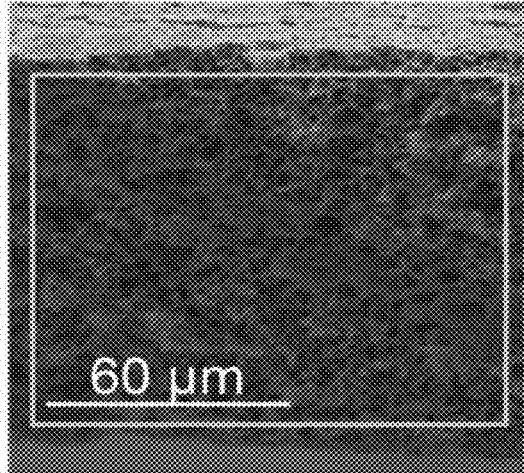
FIG. 28C is a scanning electron micrograph of the cross section of the nZIF-7/PEI mixed matrix membrane.
Figure 28D:
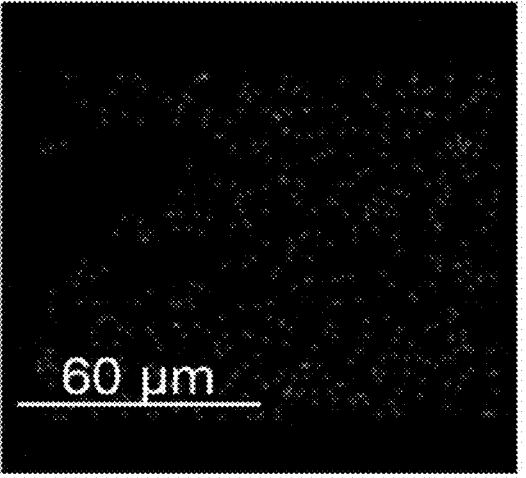
FIG. 28D is an EDX element map of zinc on the cross section of the nZIF-7/PEI mixed matrix membrane shown in FIG. 28C.
Figure 29A:
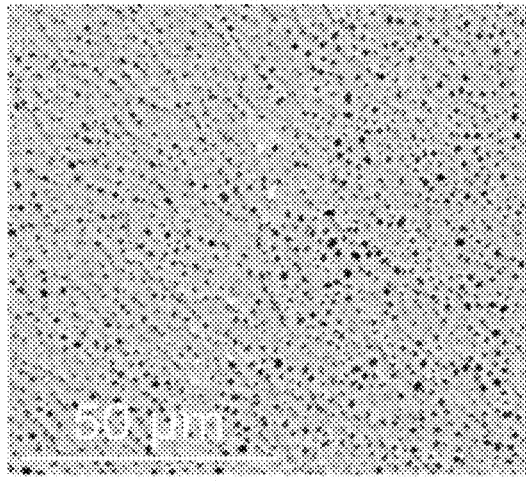
FIG. 29A is a scanning electron micrograph of the surface of the PSM-nZIF-7/PEI mixed matrix membrane.
Figure 29B:
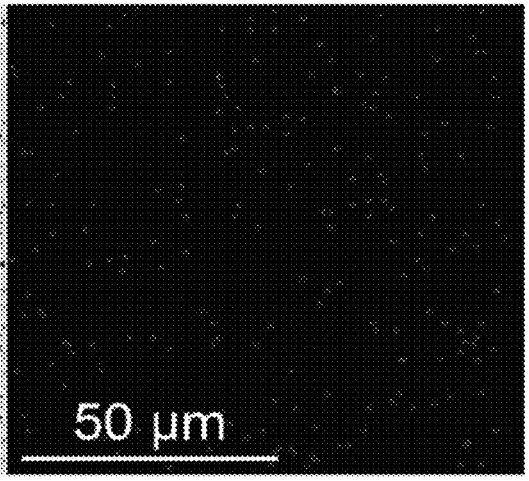
FIG. 29B is an EDX element map of zinc on the surface of the PSM-nZIF-7/PEI mixed matrix membrane shown in FIG. 29A.
Figure 29C:
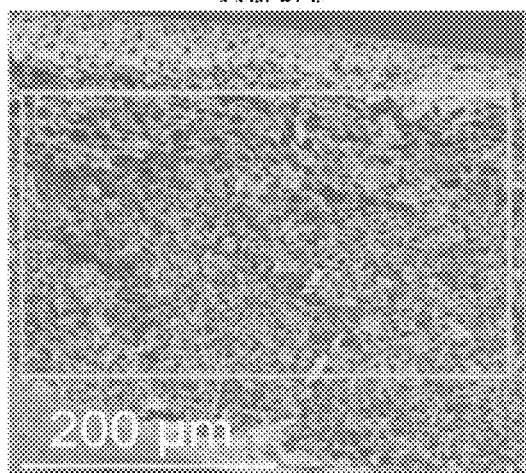
FIG. 29C is a scanning electron micrograph of the cross section of the PSM-nZIF-7/PEI mixed matrix membrane.
Figure 29D:
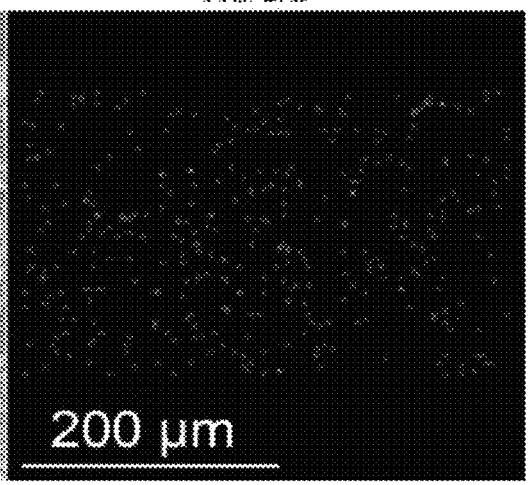
FIG. 29D is an EDX element map of zinc on the cross section of the PSM-nZIF-7/PEI mixed matrix membrane shown in FIG. 29C.

FIGS. 23A and 23B show that zinc is absent in the pure polymeric membrane. FIGS. 24A, 24B, 25A, 25B, 26A, 26B, 27A, and 27B show that zinc is present on the surfaces and in the cross sections of the mixed matrix membranes. This observation led to the conclusion that nZIF-7 and PSM-nZIF-7 were dispersed throughout the mixed matrix membranes.

FIGS. 28A, 28B, 29A, and 29B show that zinc, which is indicative of the presence of the respective ZIF, is widely dispersed throughout the entirety of the mixed matrix membranes.

Figure 30:
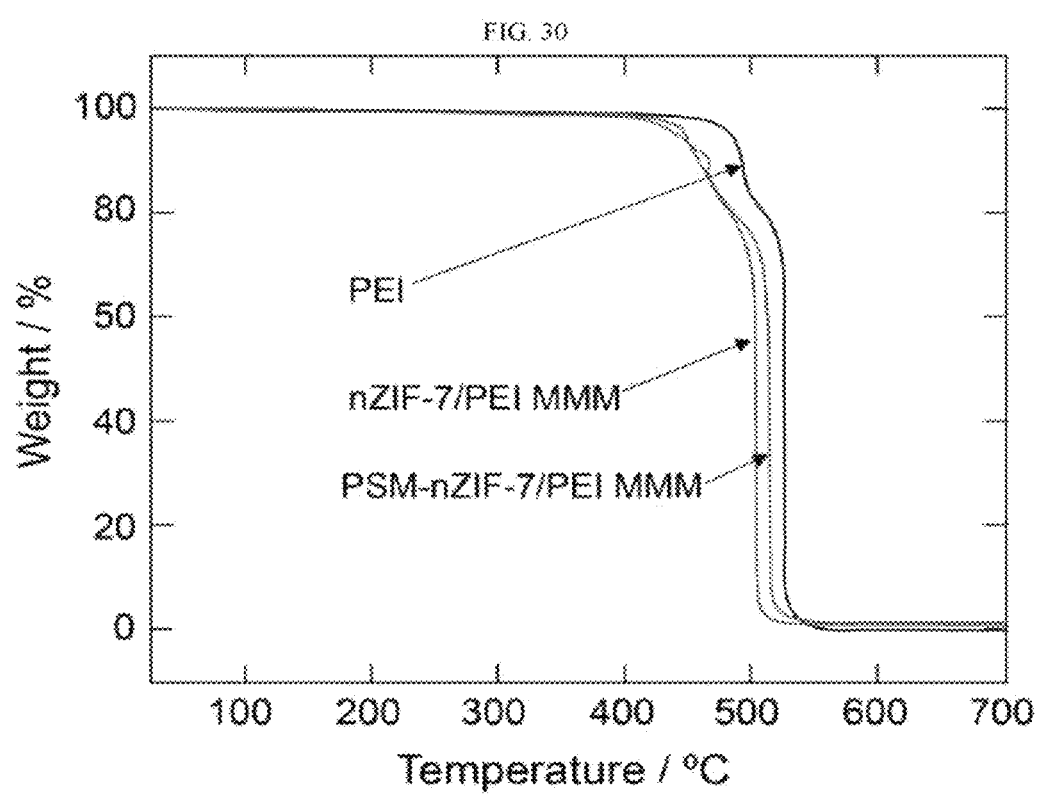
FIG. 30 is an overlay of thermogravimetric curves of the pure PEI membrane, nZIF-7/PEI mixed matrix membrane, and PSM-nZIF-7/PEI mixed matrix membrane, at a heating rate of 5° C. min$^{-1}$ under air.
Figure 31:
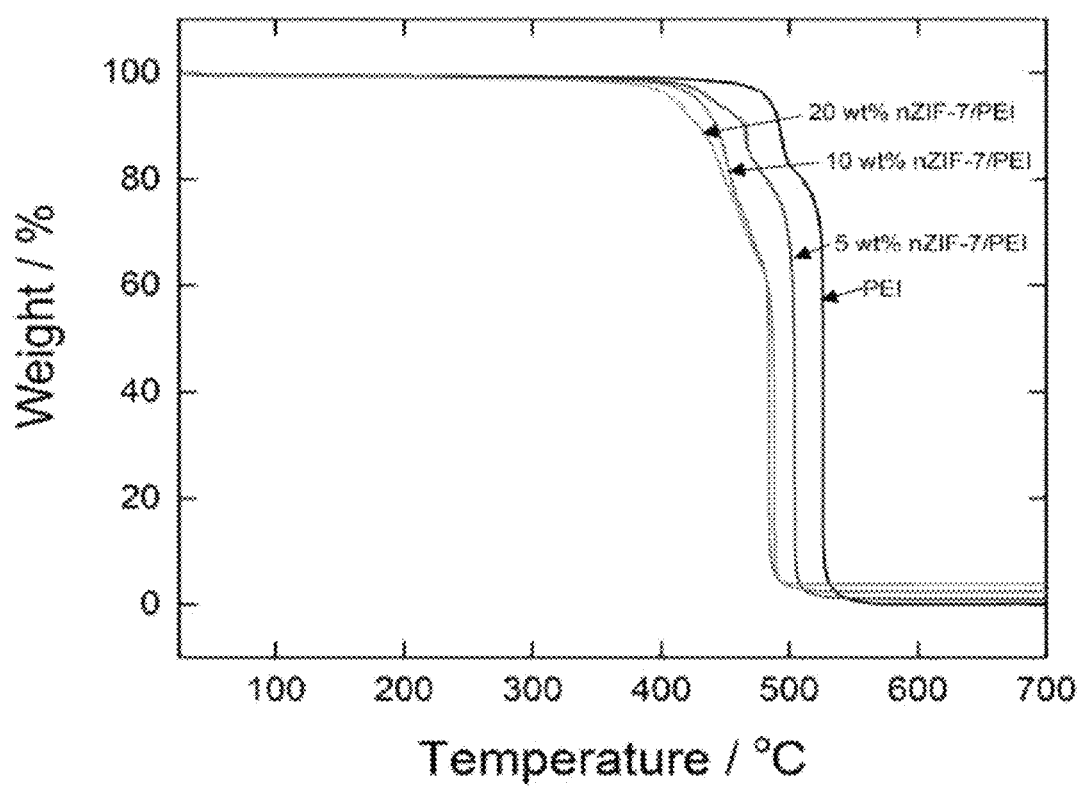
FIG. 31 is an overlap of the thermogravimetric curves of the pure PEI membrane, 5 wt %, 10 wt %, and 20 wt % nZIF-7/PEI mixed matrix membrane, at a heating rate of 5° C. min$^{-1}$ under air.

To show the mixed membranes are thermally stable, TGA experiments were conducted. FIG. 30 shows the decomposition of the pure PEI membrane and the mixed matrix membranes occured at 500° C. and 430° C., respectively. A decrease in the decomposition temperature was noted with an increase of nZIF-7 loading in the mixed matrix membranes. FIG. 31 shows that the decomposition temperature is less than 400° C. for the 20 wt % nZIF-7/PEI mixed matrix membrane.

Example 3 Single Gas Permeation Measurements

Figure 2B:
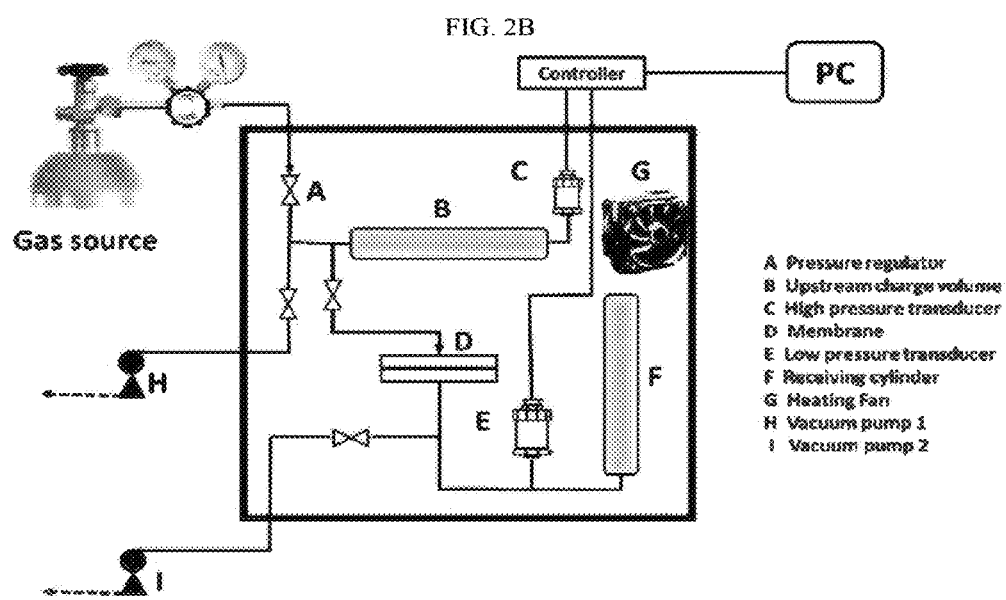
FIG. 2B illustrates a custom built constant-volume/variable-pressure (CV/VP) gas permeation setup.

FIG. 2B shows the in-house constant volume, variable pressure (CV/VP) apparatus used to measure the pure gas permeability by time-lag analysis. A permeation cell (Millipore high pressure 316 stainless filter holder, 25 mm) was used to mount and seal the membranes from leaks using O-rings. Prior to each run, the entire apparatus was evacuated under reduced pressure (35 mTorr) at 35° C. This process occurred while monitoring the rate of downstream, steady-state pressure. A successful leak-free system was concluded when the off-gassing was <1% of the rate of steady-state pressure rise compared to penetrant gas.

All pure gas experiments were run at a feed pressure of 1520 Torr (2.03 bar). The downstream pressure rise during a permeation measurement was monitored using an 8 Torr Pfeiffer transducer. FIG. 3 shows that the permeation experiment was continued for a total time of at least 10 times the time-lag. Upon completion of a single CV/VP gas permeation measurement, the sample cell was re-evacuated to the initial pressure to proceed with the next gas to be analyzed.

All single gas measurements were carried out three times in order to ensure reproducibility and to confirm the absence of residual gas from the previous run.

The permeability of the pure gas was calculated from equation (1):

$$P = 10^{10} \left( \frac{dp_d^{SS}}{dt} - \frac{dp_d^{LR}}{dt} \right) \frac{V_d l}{(p_{up} - p_d) ART} \qquad (1)$$

Where P is the permeability coefficient in Barrer, $dp_d/dt^{SS}$ is the downstream pressure rise (cmHg/s) at the steady state, $dp_d/dt^{LR}$ is the downstream "leak rate" (cmHg/s), $V_d$ is the downstream volume ($cm^3$), l is the membrane thickness (cm), $p_{up}$ is the upstream pressure (cmHg), A is the membrane area ($cm^2$), R is the gas constant [0.278 $cm^3$ cmHg/ ($cm^3$(STP) K)], and T is the temperature at measurement (K).

The apparent diffusion coefficient was calculated from the time lag, θ (s), using equation (2):

$$D = \frac{l^2}{6\theta} \qquad (2)$$

The solubility coefficient, S ($cm^3$(STP)/($cm^3$ cmHg)), was calculated from equation (3) with the assumption that permeation occurred via the solution-diffusion mechanism $$S = \frac{P}{D} \qquad (3)$$

Selectivity for a gas pair, i and j, was calculated by $$\alpha_j^i = \frac{P_i}{P_j} \qquad (4)$$

To assess and compare the permeation properties of the pure PEI membrane with the nZIF-7/PEI and PSM-nZIF-7/PEI mixed matrix membranes, constant volume, variable pressure (CV/VP) gas permeation measurements were performed.

Figure 32:
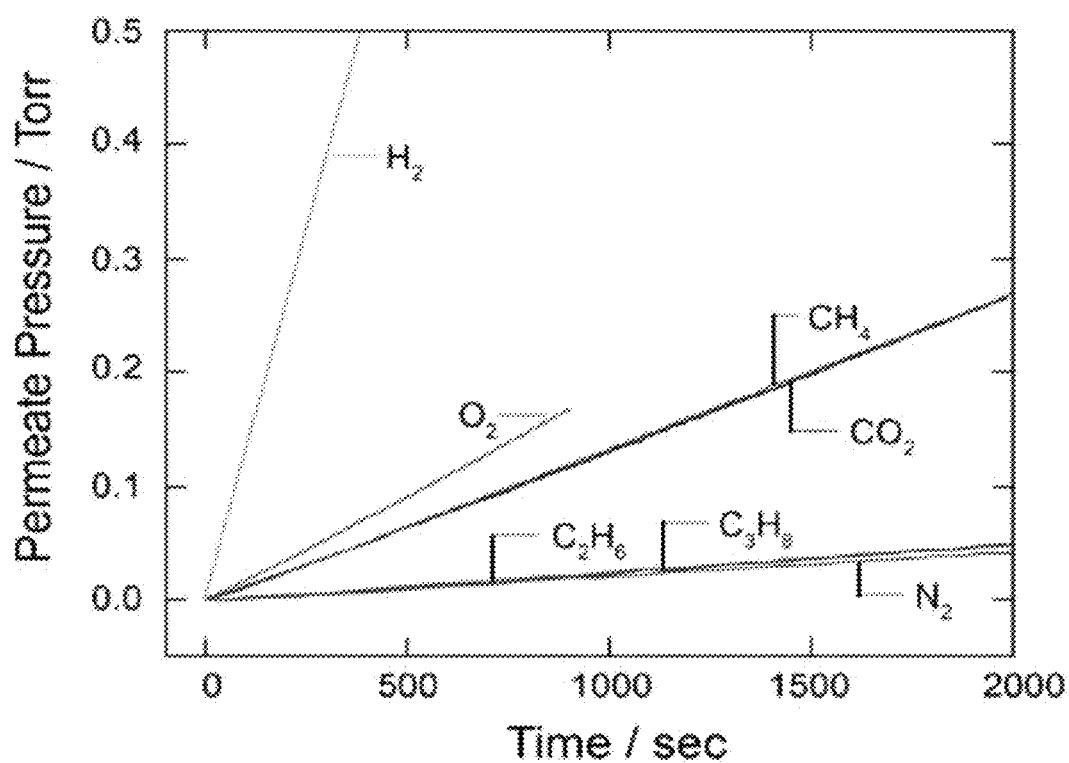
FIG. 32 is a graph illustrating single gas permeation against time for a pure PEI membrane at 35° C. and 1520 Torr.
Figure 33:
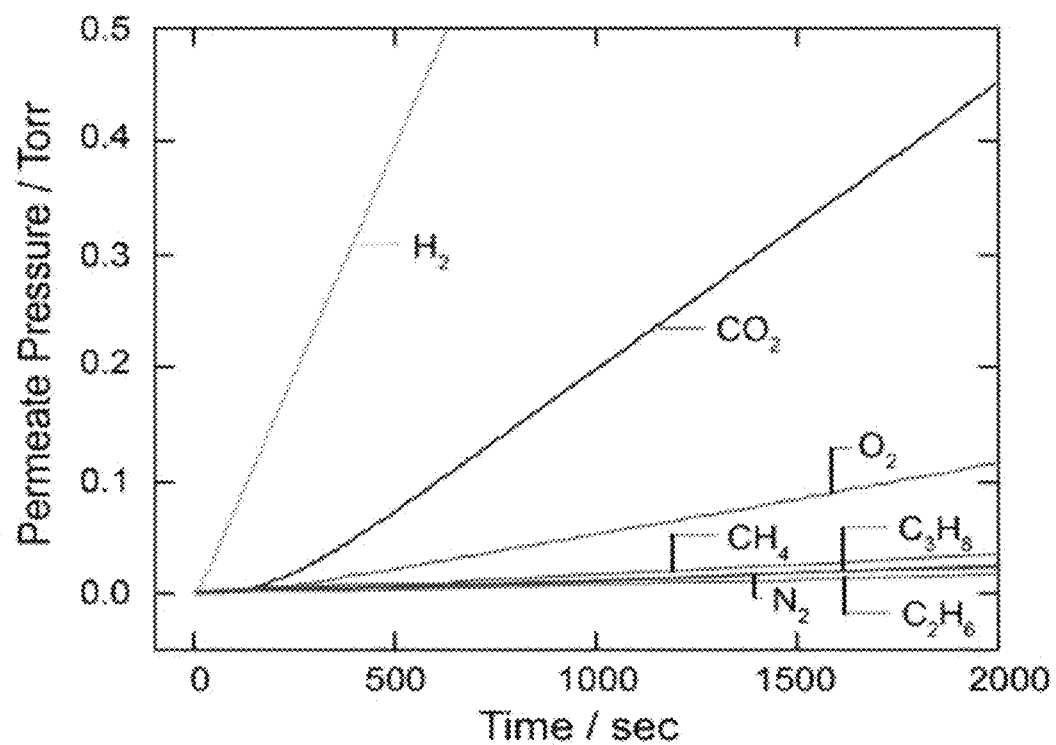
FIG. 33 is a graph illustrating single gas permeation against time for the nZIF-7/PEI mixed matrix membrane at 35° C. and 1520 Torr.
Figure 34:
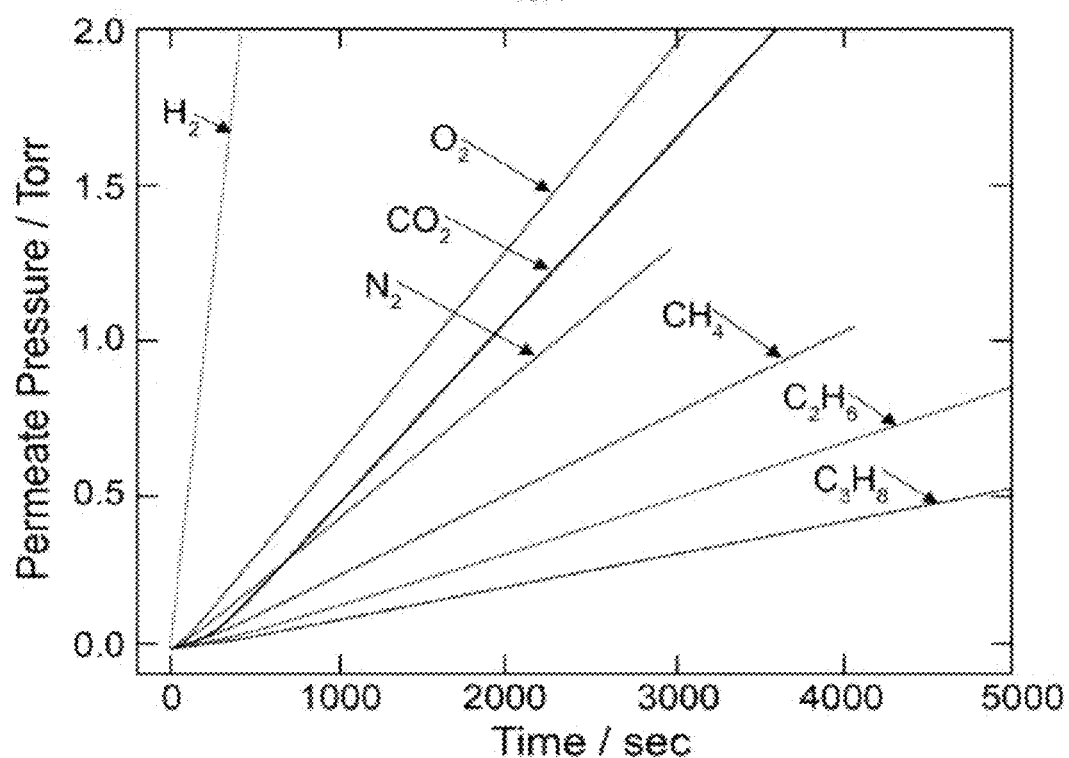
FIG. 34 is a graph illustrating single gas permeation against time for PSM-nZIF-7/PEI mixed matrix membrane at 35° C. and 1520 Torr.

Accordingly, each sample was separately loaded into a permeation cell. Residual solvents were completely removed from the pure PEI membrane and the mixed matrix membranes by evacuating the samples loaded in the permeation cell in situ at 35° C. for ~24 h. Once the cells were determined to be leak-free, CV/VP single gas permeation measurements were performed with $H_2$, $O_2$, $N_2$, $CO_2$, $CH_4$, $C_2H_6$, and $C_3H_8$ gases. Typically, upon halting the evacuation of the permeation cell, an upstream pressure of 1520 Torr (2.03 bar) was applied using the appropriate gas. Subsequently, the rise in downstream pressure for each gas permeation test was recorded as a function of time. A steady-state was finally declared for the gas permeation once there was a constant slope of permeate pressure, as shown in FIGS. 32-34.

The $O_2/N_2$ selectivity for all the membranes was always higher than the Knudsen diffusion selectivity (5.5, 4.2, and 1.5 vs. 1.1 for the pure PEI membrane, nZIF-7/PEI mixed matrix membrane, and PSM-nZIF-7/PEI mixed matrix membrane vs. Knudsen diffusion selectivity, respectively), which, in conjunction with the time-lag recorded for each gas, represents a confirmation of the membrane reliability (Al-Maythalony, B. A.; Shekhah, O.; Swaidan, R.; Belmabkhout, Y.; Pinnau, I.; Eddaoudi, M., Quest for anionic MOF membranes: Continuous SOD-ZMOF membrane with $CO_2$ adsorption-driven selectivity. J. Am. Chem. Soc. 2015, 137, 1754-1757, incorporated herein by reference in its entirety).

Permeability Trends.

Figure 35:
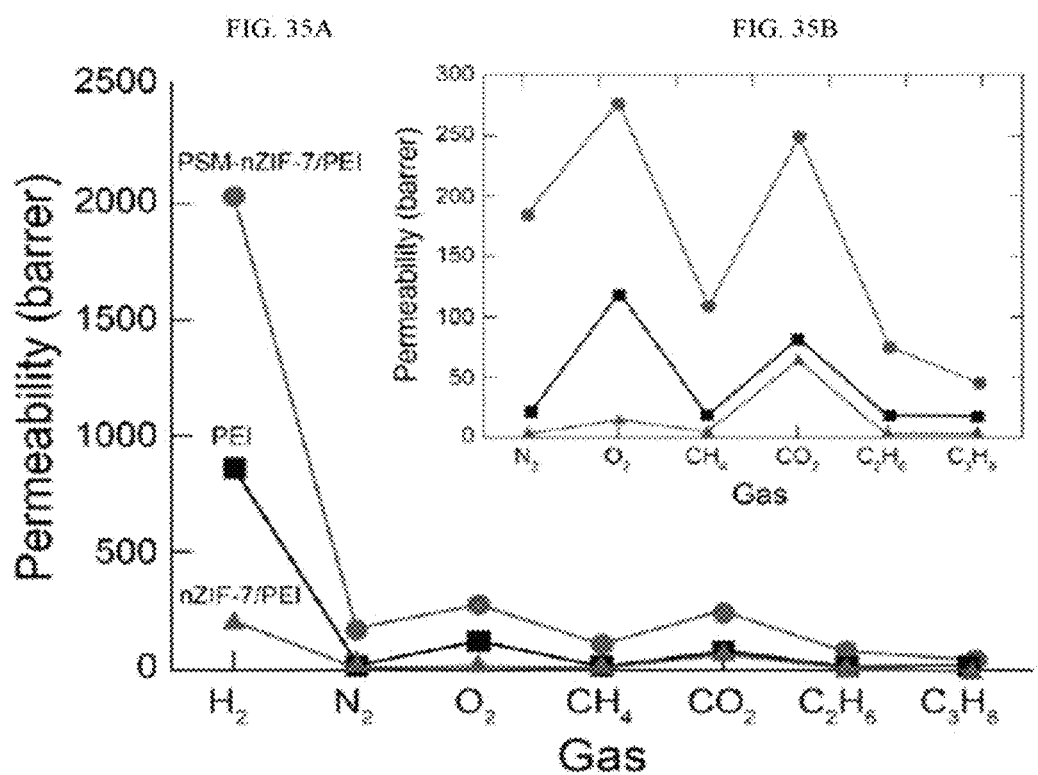
FIG. 35A is a graph illustrating CV/VP single gas permeation of different gases on a pure PEI membrane, a nZIF-7/PEI mixed matrix membrane, and a PSM-nZIF-7/PEI mixed matrix membrane.
FIG. 35B is an expanded view of FIG. 35A for gases $N_2$ to $C_3H_8$.

The permeability obtained from the CV/VP single gas permeation measurements are summarized in Table 2 and, in general, follow the increasing trend of nZIF-7/PEI mixed matrix membrane<PEI membrane<PSM-nZIF-7/PEI mixed matrix membrane. Table 2, FIGS. 35A and 35B show that the permeability for $H_2$ in the pure PEI membrane (856.1 barrer) and the mixed matrix membranes (207.0 and 2020.9 barter for nZIF-7/PEI and PSM-nZIF-7/PEI mixed matrix membranes, respectively) is the highest when compared to all other tested gases.

TABLE 2

Permeability of pure PEI membrane, and nZIF-7/PEI and PSM-nZIF-7/PEI MMMs.

| Gas | Permeability (barrel)[a] | | |
|---|---|---|---|
| | PEI | nZ1F-7/PEI | PSM-nZIF-7/PEI |
| $H_2$ | 856.1 | 207.0 | 2020.9 |
| $CO_2$ | 82.5 | 64.7 | 245.9 |
| $O_2$ | 119.9 | 15.9 | 272.9 |
| $N_2$ | 21.8 | 3.8 | 182.6 |
| $CH_4$ | 18.9 | 5.0 | 107.9 |
| $C_2H_6$ | 18.9 | 3.2 | 73.3 |
| $C_3H_8$ | 18.3 | 3.0 | 45.5 |

[a]Conditions for the CV/VP single gas permeation measurements: pre-evacuation at 35° C. followed by the introduction of an upstream pressure of 1520 Torr (2.03 bar) for each single gas measured. 1 barrer = $10^{-10}$ [cm$^3$(STP) cm]/[cm$^2$ s cmHg].

By blending nZIF-7 in PEI, there was a significant decrease in the permeability for all gases analyzed when compared with those observed for the pure PEI membrane. Despite this decrease, the $CO_2$ permeability was observed to be less affected than the other gases studied. On the other hand, blending PSM-nZIF-7 in PEI led to an enhancement in permeability of all tested gases compared to the pure PEI membrane. For example, the permeability of $H_2$ (2020.9 barrer) and $CO_2$ (245.9 barrer) increased by factors of 2.4 and 3, respectively, for PSM-nZIF-7/PEI mixed matrix membrane in comparison to the pure PEI membrane. The unique permeability trends are not only a result of the molecular sieving effect, which has been found for other ZIF-based mixed matrix membranes (Wang, Z.; Wang, D.; Zhang, S.; Hu, L.; Jin, J., Interfacial design of mixed matrix membranes for improved gas separation performance. Adv. Mater. 2016, 28, 3399-3405). In those cases, the permeability would be expected to follow the trend of $H_2$ (2.89 Å)>$CO_2$ (3.3 Å)>$O_2$ (3.46 Å)>$N_2$ (3.6 Å)>$CH_4$ (3.8 Å)>$C_2H_6$, (3.9 Å)>$C_3H_8$ (5.12 Å) (the kinetic diameter for $CO_2$ is 3.3 Å). The fact that it does not for the mixed matrix membranes, reveals that the permeability is based upon more than simple diffusivity.

Comparison of Ideal Selectivity.

The high permeability for $H_2$ resulted in $H_2/O_2$, $H_2/CO_2$, $H_2/CH_4$, $H_2/C_2H_6$, and $H_2/C_3H_8$ gas pair ideal selectivities for the pure PEI membrane of 7.1, 10.4, 46.6, 45.4, and 46.8, respectively (see Table 2). Despite the observed decrease in overall permeability, the nZIF-7/PEI mixed matrix membrane demonstrated a remarkable enhancement in selectivity for the $H_2/O_2$, $H_2/C_2H_6$, and $H_2/C_3H_8$ gas pairs (13.0, 64.9, and 69.0, respectively, see Table 2) when compared to the pure PEI membrane. Although the $H_2/CO_2$ gas pair selectivity (3.2) was negatively impacted by the low $CO_2$ permeability, there was a substantially higher calculated $CO_2/N_2$ gas pair selectivity (16.8) when compared with those found for the pure PEI membrane (10.4 for $H_2/CO_2$ and 3.8 for $CO_2/N_2$). Furthermore, the $CO_2$ selectivity over hydrocarbon gases was highlighted by ideal selectivity values of 13.1 (4.5), 20.3 (4.4), and 21.6 (4.5) for $CO_2/CH_4$, $CO_2/C_2H_6$, and $CO_2/C_3H_8$ for nZIF-7/PEI mixed matrix membrane (pure PEI membrane), respectively (see Table 3). The nZIF-7/PEI mixed matrix membrane showed an improvement in $CO_2$/hydrocarbon and $CO_2/N_2$ gas pairs selectivities, and this improvement may be attributed to the presence of nZIF-7 particles in the mixed matrix membrane.

Permselectivity.

Although ideal selectivity is a useful measure for displaying the preferential permeation of different gases through a specific membrane, permselectivity is an indicator for the overall performance of membranes for practical gas separation processes. Indeed, permselectivity is a comparison of a material's ideal selectivity and permeability properties together for different gas systems (see FIGS. 36-40).

TABLE 3

Ideal selectivity (α) of pure PEI membrane, and nZIF-7/PEI and PSM-nZIF-7/PEI MMMs.

| Gas Pair | Ideal Selectivity (α)[a] | | |
|---|---|---|---|
| | PEI | nZIF-7/PEI | PSM-nZIF-7/PEI |
| $O_2/N_2$ | 5.5 | 4.2 | 1.5 |
| $H_2/O_2$ | 7.1 | 13.0 | 7.4 |
| $H_2/N_2$ | 39.2 | 53.9 | 11.1 |
| $H_2/CO_2$ | 10.4 | 3.2 | 8.2 |
| $H_2/CH_4$ | 46.6 | 41.8 | 18.7 |
| $H_2/C_2H_6$ | 45.4 | 64.9 | 27.6 |
| $H_2/C_3H_8$ | 46.8 | 69.0 | 46.3 |
| $CO_2/O_2$ | 0.7 | 4.1 | 0.9 |
| $CO_2/N_2$ | 3.8 | 16.8 | 1.3 |
| $CO_2/CH_4$ | 4.5 | 13.1 | 2.3 |
| $CO_2/C_2H_6$ | 4.4 | 20.3 | 3.4 |
| $CO_2/C_3H_8$ | 4.5 | 21.6 | 5.6 |
| $N_2/CH_4$ | 1.15 | 0.76 | 1.69 |

[a]Permeability ratio of the gas with the higher permeation relative to the gas with the lower.

Figure 36:
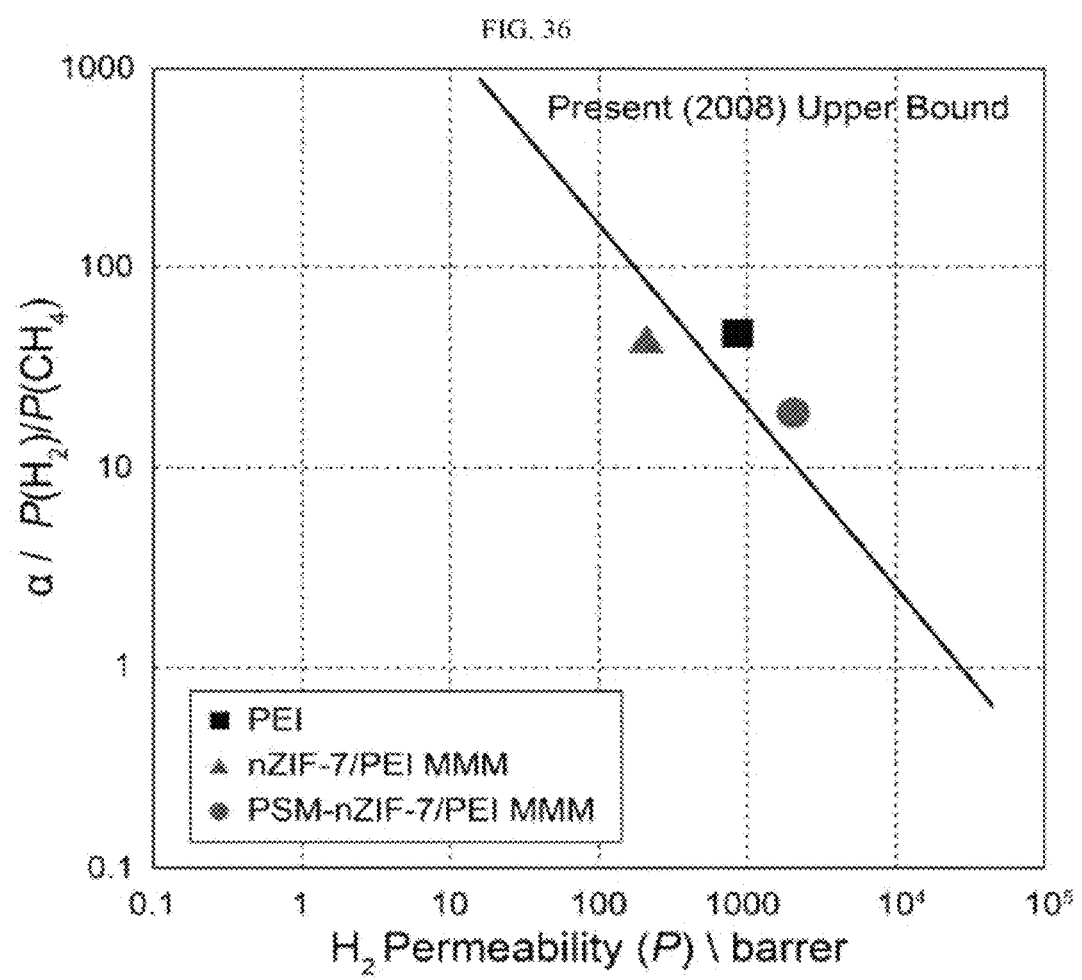
FIG. 36 is a graph illustrating the $H_2/CH_4$ relationship between permeability (P) and gas pair selectivity (a) in comparison with the Robeson upper bound curve for pure PEI membrane, nZIF-7/PEI mixed matrix membrane, and PSM-nZIF-7/PEI mixed matrix membrane.
Figure 37:
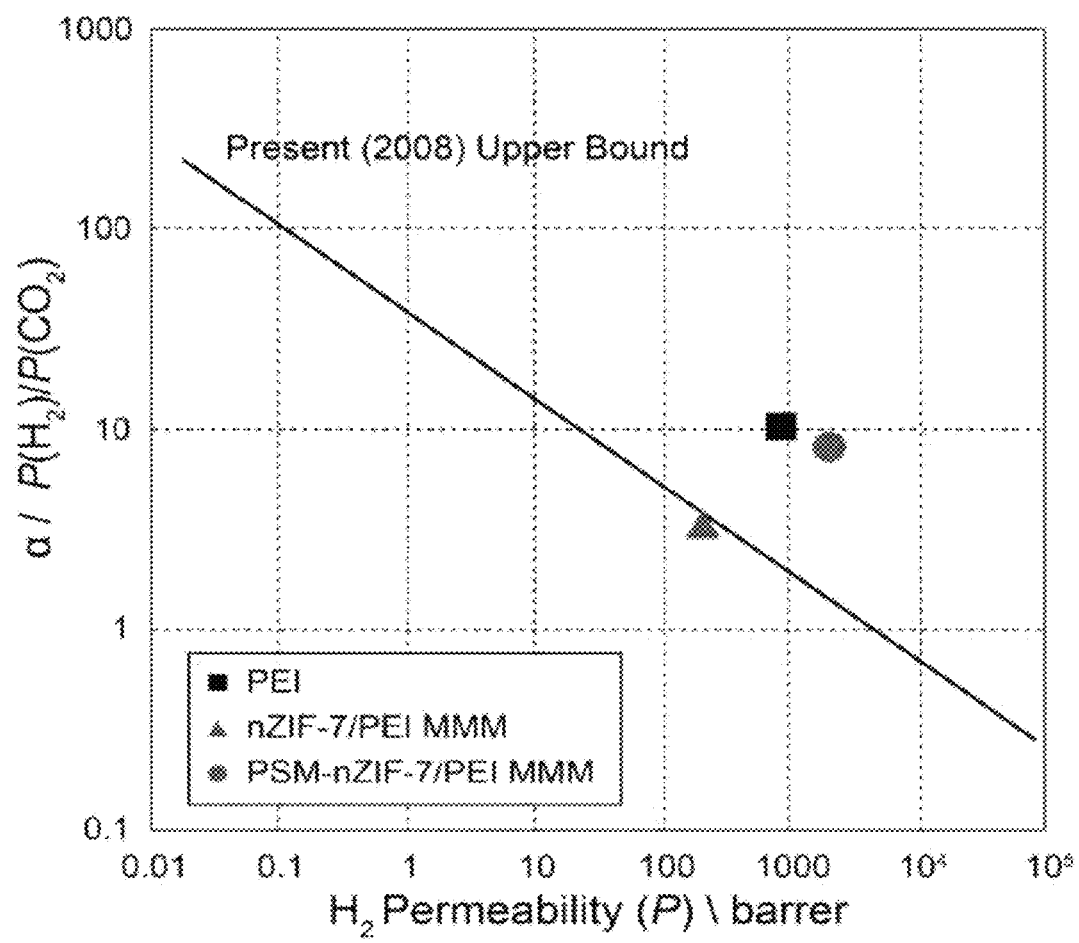
FIG. 37 is a graph illustrating the $H_2/CO_2$ relationship between permeability (P) and gas pair selectivity (a) in comparison with the Robeson upper bound curve for pure PEI membrane, nZIF-7/PEI mixed matrix membrane, and PSM-nZIF-7/PEI mixed matrix membrane.

Accordingly, the increased permeabilities of $H_2$, $CO_2$, and $CH_4$ for PSM-nZIF-7/PEI mixed membrane led to unprecedented permselectivities of $H_2/CH_4$ and $H_2/CO_2$ (18.7 and 8.2 selectivities, respectively, with a $H_2$ permeability of 2020.9 barrer), which surpass the present (2008) Robeson upper bound curve, as shown in FIGS. 36 and 37 (Robeson, L. M., The upper bound revisited. J. Membr. Sci. 2008, 320, 390-400, incorporated herein by reference in its entirety).

Figure 38:
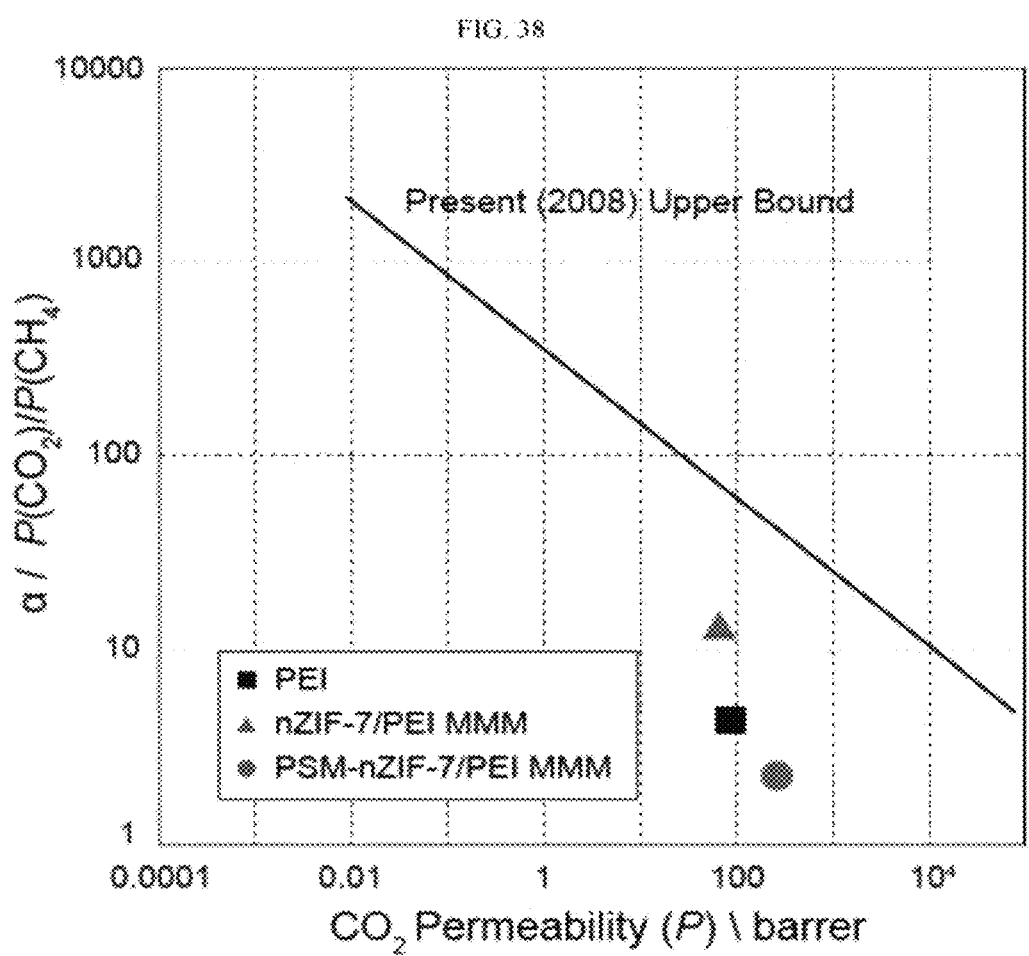
FIG. 38 is a graph illustrating the $CO_2/CH_4$ relationship between permeability (P) and gas pair selectivity (a) in comparison with the Robeson upper bound curve for pure PEI membrane, nZIF-7/PEI mixed matrix membrane, and PSM-nZIF-7/PEI mixed matrix membrane.
Figure 39:
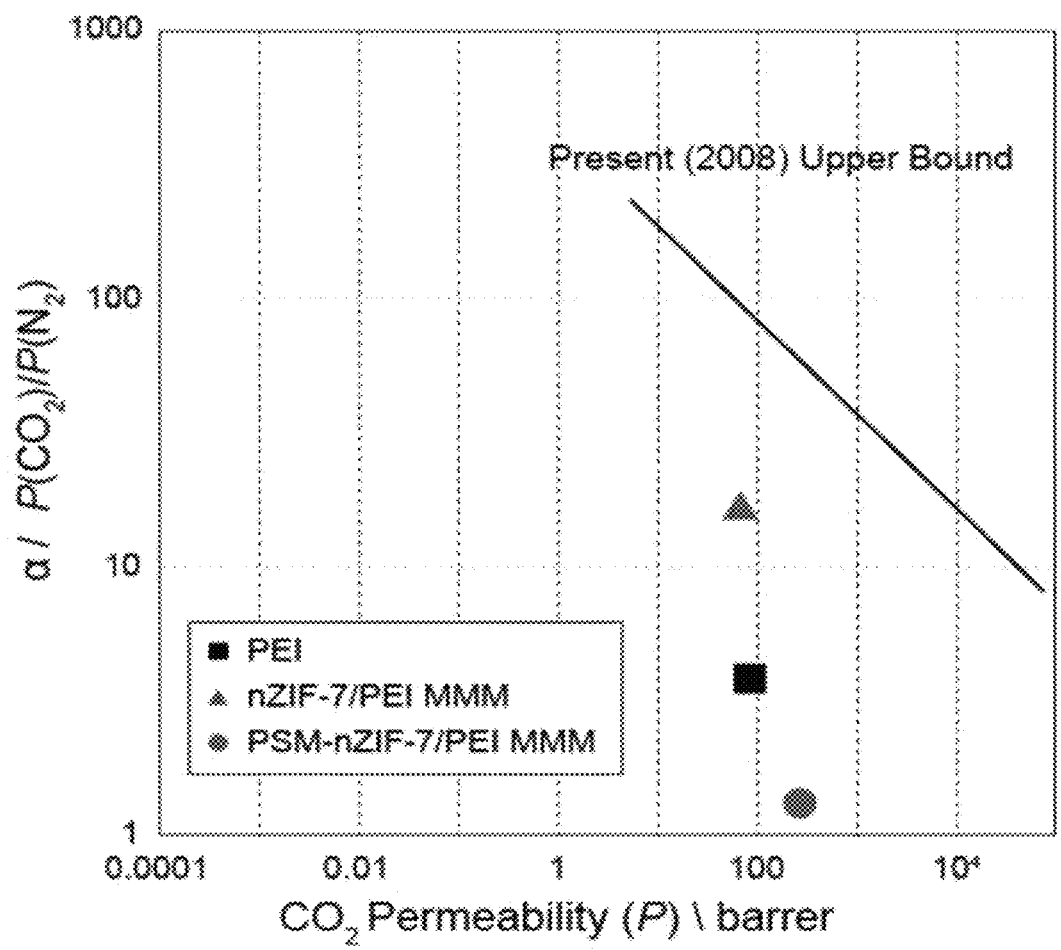
FIG. 39 is a graph illustrating the $CO_2/N_2$ relationship between permeability (P) and gas pair selectivity (a) in comparison with the Robeson upper bound curve for pure PEI membrane, nZIF-7/PEI mixed matrix membrane, and PSM-nZIF-7/PEI mixed matrix membrane.
Figure 40:
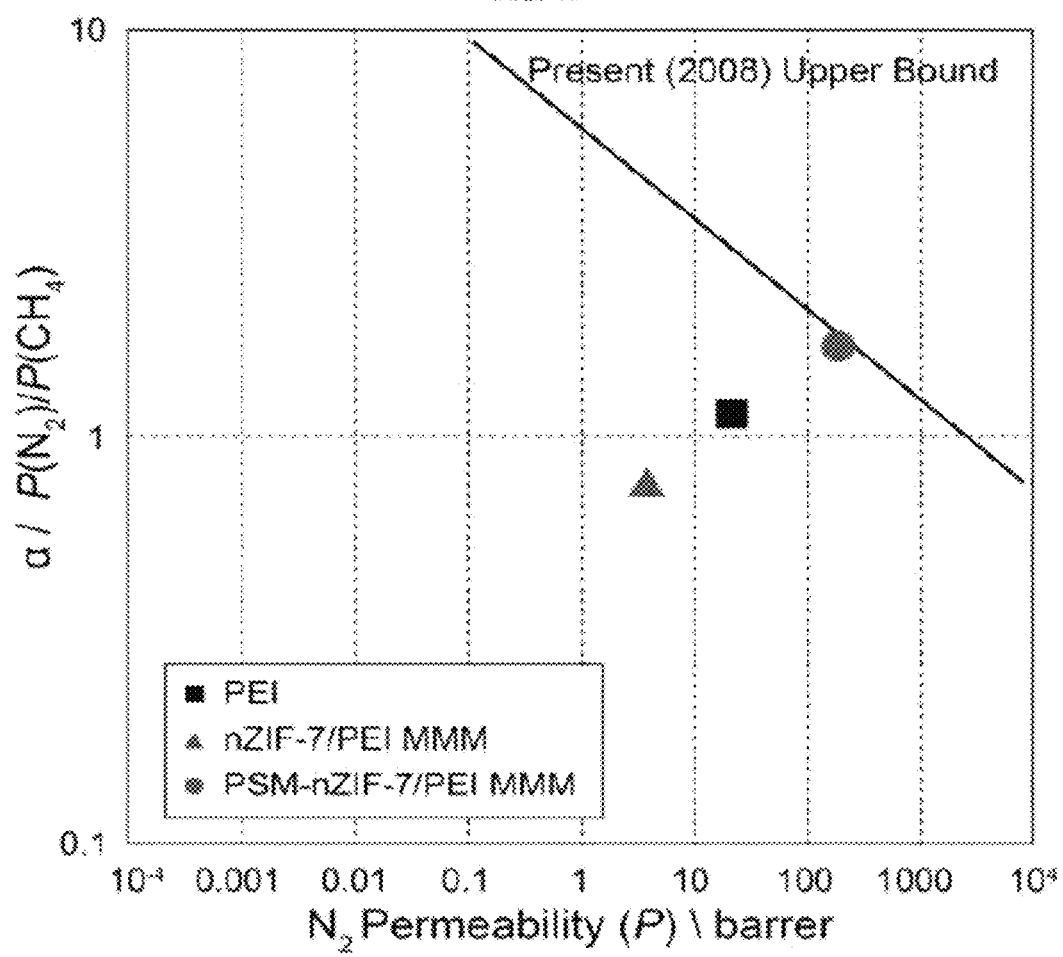
FIG. 40 is a graph illustrating the relationship between $N_2$ permeability (P) and $N_2/CH_4$ gas pair selectivity (a) in comparison with the Robeson upper bound curve for pure PEI membrane, nZIF-7/PEI mixed matrix membrane, and PSM-nZIF-7/PEI mixed matrix membrane.

FIGS. 38-40 show that the $CO_2/CH_4$, $CO_2/N_2$, and $N_2/CH_4$ permselectivities of the mixed matrix membranes, when compared with the upper bound curves, are improved relative to the pure PEI membrane.

Gas Transport Mechanism.

The gas transport behavior through the pure PEI membrane and the nZIF-7/PEI and PSM-nZIF-7/PEI mixed matrix membranes was evaluated based on the solution-diffusion model (Freeman, B.; Yampolskii, Y.; Pinnau, I., Materials science of membranes for gas and vapor separation, John Wiley & Sons, 2006, each incorporated herein by reference in their entirety). This model is widely applied to polymeric membranes, in which gas permeability (P) is established as the product of the diffusion and solubility (S) coefficients. Specifically, the diffusion coefficient reflects the kinetic transport of a gas molecule through the respective membrane and is correlated with molecular size of the gas, which is expressed as the Lennard-Jones diameter. The diffusion coefficient, D, can be derived from the time-lag, θ (s), and membrane thickness, l (cm), as shown in equation (2). The solubility coefficient, S, reflects the membrane's interactions with the gases, which can be correlated with the normal boiling point of the gas. Upon calculating P and D, a facile calculation using equation (3) leads to the solubility coefficient, S.

Figure 41A:
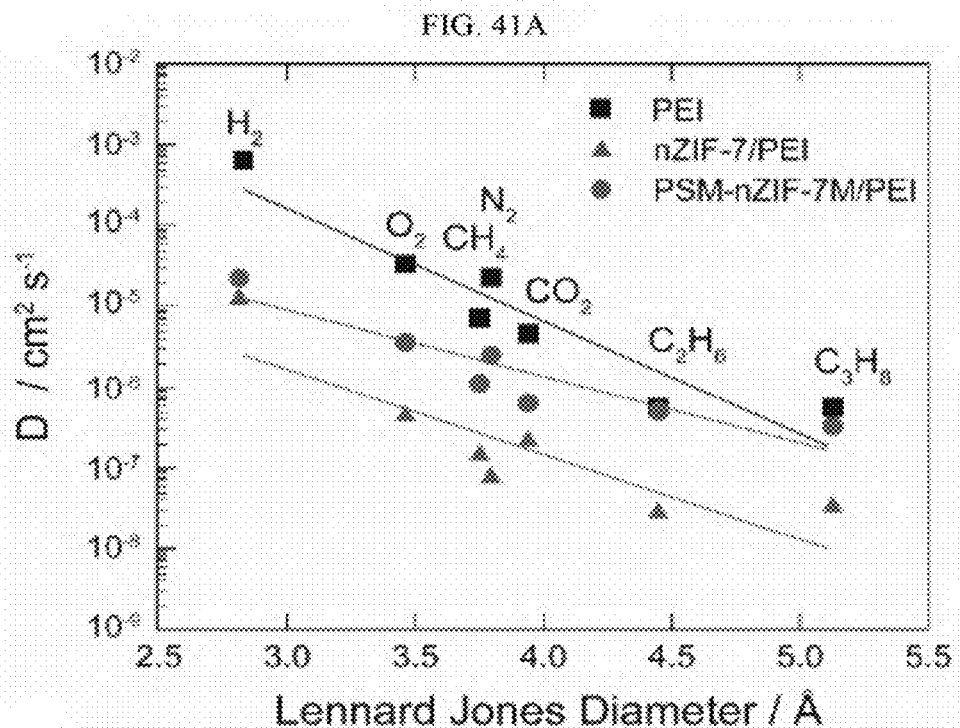
FIG. 41A is a graph illustrating the relationship between the diffusion coefficients (D) of the gases and the Lennard-Jones diameter of the respective gases.
Figure 41B:
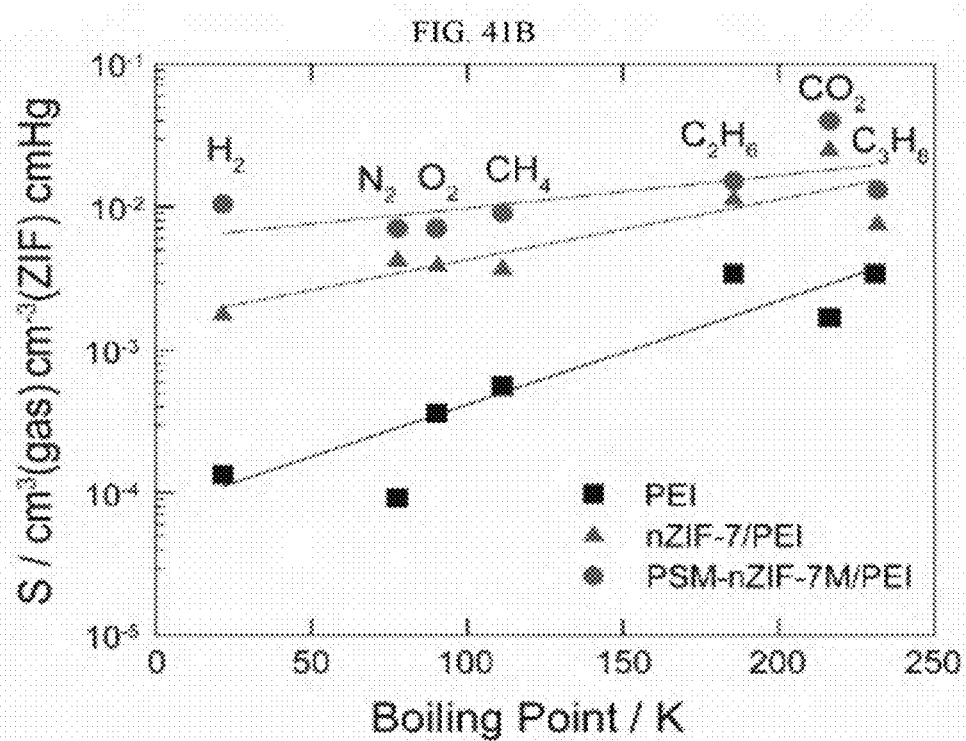
FIG. 41B is a graph illustrating relationship between the solubility coefficients (S) of the gases and the normal boiling points of the respective gases at 2 bars for pure PEI membrane, nZIF-7/PEI mixed matrix membrane, and PSM-nZIF-7/PEI mixed matrix membrane.

FIGS. 41A and 41B show that nZIF-7/PEI and PSM-nZIF-7/PEI mixed matrix membranes exhibit a substantial decrease in diffusivity of all gases but with an increase in the solubility of the gases relative to the pure PEI membrane. FIG. 41A shows that gas molecules with larger diameters experience more resistance to diffusion (i.e., the gas has a lower diffusivity) through the pure PEI membrane than they do with either of the mixed matrix membranes. FIG. 41A also shows a diffusivity trend of PEI membrane>PSM-nZIF-7/PEI mixed matrix membrane>nZIF-7/PEI mixed matrix membrane, with pure PEI membrane displaying the highest diffusivities for all gases tested. It is noted that at the operating temperature (35° C.), when a ZIF material is present in a PEI-based matrix, the mixed matrix membrane may harden and experience a decrease in the degree of flexibility, thus leading to lower diffusivities (Li, T.; Pan, Y.; Peinemann, K.-V.; Lai, Z., Carbon dioxide selective mixed matrix composite membrane containing ZIF-7 nano-fillers. J. Membr. Sci. 2013, 425-426, 235-242, incorporated herein by reference in its entirety). In terms of solubility, FIG. 41B shows that the solubility of the gases is related to the normal boiling point of the gases. For example, a gas is more soluble when the normal boiling point of the gas is higher.

These findings were consistent with, and thus suggested, the solution-diffusion mechanism for permeation. The enhanced solubility trend of pure PEI membrane<nZIF-7/PEI mixed matrix membrane<PSM-nZIF-7/PEI mixed matrix membrane may be a result of the PSM-nZIF-7/PEI mixed matrix membrane having an extra polar nitrogen atom within the ZIF's backbone structure. The presence of the additional nitrogen atom may increase the thermodynamic affinity for polarizable gases like $CO_2$, as shown in FIG. 41B. It is noted that in the presence of either ZIF nanoparticles, not all gases were affected similarly in terms of diffusivity and solubility. For example, $H_2$ was observed to have a 27-fold decrease in diffusivity, yet experienced a 76-fold increase in solubility on the PSM-nZIF-7/PEI mixed matrix membrane when compared to the pure PEI membrane. On the other hand, $CO_2$ was shown to only have an 8-fold lower diffusivity and 23-fold higher solubility under the same comparison (Tables 4-6).

TABLE 4

Gas permeation results for PEI membrane.

| Gas | Lennard Jones Diameter $d_{LJ}$ [Å] | Normal boiling Point [K] | Permeability [barrer] | Permeance [mol/(s m² Pa)] | Diffusivity Coefficient (D) [cm²/s] | Solubility Coefficient (S) [cm³(gas)/ (cm³(MOF)cmHg)] | Time-lag (θ) [sec] |
|---|---|---|---|---|---|---|---|
| $H_2$ | 2.83 | 20.3 | 856.1 | 6.62E−10 | 6.25E−04 | 1.37E−04 | 0.5 |
| $N_2$ | 3.8 | 77.0 | 21.8 | 1.69E−11 | 2.38E−05 | 9.17E−05 | 13.1 |
| $O_2$ | 3.47 | 90.2 | 119.9 | 9.27E−11 | 3.38E−05 | 3.55E−04 | 9.2 |
| $CH_4$ | 3.76 | 111.0 | 18.9 | 6.69E−11 | 7.22E−06 | 4.09E−04 | 43.3 |
| $CO_2$ | 3.94 | 216.6 | 82.5 | 6.38E−11 | 4.80E−06 | 1.72E−03 | 65.1 |
| $C_2H_6$ | 4.44 | 185.0 | 18.9 | 1.46E−11 | 5.61E−07 | 3.36E−03 | 556.9 |
| $C_3H_8$ | 5.12 | 231.0 | 18.3 | 1.42E−11 | 5.39E−07 | 3.39E−03 | 579.4 |

TABLE 5

Gas permeation results for nZIF-7/PEI MMM.

| Gas | Lennard Jones Diameter $d_{LJ}$ [Å] | Normal boiling Point [K] | Permeability [barrer] | Permeance [mol/(s m² Pa)] | Diffusivity Coefficient (D) [cm²/s] | Solubility Coefficient (S) [cm³(gas)/ (cm³(MOF)cmHg)] | Time-lag (θ) [sec] |
|---|---|---|---|---|---|---|---|
| $H_2$ | 2.83 | 20.3 | 207.0 | 3.87E−10 | 1.16E−05 | 1.78E−03 | 4.6 |
| $N_2$ | 3.8 | 77.0 | 3.8 | 7.18E−12 | 8.54E−08 | 4.49E−03 | 625.0 |
| $O_2$ | 3.47 | 90.2 | 15.9 | 2.98E−11 | 4.15E−07 | 3.84E−03 | 128.7 |
| $CH_4$ | 3.76 | 111.0 | 5.0 | 9.26E−12 | 1.32E−07 | 3.74E−03 | 403.7 |
| $CO_2$ | 3.94 | 216.6 | 64.7 | 1.21E−10 | 2.51E−07 | 2.58E−02 | 213.0 |
| $C_2H$ | 4.44 | 185.0 | 3.2 | 5.96E−12 | 2.88E−08 | 1.11E−02 | 1856.6 |
| $C_3H$ | 5.12 | 231.0 | 3.0 | 5.62E−12 | 3.96E−08 | 7.58E−03 | 1349.0 |

TABLE 6

Gas permeation results for PSM-nZIF-7/PEI MMM.

| Gas | Lennard Jones Diameter $d_{LJ}$ [Å] | Normal boiling Point [K] | Permeability [barrer] | Permeance [mol/(s m² Pa)] | Diffusivity Coefficient (D) [cm²/s] | Solubility Coefficient (S) [cm³(gas)/ (cm³(MOF)cmHg)] | Time-lag (θ) [sec] |
|---|---|---|---|---|---|---|---|
| $H_2$ | 2.83 | 20.3 | 2020.9 | 2.88E−09 | 2.34E−05 | 1.04E−02 | 5.8 |
| $N_2$ | 3.8 | 77.0 | 182.6 | 2.15E−10 | 2.55E−06 | 7.17E−03 | 52.8 |
| $O_2$ | 3.47 | 90.2 | 272.9 | 3.22E−10 | 3.87E−06 | 7.05E−03 | 34.7 |
| $CH_4$ | 3.76 | 111.0 | 107.9 | 1.27E−10 | 1.22E−06 | 8.87E−03 | 110.5 |
| $CO_2$ | 3.94 | 216.6 | 245.9 | 2.90E−10 | 6.27E−07 | 3.92E−02 | 196.2 |
| $C_2H_6$ | 4.44 | 185.0 | 73.3 | 8.64E−11 | 4.77E−07 | 1.54E−02 | 281.8 |
| $C_3H_8$ | 5.12 | 231.0 | 45.5 | 5.37E−11 | 3.39E−07 | 1.34E−02 | 396.4 |

The invention claimed is:

1. A membrane, comprising:
a matrix comprising a polymer; and
0.1 to 50 wt % of a nanoparticle filler based on a total weight of the membrane, which is embedded in the matrix,
wherein the nanoparticle filler comprises a ligand exchange product of a metal-organic framework and a ligand represented by formula (I) or formula (II):

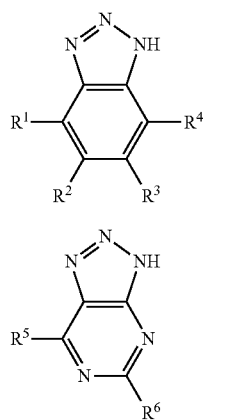

wherein $R_1$, $R_2$, $R_3$, $R_4$, $R_5$, and $R_6$ are independently a hydrogen, fluoro, chloro, bromo, iodo, cyano, nitro, an optionally substituted $C_1$-$C_3$ alkyl group, an optionally substituted $C_3$-$C_4$ cycloalkyl group, and
wherein the metal-organic framework comprises at least one metal selected from the group consisting of an alkaline earth metal, a transition metal, and a post-transition metal.

2. The membrane of claim 1, which comprises pores which are irregularly-shaped.

3. The membrane of claim 2, wherein the pores have an average diameter in a range of 0.5-5 μm.

4. The membrane of claim 1, wherein the polymer is at least one selected from the group consisting of a polysulfone, a polyetherimide, a polyethylenimine, a polyether block amide, a polyimide, a polyether ether ketone, and a sulfonated polyether ether ketone.

5. The membrane of claim 4, wherein the polymer is the polyetherimide.

6. The membrane of claim 1, which comprises 1-10 wt % of the nanoparticle filler.

7. The membrane of claim 1, wherein the nanoparticle filler is porous.

8. The membrane of claim 1, wherein the nanoparticle filler is substantially spherical with an average diameter in a range of 40-70 nm.

9. The membrane of claim 8, wherein the nanoparticle filler has a BET surface area in a range of 250-400 m²/g.

10. The membrane of claim 1, wherein the at least one metal is the post-transition metal.

11. The membrane of claim 10, wherein the at least one post-transition metal is zinc.

12. The membrane of claim 1, wherein the metal-organic framework is ZIF-7.

13. The membrane of claim 12, wherein the ligand is represented by formula (I), and $R_1$, $R_2$, $R_3$, and $R_4$ are each a hydrogen.

14. The membrane of claim 1, wherein a permselectivity of the membrane for carbon dioxide over a gas selected from the group consisting of oxygen, nitrogen, methane, ethane, and propane is in a range of 4-25.

15. A method for making the membrane of claim 1, the method comprising:
suspending the nanoparticle filler in a solvent thereby forming a first suspension;
dissolving the polymer in the solvent thereby forming a solution;
mixing the first suspension with the solution thereby forming a second suspension; and
casting the second suspension thereby forming the membrane.

16. The method of claim 15, wherein the solvent is dimethylacetamide.

17. The method of claim 15, wherein the solution comprises 10-30 wt % of the polymer, relative to a weight of the second suspension.

18. The method of claim 17, wherein the first suspension comprises 0.1-50 wt % of the nanoparticle filler, relative to the weight of polymer.

19. The method of claim 15, wherein the polymer is dissolved at 35-60° C. under reduced pressure for a duration in a range of 10-30 hours, and the first suspension is mixed with the solution for a duration in a range of 1-10 hours at 35-60° C. under reduced pressure.

20. A method for separating a gas from a fluid stream comprising the gas, the method comprising:
contacting the fluid stream with the membrane of claim 1 thereby causing the gas to permeate the membrane and be separated from the fluid stream, wherein the gas is at least one selected from the group consisting of hydrogen, oxygen, and carbon dioxide.

* * * * *